United States Patent
Cava et al.

(10) Patent No.: US 12,450,529 B1
(45) Date of Patent: Oct. 21, 2025

(54) COMPUTER SYSTEMS AND METHODS FOR DETERMINING ENVIRONMENT IMPACT INDICATORS FOR FOOD PRODUCTS

(71) Applicant: INTERCONTINENTAL GREAT BRANDS LLC, East Hanover, NJ (US)

(72) Inventors: Lucas Gevaerd Cava, Curitiba (BR); Andrew Carlos Kondlatsch, Rio Negro (BR); Jeanny Zimeri Franz, Budd Lake, NJ (US); Meng Sun, Easton, PA (US); Qiaoxuan Zhou, East Hanover, NJ (US); Hsiu Wei Yang, Atlantic Highlands, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 0 days.

(21) Appl. No.: 18/933,591

(22) Filed: Oct. 31, 2024

(51) Int. Cl.
*G06Q 10/063* (2023.01)
*G01N 33/02* (2006.01)
*G06Q 50/04* (2012.01)

(52) U.S. Cl.
CPC ........... *G06Q 10/063* (2013.01); *G06Q 50/04* (2013.01); *G01N 33/02* (2013.01)

(58) Field of Classification Search
CPC ....... G06Q 10/00–50/00; G01N 1/00–2800/00
USPC .............................................. 705/7.11–7.42
See application file for complete search history.

(56) References Cited

U.S. PATENT DOCUMENTS

| | | | |
|---|---|---|---|
| 10,321,263 B1 * | 6/2019 | AlKarmi | G06Q 30/0601 |
| 10,942,159 B2 * | 3/2021 | Jahns | C11B 9/00 |
| 2006/0286518 A1 * | 12/2006 | Yoder | G06Q 10/00 434/236 |

(Continued)

FOREIGN PATENT DOCUMENTS

WO WO-2022221232 A1 * 10/2022 ........... G06Q 10/087

OTHER PUBLICATIONS

Carbon Footprint Software | The Leading ESG Tool | Sustain.Life [online], [retrieved Nov. 12, 2024], Retrieved from the Internet:<https://www.sustain.life/carbon-footprint-software-esg-tool?campaignid=16832719163&adgroupid=138222367338&network=g&utm_medium=ppc&utm_source=google&utm_term=carbon%20footprint%20software&utm_campaign=AMER_Carbon_Tracking_+_Carbon_Neutral&hsa_acc=6395178135&hsa_cam=16832719163&hsa_grp=138222367338&hsa_ad=691000088847&hsa_src=g&hsa_tgt=kwd-4382095996&hsa_kw=carbon%20footprint%20software&hsa_mt=b&hsa_net=adwords&hsa_ver=3&gad_source=1&gclid=CjwKCAjwrcKxBhBMEiwAIVF8rM7HQUIr5UG3sUPbzX-5hKrkXy150O-qiY8VrENOeBaGs9qx9Nv-5BoC2L4QAvD_BwE. 2024. 6 pages.

(Continued)

*Primary Examiner* — Alan S Miller
(74) *Attorney, Agent, or Firm* — Lee Sullivan Shea & Smith LLP

(57) ABSTRACT

A computing platform is configured to (1) extract first and second source datasets from a first database containing data about food products and a second database containing data about manufacturing processes, respectively, (2) merge the (Continued)

first and second source datasets into a first merged dataset, (3) generate an updated dataset including (i) rows representing data records for a set of product-level resources and (ii) columns representing data variables that provide information about the set of product-level resources, (4) extract third, fourth, and fifth source datasets from a third database containing data about resource types, a fourth source database containing data about manufacturing plants, and a fifth source database containing environmental-impact values for types of resources, respectively, (6) merge the updated dataset and the third, fourth, and fifth source datasets into a second merged dataset, and (7) determine a group of environmental-impact indicators for each product-level resource in the set.

20 Claims, 13 Drawing Sheets

(56) References Cited

U.S. PATENT DOCUMENTS

| | | | | |
|---|---|---|---|---|
| 2009/0259409 | A1* | 10/2009 | O'Lenick, Jr. | G06Q 50/04 702/22 |
| 2010/0100216 | A1* | 4/2010 | Ames | G06Q 10/04 700/103 |
| 2010/0274603 | A1* | 10/2010 | Walker | G06Q 10/0639 705/7.38 |
| 2011/0218885 | A1* | 9/2011 | Manski | G06Q 30/0282 705/347 |
| 2012/0158446 | A1* | 6/2012 | Mayerle | G06Q 10/063 705/7.11 |
| 2014/0108412 | A1* | 4/2014 | Masset | G06F 16/285 707/740 |
| 2020/0096599 | A1* | 3/2020 | Hewett | G07G 1/009 |
| 2020/0258094 | A1* | 8/2020 | Abrams | G06Q 30/018 |
| 2021/0019801 | A1* | 1/2021 | Dixon | G06Q 30/0627 |
| 2021/0148891 | A1* | 5/2021 | Beal | G01N 33/497 |
| 2023/0079494 | A1* | 3/2023 | Koltai | G06Q 30/0283 705/28 |
| 2023/0244357 | A1* | 8/2023 | Lundeen | G06F 3/0486 715/769 |
| 2023/0404128 | A1* | 12/2023 | O'Kelly | G06Q 10/0833 |
| 2024/0135297 | A1* | 4/2024 | Edmondson | G06Q 50/02 |

OTHER PUBLICATIONS

Dettling, Jon et al. A Comparative Life Cycle Assessment of Plant-Based Foods and Meet Foods. Quantis. Mar. 2016. 154 pages.
Greenhouse Gas Protocol: Product Life Cycle Accounting and Reporting Standard. World Resources Institute and WorldBusiness Council for Sustainable Development. 2011. 148 pages.
Humbert, Sebastien et al. Impact 2002+: User Guide Draft for Version Q2.2. Quantis. Mar. 2012. 36 pages.
LCA (US) | Greenly [online], [retrieved Nov. 12, 2024], Retrieved from the Internet:<https://greenly.earth/en-us/lca-service?utm_term=lca%20analysis%20software&utm_campaign=1:+SN+%7C+2:+Acquisition+%7C+3:+Search+Generic+Other+US+google+%7C+4:+US&utm_source=adwords&utm_medium=ppc&hsa_acc=8929442750&hsa_cam=20406138211&hsa_grp=153150406753&hsa_ad=685350839249&hsa_src=g&hsa_tgt=kwd-518987532407&hsa_kw=lca%20analysis%20software&hsa_mt=p&hsa_net=adwords&hsa_ver=3&gad_source=1&gclid=CjwKCAjwrcKxBhBMEiwAIVF8rGfKKIIRz5kXIZa_clvjnZJwEiN88nC59J9tnwdSNEwhK7vL7DOVExoCcOoQAvD_BwE&mrasn=1142258.1415236.Oa72iYAH. 2024. 11 pages.
Life Cycle Assessment (LCA) Software | Sphera [online], [retrieved Nov. 12, 2024], Retrieved from the Internet:<https://about.sphera.com/ps?form_type=request-demo&lang=eng&utm_campaign=lca-experts&utm_source=google&utm_source=google&utm_medium=text&keyword=lca%20data&matchtype=b&device=c&_bt=674670040288&_bk=lca%20data&_bm=b&_bn=g&_bg=153032830237&utm_source=google&utm_medium=text&campaignid=20515012237&adgroupid=153032830237&feeditemid=&extensionid=&targetid=kwd-313321898545&loc_interest_ms=&loc_physical_ms=9003709&network=g&device=c&devicemodel=&creative=674670040288&keyword=lca%20data&placement=&target=&adposition=&gad_source=1&gclid=CjwKCAjwrcKxBhBMEiwAIVF8rKITLrJOnwy7nSZOOWS3JCa5wEYhNoPEwpnylytAaSEpLbnwEpb-axoCA-QQAvD_BWE. 2023. 3 pages.
Pacheco da Costa, Tamiris et al. Life Cycle Assessment Tool for Food Supply Chain Environmental Evaluation. Sustainability 2023, vol. 15, Issue 1. https://doi.org/10.3390/su15010718. 24 pages.
Salituro, Antonio. All You Need to Know about the Life Cycle Assessment (LCA) of Food. Foodsteps. Jan. 2023. 5 pages.
SimaPro | LCA Software for Informed Changemakers [online], [retrieved Nov. 12, 2024], Retrieved from the Internet: <https://simapro.com/. 2024. 6 pages.
Sustainability Intelligence for Food Companies | HowGood [online], [retrieved Nov. 19, 2024], Retrieved from the Internet: <https://www.howgood.com/. 2024. 8 pages.

* cited by examiner

COMPUTER SYSTEMS AND METHODS FOR DETERMINING ENVIRONMENT IMPACT INDICATORS FOR FOOD PRODUCTS

BACKGROUND

Monitoring the environmental impact of products throughout their lifecycle (e.g., during production of raw materials, transportation of raw materials, manufacturing of the product, etc.) is becoming increasingly important, particularly given the widespread concerns over climate change and the like. As individuals and organizations gain awareness of the environmental impact of their products, they become better able to make informed decisions regarding how to make adjustments to different stages of the products' lifecycle to reduce their environmental impact, e.g., by changing what raw materials are used, how the raw materials are transported from a source location to a manufacturing site, and how the products are manufactured, among other possible examples.

OVERVIEW

Disclosed herein is new technology for determining environmental impact indicators for food products.

In a first aspect, the disclosed technology may involve computer-implemented functionality for (1) extracting a first source dataset from a first database table containing data about product-level ingredients, wherein the first source dataset includes (i) rows representing data records for a given set of product-level ingredients, wherein each respective product-level ingredient in the given set is included in a corresponding food product and (ii) columns representing data variables that, for each respective product-level ingredient in the given set, provide respective information about the respective product-level ingredient, (2) extracting a second source dataset from a second database table containing data about food products, wherein the second source dataset includes (i) rows representing data records for a given set of food products and (ii) columns representing data variables that, for each respective food product in the given set, provide respective information about the respective food product, (3) merging the first source dataset and the second source dataset into a first merged dataset that includes (i) rows representing data records for the given set of product-level ingredients and (ii) columns representing data variables that, for each respective product-level ingredient in the given set, provide (a) respective information about the respective product-level ingredient and (b) respective information about the corresponding food product in which the respective product-level ingredient is included, (4) updating the first merged dataset by inserting an additional column representing a data variable that, for each respective product-level ingredient in the given set, provides a respective measure of a dry mass of the respective product-level ingredient within the corresponding food product in which the respective product-level ingredient is included, (5) extracting a third source dataset from a third database table containing environmental-impact values for ingredients, wherein the third source dataset includes (i) rows representing data records for a given set of ingredients and (ii) columns representing data variables that, for each respective ingredient in the given set, provide respective environmental-impact values for the respective ingredient, (6) merging the updated first merged dataset and the third source dataset into a second merged dataset that includes (i) rows representing data records for the given set of product-level ingredients and (ii) columns representing data variables that, for each respective product-level ingredient in the given set, provide (a) respective information about the respective product-level ingredient, (b) respective information about the corresponding food product in which the respective product-level ingredient is included, (c) a respective measure of the dry mass of the respective product-level ingredient within the corresponding food product in which the respective product-level ingredient is included, and (d) respective environmental-impact values for the respective product-level ingredient, and (7) determining a respective group of environmental-impact indicators for each respective product-level ingredient in the given set using the second merged dataset.

In this first aspect, the function of merging the first source dataset and the second source dataset into the first merged dataset may take any of various forms. For instance, in one possibility where the first source dataset includes a first column representing a first data variable that, for each respective product-level ingredient in the given set, provides a respective identification of the corresponding food product in which the respective product-level ingredient is included, and where the second source dataset includes a second column representing a second data variable that, for each respective food product in the given set, provides a respective identification of the respective food product, the function of merging the first source dataset and the second source dataset into the first merged dataset may involve using the first and second data variables as a key for merging the first source dataset and the second source dataset into the first merged dataset. The functionality for merging the first source dataset and the second source dataset into the first merged dataset may take other forms as well.

Further, in this first aspect, the first merged dataset may take any of various forms. For instance, as one possibility, the first merged dataset may include (i) a first column representing a first data variable that, for each respective product-level ingredient in the given set, provides a respective measure of an amount of the respective product-level ingredient that is included in the corresponding food product, and (ii) a second column representing a second data variable that, for each respective product-level ingredient in the given set, provides a respective measure of an amount of moisture lost during manufacturing from the corresponding food product in which the respective product-level ingredient is included. Further, the disclosed technology may further involve computer-implemented functionality for (8) before updating the first merged dataset to insert the additional column, determining, for each respective product-level ingredient in the given set, a respective measure of the dry mass of the respective product-level ingredient within the corresponding food product in which the respective product-level ingredient is included based on (i) the respective measure of the amount of the respective product-level ingredient that is included in the corresponding food product and (ii) the respective measure of the amount of moisture lost during manufacturing from the corresponding food product. The first merged dataset may take other forms as well.

Further yet, in this first aspect, the respective group of environmental-impact indicators for each respective product-level ingredient in the given set may take any of various forms. As one possibility, the respective group of environmental-impact indicators for each respective product-level ingredient in the given set may include: a first environmental-impact indicator that quantifies the respective product-level ingredient impact on climate change, a second environmental-impact indicator that quantifies the respective product-level ingredient impact on an amount of ozone in Earth's atmosphere, a third environmental-impact indicator that quantifies the respective product-level ingredient impact on humans of toxic, cancerous substances, a fourth environmental-impact indicator that quantifies the respective product-level ingredient impact on humans of toxic, non-cancerous substances, a fifth environmental-impact indicator that quantifies the respective product-level ingredient impact on a potential incidence of disease due to particulate matter emissions, a sixth environmental-impact indicator that quantifies the respective product-level ingredient impact on human health and ecosystems linked to radionuclide emissions, a seventh environmental-impact indicator that quantifies the respective product-level ingredient impact on a creation of photochemical ozone in a lower atmosphere, an eighth environmental-impact indicator that quantifies the respective product-level ingredient impact on a potential acidification of soils, water, or both, a ninth environmental-impact indicator that quantifies the respective product-level ingredient impact on an enrichment of terrestrial ecosystems with nitrogen-containing compounds, a tenth environmental-impact indicator that quantifies the respective product-level ingredient impact on an enrichment of freshwater ecosystems with nitrogen-containing compounds, phosphorus-containing compounds, or both, an eleventh environmental-impact indicator that quantifies the respective product-level ingredient impact on an enrichment of marine ecosystems with nitrogen-containing compounds, a twelfth environmental-impact indicator that quantifies the respective product-level ingredient impact on freshwater organism health, a thirteenth environmental-impact indicator that quantifies the respective product-level ingredient impact on soil quality, a fourteenth environmental-impact indicator that quantifies the respective product-level ingredient impact on a depletion of water, a fifteenth environmental-impact indicator that quantifies the respective product-level ingredient impact on a depletion of non-fossil resources, and a sixteenth environmental-impact indicator that quantifies the respective product-level ingredient impact on a depletion of fossil resources.

Further yet, in this first aspect, in the second merged dataset, the respective environmental-impact values for each respective product-level ingredient in the given set may include at least one environmental-impact value corresponding to each given category of environmental-impact indicator that includes a per-unit measure of an amount of environment impact of the given category that is caused by the respective product-level ingredient.

Further yet, in this first aspect, the disclosed technology may further involve additional computer-implemented functionality. As one possibility, the disclosed technology may further involve computer-implemented functionality for storing the respective group of environmental-impact indicators for each respective product-level ingredient in the given set in a database table. As another possibility, the disclosed technology may further involve computer-implemented functionality for causing a client device to present a visualization of the respective groups of environmental-impact indicators for at least a subset of the given set of product-level ingredients. As yet another possibility, the disclosed technology may further involve computer-implemented functionality for aggregating the respective groups of environmental-impact indicators for at least a subset of the given set of product-level ingredients, and in at least some implementations, the subset of the given set of product-level ingredients includes the product-level ingredients that are included in a given food product. The disclosed technology may further involve other additional computer-implemented functionality as well.

In a second aspect, the disclosed technology may involve computer-implemented functionality for (1) extracting a first source dataset from a first database table containing data about food products, wherein the first source dataset includes (i) a set of rows representing data records for a given set of food products and (ii) a set of columns representing data variables that, for each respective row in the set of rows, provide respective information about a respective food product represented by the respective row, (2) extracting a second source dataset from a second database table containing data about manufacturing processes for food products, wherein the second source dataset includes (i) a set of rows representing data records for a given set of manufacturing processes and (ii) a set of columns representing data variables that, for each respective row in the set of rows, provide respective information about a respective manufacturing process represented by the respective row, (3) merging the first source dataset and the second source dataset into a first merged dataset that includes (i) a set of rows representing data records for the given set of food products and (ii) a set of columns representing data variables that, for each respective row in the set of rows, provide respective information about a respective food product represented by the respective row, wherein at least a given subset of columns in the set of columns represent data variables that each indicates an amount of a given type of resource that is used or produced by a respective manufacturing process used to manufacture the respective food product represented by the respective row, (4) updating the first merged dataset by unpivoting the given subset of columns in the set of columns and thereby generating an updated first merged dataset that includes (i) an updated set of rows representing data records for a given set of product-level resources that are each defined by a respective combination of food product and resource type, and (ii) an updated set of columns representing data variables that, for each respective row in the set of rows, provide respective information about a respective product-level resource represented by the respective row, (5) extracting a third source dataset from a third database table containing data about resource types that are used or produced by manufacturing processes for food products, wherein the third source dataset includes (i) a set of rows representing data records for a given set of resource types and (ii) a set of columns representing data variables that, for each respective row in the set of rows, provide respective information about a respective resource type represented by the respective row, (6) extracting a fourth source dataset from a fourth database table containing data about plants where food products are manufactured, wherein the fourth source dataset includes (i) a set of rows representing data records for a given set of plants and (ii) a set of columns representing data variables that, for each respective row in the set of rows, provide respective information about a respective plant represented by the respective row, (7) extracting a fifth source dataset from a fifth database table containing environmental-impact values for types of resources, wherein the third source dataset includes (i) a set of rows representing data records for a given set of resource types and (ii) a set of columns representing data variables that, for each respective row in the set of rows, provide respective environmental-impact values for a respective resource type represented by the respective row, (8) merging the updated first merged dataset, the third source dataset, the fourth source dataset, and the fifth source dataset into a second merged dataset that includes (i) a set of rows representing data records for the given set of product-level resources and (ii) a set of columns representing data variables that, for each respective row in the set of rows, provide respective information about a respective product-level resource represented by the respective row, and (9) determining a respective group of environmental-impact indicators for each respective product-level resource in the given set using the second merged dataset.

In this second aspect, the set of columns in the first source dataset may take any of various forms. For instance, as one possibility, the set of columns in the first source dataset may take the form of a set of columns representing data variables that, for each respective row in the set of rows, provide respective information about a respective food product represented by the respective row that includes at least an identification of the respective food product, an identification of a respective plant where the respective food product is manufactured, and an identification of a respective manufacturing process used to manufacture the respective food product. The set of columns in the first source dataset may take other forms as well.

Further, in this second aspect, the set of columns in the second source dataset may take any of various forms. For instance, as one possibility, the set of columns in the second source dataset may take the form of a set of columns representing data variables that, for each respective row in the set of rows, provide respective information about a respective manufacturing process represented by the respective row that includes at least an identification of the respective manufacturing process and indications of amounts of different resource types that are used or produced by the respective manufacturing process. The set of columns in the second source dataset may take other forms as well.

Further yet, in this second aspect, the set of columns in the first merged dataset may take any of various forms. For instance, as one possibility, the set of columns in the first merged dataset may take the form of a set of columns representing data variables that, for each respective row in the set of rows, provide respective information about a respective food product represented by the respective row that includes at least an identification of the respective food product, an identification of a plant where the respective food product is manufactured, an identification of a respective manufacturing process used to manufacture the respective food product, and indications of amounts of different resource types that are used or produced by the respective manufacturing process. The set of columns in the first merged dataset may take other forms as well.

Further yet, in this second aspect, the updated set of columns in the updated first merged dataset may take any of various forms. For instance, as one possibility, the updated set of columns in the updated first merged dataset may take the form of an updated set of columns representing data variables that, for each respective row in the set of rows, provide respective information about a respective product-level resource represented by the respective row that includes an identification of a respective food product that defines the respective product-level resource, an identification of a respective plant where the respective food product is manufactured, an identification of a respective manufacturing process used to manufacture the respective food product, an identification of a respective resource type that defines the respective product-level resource, and an indication of an amount of the respective product-level resource that is used or produced by the respective manufacturing process. The updated set of columns in the updated first merged dataset may take other forms as well.

Further yet, in this second aspect, in some implementations, the respective group of environmental-impact indicators for each respective product-level resource in the given set may include environmental-impact indicators for a plurality of environmental-impact categories. And in such implementations, the set of columns in the second merged dataset may include, for each given environmental-impact category in the plurality of environmental-impact categories, a given column representing a given data variable that, for each respective row in the set of rows, indicates an environmental-impact value of a respective product-level resource represented by the respective row for the given environmental-impact category. The set of columns in the second merged dataset may take other forms as well.

Further yet, in this second aspect, the function of merging the first source dataset and the second source dataset into the first merged dataset may take any of various forms. For instance, in one possibility where the first source dataset includes a first column representing a first data variable that, for each respective row in the set of rows, identifies a respective manufacturing process used to manufacture a respective food product represented by the respective row and where the second source dataset includes a second column representing a second data variable that, for each respective row in the set of rows, identifies a respective manufacturing process represented by the respective row, the function of merging the first source dataset and the second source dataset into the first merged dataset may involve using the first and second data variables as a key for merging the first source dataset and the second source dataset into the first merged dataset. The functionality for merging the first source dataset and the second source dataset into the first merged dataset may take other forms as well.

Further yet, in this second aspect, the function of merging the updated first merged dataset, the third source dataset, the fourth source dataset, and the fifth source dataset into the second merged dataset may take any of various forms. For instance, in one possibility, this functionality may involve (i) using a first key that identifies a resource type to merge the updated first merged dataset and the third source dataset into a first intermediate dataset, (ii) using a second key that identifies a plant to merge the first intermediate dataset and the fourth source dataset into a second intermediate dataset, and (iii) using a third key that identifies a resource type to merge the second intermediate dataset and the fifth source dataset into the second merged dataset. The function of merging the updated first merged dataset, the third source dataset, the fourth source dataset, and the fifth source dataset into the second merged dataset may take other forms as well.

Further yet, in this second aspect, the function of determining the respective group of environmental-impact indicators for each respective product-level resource in the given set using the second merged dataset may take any of various forms. For instance, in some implementations, (i) the respective group of environmental-impact indicators for each respective product-level resource in the given set may include environmental-impact indicators for a plurality of environmental-impact categories, and (ii) the second merged dataset may include (a) a plurality of columns representing a plurality of data variables that, for each respective row in the set of rows, indicate environmental-impact values of a respective product-level resource represented by the respective row for the plurality of environmental-impact categories, (b) a first additional column representing a data variable that, for each respective row in the set of rows, indicates a conversion factor for the respective product-level resource represented by the respective row, and (c) a second additional column representing a data variable that, for each respective row in the set of rows, indicates an amount of the respective product-level resource that is used or produced during manufacture of a respective food product that defines the respective product-level resource. And in such implementations, the function of determining the respective group of environmental-impact indicators for each respective product-level resource in the given set using the second merged dataset may involve, for each respective row in the set of rows in the second merged dataset, multiplying each of the environmental-impact values of the respective product-level resource represented by the respective row for the plurality of environmental-impact categories by (i) the conversion factor for the respective product-level resource represented by the respective row and (ii) the amount of the respective product-level resource that is used or produced during manufacture of the respective food product that defines the respective product-level resource.

Further yet, in this second aspect, the respective group of environmental-impact indicators for each respective product-level resource in the given set may include: a first environmental-impact indicator that quantifies the respective product-level resource impact on climate change, a second environmental-impact indicator that quantifies the respective product-level resource impact on an amount of ozone in Earth's atmosphere, a third environmental-impact indicator that quantifies the respective product-level resource impact on humans of toxic, cancerous substances, a fourth environmental-impact indicator that quantifies the respective product-level resource impact on humans of toxic, non-cancerous substances, a fifth environmental-impact indicator that quantifies the respective product-level resource impact on a potential incidence of disease due to particulate matter emissions, a sixth environmental-impact indicator that quantifies the respective product-level resource impact on human health and ecosystems linked to radionuclide emissions, a seventh environmental-impact indicator that quantifies the respective product-level resource impact on a creation of photochemical ozone in a lower atmosphere, an eighth environmental-impact indicator that quantifies the respective product-level resource impact on a potential acidification of soils, water, or both, a ninth environmental-impact indicator that quantifies the respective product-level resource impact on an enrichment of terrestrial ecosystems with nitrogen-containing compounds, a tenth environmental-impact indicator that quantifies the respective product-level resource impact on an enrichment of freshwater ecosystems with nitrogen-containing compounds, phosphorus-containing compounds, or both, an eleventh environmental-impact indicator that quantifies the respective product-level resource impact on an enrichment of marine ecosystems with nitrogen-containing compounds, a twelfth environmental-impact indicator that quantifies the respective product-level resource impact on freshwater organism health, a thirteenth environmental-impact indicator that quantifies the respective product-level resource impact on soil quality, a fourteenth environmental-impact indicator that quantifies the respective product-level resource impact on a depletion of water, a fifteenth environmental-impact indicator that quantifies the respective product-level resource impact on a depletion of non-fossil resources, and a sixteenth environmental-impact indicator that quantifies the respective product-level resource impact on a depletion of fossil resources.

Further yet, in this second aspect, the disclosed technology may further involve additional computer-implemented functionality. As one possibility, the disclosed technology may further involve computer-implemented functionality for causing a client device to present a visualization of the respective groups of environmental-impact indicators for at least a subset of the given set of product-level resources. The disclosed technology may further involve other additional computer-implemented functionality as well.

In a third aspect, the disclosed technology may involve computer-implemented functionality for (1) extract a first source dataset from a first database table containing data about product-level ingredients, wherein the first source dataset includes (i) a set of rows representing data records for a given set of product-level ingredients that are each defined by a respective combination of food product and ingredient type, and (ii) a set of columns representing data variables that, for each respective row in the set of rows, provide respective information about a respective product-level ingredient represented by the respective row, (2) extracting a second source dataset from a second database table containing data about food products, wherein the second source dataset includes (i) a set of rows representing data records for a given set of food products and (ii) a set of columns representing data variables that, for each respective food product in the given set, provide respective information about a respective food product represented by the respective row, (3) extracting a third source dataset from a third database table containing data about plants where food products are manufactured, wherein the third source dataset includes (i) a set of rows representing data records for a given set of plants and (ii) a set of columns representing data variables that, for each respective row in the set of rows, provide respective information about a respective plant represented by the respective row, (4) extracting a fourth source dataset from a fourth database table containing data about source locations for ingredients, wherein the fourth source dataset includes (i) a set of rows representing data records for a given set of source locations for ingredients and (ii) a set of columns representing data variables that, for each respective row in the set of rows, provide respective information about a respective source location represented by the respective row, (5) extracting a fifth source dataset from a fifth database table containing data about transportation modes for ingredients, wherein the fifth source dataset includes (i) a set of rows representing data records for a given set of transportation modes for ingredients and (ii) a set of columns representing data variables that, for each respective row in the set of rows, provide respective information about a respective transportation mode represented by the respective row, (6) merging the first source dataset, the second source dataset, the third source dataset, the fourth source dataset, and the fifth source dataset into a first merged dataset that includes (i) a set of rows representing data records for the product-level ingredients and (ii) a set of columns representing data variables that, for each respective row in the set of rows, provide respective information about a respective product-level ingredient represented by the respective row, (7) updating the first merged dataset by inserting an additional column representing a data variable that, for each respective row in the set of rows, provides a measure of a respective distance between a respective source location and a respective plant location for a respective product-level ingredient represented by the respective row, (8) extracting a sixth source dataset from a sixth database table containing environmental-impact values for ingredients, wherein sixth third source dataset includes (i) a set of rows representing data records for a given set of ingredients and (ii) a set of columns representing data variables that, for each respective row in the set of rows, provide respective environmental-impact values for a respective ingredient represented by the respective row, (9) merging the updated first merged dataset and the sixth source dataset into a second merged dataset that includes (i) a set of rows representing data records for the product-level ingredients and (ii) a set of columns representing data variables that, for each respective row in the set of rows, provide respective information about a respective product-level ingredient represented by the respective row, and (10) determining a respective group of environmental-impact indicators for each respective product-level ingredient in the given set using the second merged dataset.

In this third aspect, each set of columns in each of the source datasets may represent various data variables. For instance, as one possibility, (i) the set of columns in the first source dataset may represent data variables that, for each respective row in the set of rows in the first source dataset, provide respective information about a respective product-level ingredient represented by the respective row that includes at least an identification of a respective food product and a respective ingredient type that define the respective product-level ingredient, an identification of a respective source location for the respective product-level ingredient, and an identification of a respective transportation mode for the product-level ingredient, (ii) the set of columns in the second source dataset may represent data variables that, for each respective row in the set of rows in the second source dataset, provide respective information about a respective food product represented by the respective row that includes at least an identification of the respective food product and an identification of a respective plant where the respective food product is manufactured, (iii) the set of columns in the third source dataset may represent data variables that, for each respective row in the set of rows in the third source dataset, provide respective information about a respective plant represented by the respective row that includes an identification of the respective plant and geographic coordinates for the respective plant, (iv) the set of columns in the fourth source dataset may represent data variables that, for each respective row in the set of rows in the fourth source dataset, provide respective information about a respective source location represented by the respective row that includes an identification of the respective source location and geographic coordinates for the respective source location, and (v) the set of columns in the fifth source dataset may represent data variables that, for each respective row in the set of rows in the fifth source dataset, provide respective information about a respective transportation mode represented by the respective row that includes an identification of the respective transportation mode and an indication of a respective distance factor associated with the respective transportation mode. The set of columns in each of the source datasets may represent other data variables as well.

Further, in this third aspect, the set of columns in the first merged dataset may represent various data variables. For instance, as one possibility, the set of columns in the first merged dataset may represent data variables that, for each respective row in the set of rows in the first merged dataset, provide respective information about a respective product-level ingredient represented by the respective row that includes at least an identification of a respective food product and a respective ingredient type that define the respective product-level ingredient, geographic coordinates for a respective plant for the respective product-level ingredient, geographic coordinates for a respective source location for the respective product-level ingredient, an identification of a respective transportation mode for respective product-level ingredient, and an indication of a distance factor associated with the respective transportation mode. The set of columns in the first merged dataset may represent other data variables as well.

Further, in this third aspect, the additional column in the updated first merged dataset may represent various data variables. For instance, as one possibility, the additional column in the updated first merged dataset may represent a data variable that, for each respective row in the set of rows, provides a measure of a respective haversine distance between a respective source location and a respective plant location for a respective product-level ingredient represented by the respective row. The additional column in the updated first merged dataset may represent other data variables as well.

Further, in this third aspect, the set of columns in the second merged dataset may represent various data variables. For instance, as one possibility, the set of columns in the second merged dataset may represent data variables that, for each respective row in the set of rows in the second merged dataset, provide respective information about a respective product-level ingredient represented by the respective row that includes at least an identification of a respective food product and a respective ingredient type that define the respective product-level ingredient, a measure of a respective distance between a respective source location and a respective plant location for the respective product-level ingredient, an identification of a respective transportation mode for respective product-level ingredient, an indication of a respective distance factor associated with the respective transportation mode, and respective environmental-impact values of the respective transportation mode.

As another possibility, where the respective group of environmental-impact indicators for each respective product-level ingredient in the given set includes environmental-impact indicators for a plurality of environmental-impact categories, the set of columns in the second merged dataset may include, for each given environmental-impact category in the plurality of environmental-impact categories, a given column representing a given data variable that, for each respective row in the set of rows, indicates an environmental-impact value of a respective transportation mode for a respective product-level ingredient represented by the respective row for the given environmental-impact category. The set of columns in the second merged dataset may represent other data variables as well.

Further yet, in this third aspect, the function of determining the environmental impact indicators for each respective product-level ingredient in the given set using the second merged dataset may take any of various forms. For instance, in some implementations, the respective group of environmental-impact indicators for each respective product-level ingredient in the given set includes environmental-impact indicators for a plurality of environmental-impact categories, and in such implementations, the function of determining the environmental impact indicators for each respective product-level ingredient in the given set using the second merged dataset may involve, for each respective row in the set of rows in the second merged dataset, multiplying each of the environmental-impact values of the respective transportation mode for the plurality of environmental-impact categories by (i) the respective distance between the respective source location and the respective plant location for the respective product-level ingredient and (ii) the respective distance factor associated with the respective transportation mode. The function of determining the environmental impact indicators for each respective product-level ingredient in the given set using the second merged dataset may take other forms as well.

Further yet, in this third aspect, the respective group of environmental-impact indicators for each respective product-level ingredient in the given set may include: a first environmental-impact indicator that quantifies the respective product-level ingredient impact on climate change, a second environmental-impact indicator that quantifies the respective product-level ingredient impact on an amount of ozone in Earth's atmosphere, a third environmental-impact indicator that quantifies the respective product-level ingredient impact on humans of toxic, cancerous substances, a fourth environmental-impact indicator that quantifies the respective product-level ingredient impact on humans of toxic, non-cancerous substances, a fifth environmental-impact indicator that quantifies the respective product-level ingredient impact on a potential incidence of disease due to particulate matter emissions, a sixth environmental-impact indicator that quantifies the respective product-level ingredient impact on human health and ecosystems linked to radionuclide emissions, a seventh environmental-impact indicator that quantifies the respective product-level ingredient impact on a creation of photochemical ozone in a lower atmosphere, an eighth environmental-impact indicator that quantifies the respective product-level ingredient impact on a potential acidification of soils, water, or both, a ninth environmental-impact indicator that quantifies the respective product-level ingredient impact on an enrichment of terrestrial ecosystems with nitrogen-containing compounds, a tenth environmental-impact indicator that quantifies the respective product-level ingredient impact on an enrichment of freshwater ecosystems with nitrogen-containing compounds, phosphorus-containing compounds, or both, an eleventh environmental-impact indicator that quantifies the respective product-level ingredient impact on an enrichment of marine ecosystems with nitrogen-containing compounds, a twelfth environmental-impact indicator that quantifies the respective product-level ingredient impact on freshwater organism health, a thirteenth environmental-impact indicator that quantifies the respective product-level ingredient impact on soil quality, a fourteenth environmental-impact indicator that quantifies the respective product-level ingredient impact on a depletion of water, a fifteenth environmental-impact indicator that quantifies the respective product-level ingredient impact on a depletion of non-fossil resources, and a sixteenth environmental-impact indicator that quantifies the respective product-level ingredient impact on a depletion of fossil resources.

Further yet, in this third aspect, the disclosed technology may further involve additional computer-implemented functionality. As one possibility, the disclosed technology may further involve computer-implemented functionality for causing a client device to present a visualization of the respective groups of environmental-impact indicators for at least a subset of the given set of product-level ingredients. The disclosed technology may further involve other additional computer-implemented functionality as well.

The disclosed computer-implemented functionality may take various other forms as well.

Further, in practice, the disclosed computer-implemented functionality may be embodied in the form of a method to be carried out by a computing platform, a computing platform that is programmed to carry out the disclosed computing-implemented functionality, and/or a non-transitory computer-readable medium that is provisioned with program instructions for carrying out the disclosed computing-implemented functionality, among other possibilities.

One of ordinary skill in the art will appreciate these as well as numerous other aspects in reading the following disclosure.

Figure 1:
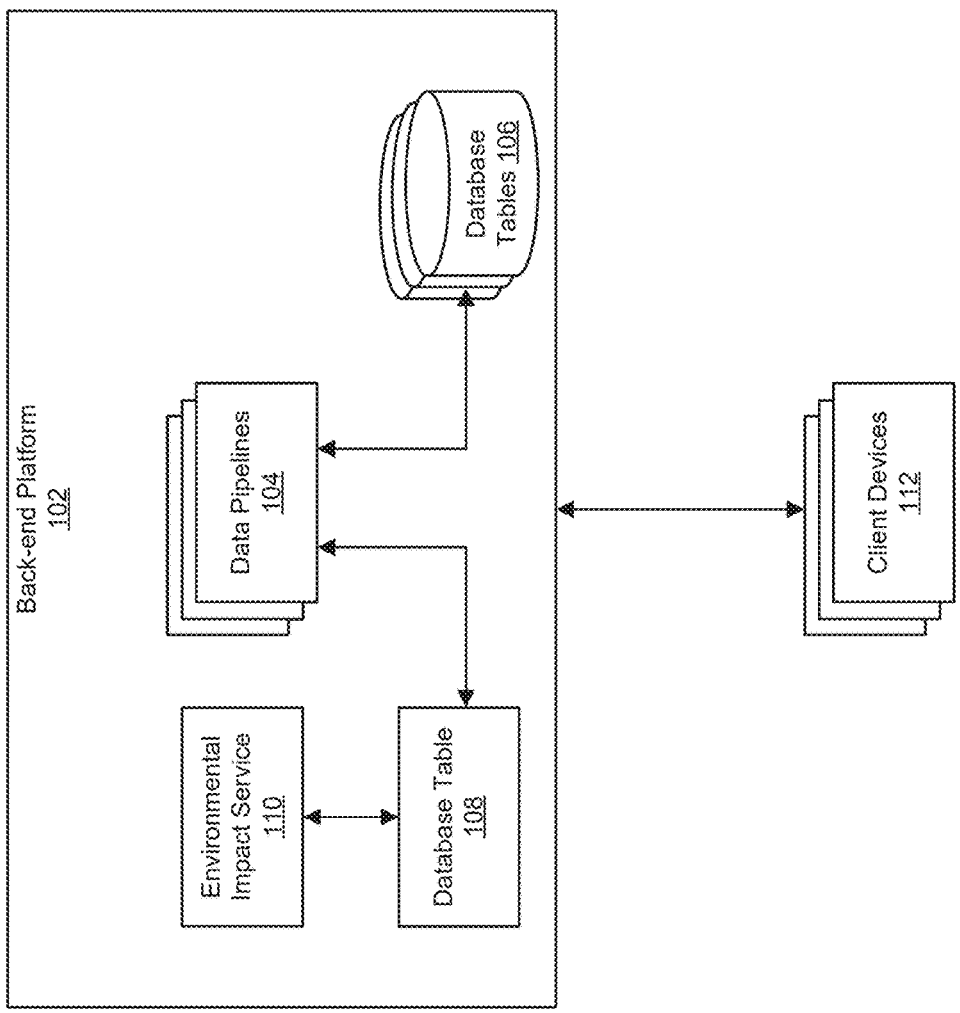
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

As previously mentioned, monitoring the environmental impact of products throughout their lifecycle (e.g., during production of raw materials, transportation of raw materials, manufacturing of the product, etc.) is becoming increasingly important, particularly given the widespread concerns over climate change and the like. As individuals and organizations gain awareness of the environmental impact of their products, they become better able to make informed decisions regarding how to make adjustments to different stages of the products' lifecycle to reduce their environmental impact, e.g., by changing what raw materials are used, how the raw materials are transported from a source location to a manufacturing site, and how the products are manufactured, among other possible examples.

In view of this desire to monitor the environmental impact of products, certain frameworks have recently been developed to quantify how products impact the environment. One such framework is called the Product Environmental Footprint (PEF) method, which defines a set of different environmental impact indicators for quantifying how products impact the environment in various ways. See https://green-business.ec.europa.eu/environmental-footprint-methods/pef-method_en. Presently, there are up to 16 different categories of environmental impact indicators that may be utilized in accordance with the PEF method to quantify a product's environment impact, each of which is briefly described below.

A first category of environmental impact indicator may quantify the product's impact on climate change, which may be referred to herein as a "climate change" indicator, and one possible example of such a climate change indicator may comprise a Global Warming Potential 100 (GWP100) metric.

A second category of environmental impact indicator may quantify the product's impact on the amount of ozone in Earth's atmosphere, which may be referred to herein as an "ozone depletion" indicator, and one possible example of such an ozone depletion indicator may comprise an Ozone Depletion Potential (ODP) metric.

A third category of environmental impact indicator may quantify the product's impact on humans of toxic, cancerous substances, which may be referred to herein as a "cancerous human toxicity" indicator, and one possible example of such a cancerous human toxicity indicator may comprise a Comparative Toxic Unit for humans ($CTU_h$) metric.

A fourth category of environmental impact indicator may quantify the product's impact on humans of toxic, non-cancerous substances, which may be referred to herein as a "non-cancerous human toxicity" indicator, and one possible example of such a non-cancerous human toxicity indicator may comprise a Comparative Toxic Unit for humans ($CTU_h$) metric.

A fifth category of environmental impact indicator may quantify the product's impact on the potential incidence of disease due to particulate matter emissions, which may be referred to herein as a "particulate matter" indicator, and one possible example of such a particulate matter indicator may comprise a Disease Incidence metric.

A sixth category of environmental impact indicator may quantify the product's impact on human health and ecosystems linked to the emissions of radionuclides, which may be referred to herein as an "ionizing radiation" indicator, and one possible example of such an ionizing radiation indicator may comprise a Human Exposure Efficiency (e.g., relative to $U^{235}$) metric.

A seventh category of environmental impact indicator may quantify the product's impact on the creation of photochemical ozone in the lower atmosphere (i.e., smog), which may be referred to herein as a "photochemical ozone formation" indicator, and one possible example of such a photochemical ozone formation indicator may comprise a Tropospheric Ozone Concentration Increase metric.

An eighth category of environmental impact indicator may quantify the product's impact on the potential acidification of soils and water, which may be referred to herein as an "acidification" indicator, and one possible example of such an acidification indicator may comprise an Accumulated Exceedance (AE) metric.

A ninth category of environmental impact indicator may quantify the product's impact on the enrichment of terrestrial ecosystems with nitrogen-containing compounds, which may be referred to herein as a "terrestrial eutrophication" indicator, and one possible example of such a terrestrial eutrophication indicator may comprise a Terrestrial Accumulated Exceedance (AE) metric.

A tenth category of environmental impact indicator may quantify the product's impact on the enrichment of freshwater ecosystems with nitrogen-containing and/or phosphorus-containing compounds, which may be referred to herein as a "freshwater eutrophication" indicator, and one possible example of such a freshwater eutrophication indicator may comprise a Freshwater Eutrophication Potential (EP) metric.

An eleventh category of environmental impact indicator may quantify the product's impact on the enrichment of marine ecosystems with nitrogen-containing compounds, which may be referred to herein as a "marine eutrophication" indicator, and one possible example of such a marine eutrophication indicator may comprise a Marine Eutrophication Potential (EP) metric.

A twelfth category of environmental impact indicator may quantify the product's impact on the health of freshwater organisms, which may be referred to herein as an "freshwater ecotoxicity" indicator, and one possible example of such a freshwater ecotoxicity indicator may comprise a Comparative Toxic Unit for Ecosystems ($CTU_e$) metric.

A thirteenth category of environmental impact indicator may quantify the product's impact on soil quality, which may be referred to herein as a "land use" indicator, and one possible example of such a land use indicator may comprise a Soil Quality Index metric.

A fourteenth category of environmental impact indicator may quantify the product's impact on the depletion of water, which may be referred to herein as a "water use" indicator, and one possible example of such a water use indicator may comprise a User Deprivation Potential metric.

A fifteenth category of environmental impact indicator may quantify the product's impact on the depletion of natural non-fossil resources, which may be referred to herein as a "minerals and metals resource use" indicator, and one possible example of such a minerals and metals resource use indicator may comprise a non-fossil fuel Abiotic Resource Depletion (ADP) metric.

A sixteenth category of environmental impact indicator may quantify the product's impact on the depletion of fossil resources, which may be referred to herein as a "fossils resource use" indicator, and one possible example of such a fossils resource use indicator may comprise a fossil fuel Abiotic Resource Depletion (ADP) metric.

It is possible that other categories of environmental impact indicators could be developed in the future.

In order for this uniform framework to achieve its intended goals, it is important that organizations determine each of the different categories of environmental impact indicators in a consistent and accurate manner.

To that end, technology has been developed that allows organizations to determine the foregoing categories of environmental impact indicators. For instance, certain software applications exist that enable organizations to input source data related to certain of their products and then determine at least some of the foregoing categories of environmental impact indicators. However, the existing technology for determining environmental impact indicators is not suitable for all scenarios where there is a need to determine environmental impact indicators.

For instance, there may be scenarios where there is a need to determine environmental impact indicators across many different products at scale (e.g., tens, hundreds, or even thousands of different products)—such as many different food products (e.g., food snack products, canned food products, candy and gum products, soft drink products, etc.)—and the source data for determining the environmental impact indicators for the different products may be spread across multiple separate database tables. To illustrate with an example in the context of food products, the source data that identifies the food products themselves may be stored in one database table, the source data that identifies the ingredients used in the food products may be stored in another database table (or perhaps multiple other tables), the source data that identifies the resources used to manufacture the food products may be stored in yet another database table (or perhaps multiple other tables), and so forth. However, the existing software technology is generally not suited for determining environmental impact indicators across many different products at scale in scenarios where the source data is spread out across multiple different database tables—let alone capable of doing so in an efficient way.

Indeed, much of the existing software technology for determining environmental impact indicators do not include any functionality for handling source data that is spread out across multiple different database tables, and to the extent that any of the existing software technology does provide that functionality, such existing technology still have several other technical limitations. For instance, even to the extent that any of the existing software technology for determining environmental impact indicators provides functionality for handling source data that is spread out across multiple different database tables, that existing software technology still lacks the capability to process source data contained within multiple different database tables for multiple different products in a way that allows for the determination of environmental impact indicators across the multiple different products at the same time (i.e., via a single run of a processing pipeline). Instead, such existing software technology at most has the capability to determine environmental impact indicators on an individual product-by-product basis, which is highly inefficient in scenarios where there is a need to determine environmental impact indicators across many different food products. To illustrate with an example, if there is a desire to determine environmental impact indicators for 100 different products, the existing technology may only be capable of determining such environmental impact indicators one product at a time, which may thus require a processing pipeline to be run 100 different times in order to determine environmental impact indicators across the 100 different products. Moreover, to the extent that any of the existing software technology for determining environmental impact indicators provides functionality for handling source data that is spread out across multiple different database tables, that existing software technology may require a user to re-create and/or re-configure a new processing pipeline each time that the user wishes to use the software to determine environmental impact indicators (or at least each time there is a change in the database tables containing the source data), which is also highly inefficient.

These problems are compounded by the fact that there is often a need to determine environmental impact indicators for various different stages of a product's lifecycle, and the processing pipelines for determining these different stage-level environmental impact indicators may require different combinations of source datasets that are stored in different database tables. For instance, in the context of food products, an organization may have a need to determine environmental impact indicators related to at least three different stages of each food product's lifecycle: (1) environmental impact indicators related to the production of the ingredients for the food product, which may be referred to as "ingredient-level" environmental impact indicators, (2) environmental impact indicators related to the manufacturing of the food product—and more particularly to the resources utilized during manufacturing—which may be referred to as "resource-level" environmental impact indicators, and (3) environmental impact indicators related to the transportation of the ingredients for the food product, which may be referred to as "logistics-level impact indicators." In scenarios where the source datasets for determining these three different levels of environmental impact indicators are stored in different combinations of database tables, it becomes even more difficult to determine such environmental impact indicators across multiple different products at scale.

Thus, there is a need for technology that can determine multiple different levels of environmental impact indicators, across multiple different products, based on source data that is spread across multiple separate database tables.

To address these and other problems, disclosed herein is technology for determining multiple different types of environmental impact indicators, across multiple different products, based on source data that is contained within multiple separate database tables. For purposes of illustration, the disclosed technology is described below in the context of food products (e.g., food snack products, canned food products, candy and gum products, soft drink products, etc.), but it should be understood that the disclosed technology may be utilized to determine environmental impact indicators for other types of products as well.

The disclosed technology may take the form of a set of data pipelines for determining environmental impact indicators of a respective type across multiple food products, such as a first data pipeline for determining ingredient-level environmental impact indicators, a second data pipeline for determining resource-level environmental impact indicators, and a third data pipeline for determining logistics-level environmental impact indicators. At a high level, each of the disclosed data pipelines may comprise a respective sequence of functional components that collectively serve to determine environmental impact indicators of a respective type based on source data from multiple different database tables.

The disclosed software technology improves upon existing software technology for determining environmental impact indicators in various ways.

First, the disclosed software technology provides a framework for automatically determining environmental impact indicators across a number of different food products at scale based on source data that is contained within multiple separate database tables. In this way, the disclosed technology allows for a more comprehensive, faster, more efficient, and perhaps also more accurate determination of environmental impact indicators across different food products than what may be determined by existing software technology. Indeed, the disclosed technology generally reduces the time and computing resources that are required to determine environmental impact indicators across different food products based on source data that is contained within multiple separate database tables.

Second, the disclosed software technology provides a framework for determining any one or more of ingredient-level, resource-level, and/or logistics-level environmental impact indicators across a number of different food products at scale based on source data that is contained within multiple separate database tables.

Third, the disclosed software technology provides functionality that allows the environmental impact indicators to be automatically updated in a fast, efficient, and accurate manner when there are updates to the source data contained within the database tables.

Fourth, the disclosed technology enables reporting of environmental impact indicators at any of various levels of granularity, examples of which may include an ingredient level, a recipe level, a manufacturing level, a finished-product level, a brand-portfolio level, and/or a product-category level, among other possibilities.

The disclosed technology improves upon existing technology for determining environmental impact indicators in other ways as well.

Turning now to the figures, FIG. 1 depicts an example network configuration 100 in which the disclosed data pipelines may be implemented. As shown in FIG. 1, the network configuration 100 includes a back-end computing platform 102 and a plurality of client devices 112.

Broadly speaking, the back-end computing platform 102 may comprise one or more computing systems that collectively comprise some set of physical computing resources (e.g., one or more processors, one or more data stores, one or more communication interfaces, etc.) along with back-end software for carrying out the back-end functionality disclosed herein. As one possibility, the back-end computing platform 102 may comprise cloud computing resources supplied by a third-party provider of "on demand" cloud computing resources, such as Amazon Web Services (AWS), Amazon Lambda, Google Cloud, Microsoft Azure, or the like. As another possibility, the back-end computing platform 102 may comprise "on-premises" computing resources of the given software provider (e.g., servers owned by the given software provider). As yet another possibility, the back-end computing platform 102 may comprise a combination of cloud computing resources and on-premises computing resources. Other implementations of the back-end computing platform 102 are possible as well.

In accordance with the present disclosure, the back-end computing platform 102 may be provisioned with one or more of the disclosed data pipelines 104, each of which may comprise a sequence of functional components implemented in software that collectively serve to determine environmental impact indicators of a given type based on source data from a set of database tables 106. In the implementation of FIG. 1, the set of database tables 106 are shown to be stored locally by the back-end computing platform 102 (e.g., in one or more data stores included within the back-end computing platform 102 itself), in which case loading the set of database tables 106 may involve accessing the back-end computing platform's one or more data stores. However, in other implementations, the set of database tables 106 may be stored remotely from the back-end computing platform 102 (e.g., a remote data storage platform such as Microsoft® Dataverse), in which case loading the set of database tables 106 may involve a network-based communication with another computing platform. Other implementations are possible as well, including but not limited to the possibility that different ones of the set of database tables 106 are stored in different data stores and perhaps even stored in separate data-store systems.

Further, in accordance with the present disclosure, the back-end computing platform 102 may include a database table 108 that is configured to store the environmental impact indicators that are determined by the disclosed data pipelines 104.

Still further, in accordance with the present disclosure, the back-end computing platform 102 may be provisioned with a functional component implemented in software that is configured to perform back-end functionality for enabling users to access and analyze the environmental impact indicators that are determined by the data pipelines 104 and stored in the database table 108. This functional component may be referred to herein as the "environmental impact service" 110.

The back-end computing platform 102 may include various other functional components as well. Further, in practice, the functional components disclosed herein may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Turning to the client devices 112, in general, each client device 112 may take the form of any computing device that is capable of running client-side software for interacting with the back-end computing platform 102. In this respect, each client device 112 may include hardware components such as one or more processors, computer readable mediums, communication interfaces, and input/output (I/O) components (or interfaces for connecting thereto), among other possible hardware components, as well as software components such as operating system (OS) software, web browser software, and/or other client-side software for accessing and interacting with the back-end computing platform 102, among other possible software components. As representative examples, each client device 112 may take the form of a desktop computer, a laptop, a netbook, a tablet, a smartphone, or a personal digital assistant (PDA), among other possibilities.

As further depicted in FIG. 1, each client device 112 may be configured to communicate with the back-end computing platform 102 over a respective communication path. Each of these communication paths may generally comprise one or more data networks and/or data links, which may take any of various forms. For instance, each respective communication path between a client device 112 and the back-end computing platform 102 may include any one or more of a Personal Area Network (PAN), a Local Area Network (LAN), a Wide Area Networks (WAN) such as the Internet or a cellular network, a cloud network, and/or a point-topoint data link, among other possibilities, where each such data network and/or link may be wireless, wired, or some combination thereof, and may carry data according to any of various different communication protocols. Additionally, the communication between a client device 112 and the back-end computing platform 102 may be carried out via an Application Programming Interface (API) provided by the back-end computing platform 102, among other possibilities. Although not shown, the respective communication paths between the client devices 112 and the back-end computing platform 102 may also include one or more intermediate systems, examples of which may include a data aggregation system and host server, among other possibilities. Many other configurations are also possible.

It should be understood that the network configuration 100 depicted in FIG. 1 is one example of a network configuration in which the disclosed data pipelines may be implemented. Numerous other arrangements are possible and contemplated herein. For instance, other network configurations may include additional components not pictured and/or more or fewer of the pictured components.

Figure 2:
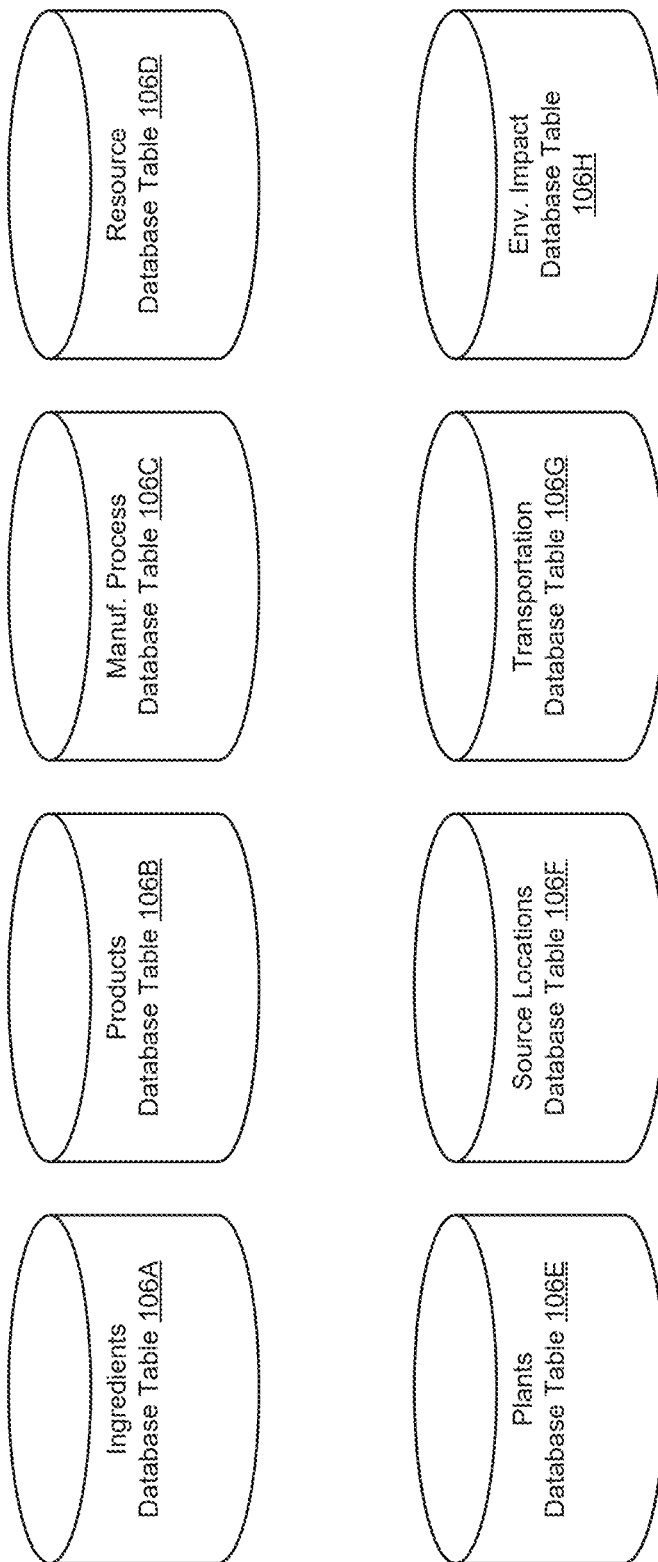
FIG. 2 depicts example database tables that may be utilized by a given computing platform to determine environmental impact indicators, in accordance with the present disclosure.

Turning now to FIG. 2, some representative examples of the database tables that may be included in the set of database tables 106 are shown.

For instance, FIG. 2 shows a first database table 106A referred to as the "ingredients database table 106A," which may contain information about product-level ingredients that are included in various different food products.

Each row of the ingredients database table 106A may comprise a respective data record representing a given product-level ingredient (e.g., chocolate, flour, etc.) of a given food product. In this respect, if the ingredients database table 106A is sorted by food product, then the first set of rows may represent a first set of product-level ingredients included in a first food product, the second set of rows may represent a second set of product-level ingredients included in a second food product, and so on for each other food product that has its ingredients represented within the ingredients database table 106A. (In practice, the set of product-level ingredients included in a food product may also be referred to herein as a "recipe"). However, it should be understood that the ingredients database table 106A need not be sorted by food product, and may instead be sorted in some other manner (e.g., according to any other column included within the database).

Given that the rows of the ingredients database table 106A represent product-level ingredients, and that it is possible a particular ingredient may be used in multiple different food products that are represented within the ingredients database table 106A, the ingredients database table 106A may include multiple rows for same ingredient. For example, if flour is an ingredient used in multiple different food products, then the ingredients database table 106A may contain multiple different rows representing flour, such as a first row that represents flour as used in a first food product, a second row that represents flour as used in a second food product, and so on. In this respect, the information about an ingredient that is contained within the different rows may generally be the same with the exception of any information about the food product in which the ingredient is used, which will differ between the rows.

Further, each column of the ingredients database table 106A may represent a respective data variable that provides information about the product-level ingredients represented by the rows of the ingredients database table 106A. There may be various types of data variables that are represented by the columns of the ingredients database table 106A.

A first type of data variable represented by the columns of the ingredients database table 106A may comprise an identifier of a product-level ingredient, such as textual identifier of the ingredient (e.g., "chocolate" or "flour"), which may be referred to herein as the "ingredient name" of the product-level ingredient.

A second type of data variable represented by the columns of the ingredients database table 106A may comprise an identifier of the food product that includes the product-level ingredient, such as (i) a numeric identifier of the food product that includes the product-level ingredient, which may be referred to herein as the "product ID" of the food product, and/or (ii) a textual identifier of the food product that includes the product-level ingredient (e.g., "cookie" or "cracker"), which may be referred to herein as the "product name" of the food product.

A third type of data variable represented by the columns of the ingredients database table 106A may comprise a measure of the moisture content of the product-level ingredient, such as a percentage of the total weight of the product-level ingredient that constitutes moisture (which is sometimes referred to as the "Wet Basis" of the product-level ingredient). Some representative examples of wet basis values may include 0 (e.g., chocolate may have a wet basis value of 0) and 0.12 (e.g., flour may have a wet basis value of 0.12), among other possible values.

A fourth type of data variable represented by the columns of the ingredients database table 106A may comprise an identifier of a geographical location from where the product-level ingredient is sourced and procured, which may be referred to herein as the "origin" of the product-level ingredient. Some representative examples of origins may include Germany (e.g., chocolate may be sourced from Germany) and Canada (e.g., flour may be sourced from Canada), among other possible origins.

A fifth type of data variable may comprise an identifier of a transportation mode that is used to transport the product-level ingredient to a plant location where the food product is manufactured, which may be referred to herein as the "Transportation Mode" of the product-level ingredient. In practice, the value of this transportation mode variable may have one or both of the following components: (i) an indication of whether the transportation of the product-level ingredient is carried out by land, air, or sea, and (ii) an indication of whether the product-level ingredient is transported in a dry shipping container (e.g., a general purpose container with limited atmospheric impact protections) or in a refrigerated shipping container (e.g., a container that includes a cooling system to manage the internal temperature of the container).

A sixth type of data variable may comprise a measure of an amount of the product-level ingredient that is included in the food product, which may be referred to herein as the "recipe mass" of the product-level ingredient. For example, while flour may be used in both cookies and crackers, the recipe mass of flour in cookies may be 500 g, whereas the recipe mass of flour in crackers may be 200 g. Various other examples may also exist.

The columns of the ingredients database table 106A may represent other types of data variables as well.

FIG. 2 further shows a second database table 106B, referred to as the "products database table 106B," which may contain information about various food products.

Each row of the products database table 106B may comprise a respective data record representing a respective food product (e.g., cookies, crackers, etc.), and each column of the products database table 106B may represent different data variables that provide information about the respective food products represented by the rows of the products database table 106B. There may be various types of data variables that are represented by the columns of the products database table 106B.

A first type of data variable represented by the columns of the products database table 106B may comprise an identifier of a food product, such as (i) a numeric identifier of the food product, which as noted above may be referred to herein as the "product ID" of the food product, and/or (ii) a textual identifier of the food product, which as noted above may be referred to herein as the "product name" of the food product.

A second type of data variable may comprise an identifier of a plant where the food product is manufactured, which may be referred to herein as the "plant identifier" for the plant where the food product is manufactured. Such plant identifiers may take various forms, and as one possibility, the plant identifiers may identify the plants in terms of the city and state where the plants are located, such as Chicago, Illinois, San Antonio, Texas, etc. The plant identifiers may take various other forms as well.

A third type of data variable may comprise an identifier of a process used to manufacture the food product, such as a textual identifier of the process used to manufacture the food product, which may be referred to herein as the "process name" for the food product. In some scenarios, the process used to manufacture a food product may have a textual identifier that is similar to the textual identifier for the food product itself, however, in other scenarios, the process used to manufacture a food product may have a textual identifier that differs from the textual identifier for the food product.

A fourth type of data variable may comprise a measure of the amount of moisture that is lost from the food product during manufacturing, such as a percentage of the total weight of the food product, which may be referred to herein as the "% moisture loss" for the food product. Some representative examples of % moisture loss values may include 10% (e.g., the process used to manufacture cookies products may result in a 10% moisture loss) and 20% (e.g., the process used to manufacture crackers products may result in a 20% moisture loss), among other possible values.

The columns of the products database table 106B may represent other types of data variables as well.

FIG. 2 further shows a third database table 106C, referred to as the "manufacturing process database table 106C," which may contain information about various processes for manufacturing food products.

Each row of the manufacturing process database table 106C may comprise a respective data record representing a respective process that may be used to manufacture a food product, and each column of the manufacturing process database table 106C may represent a different data variable that provides information about the respective processes represented by the rows of the manufacturing process database table 106C. There may be various types of data variables that are represented by the columns of the manufacturing process database table 106C.

A first type of data variable represented by the columns of the manufacturing process database table 106C may comprise an identifier of a process used to manufacture a food product, such as a textual identifier for the manufacturing process, which may be referred to herein as the "process name" for the manufacturing process. In some scenarios, the process used to manufacture a food product may have a textual identifier that is similar to the textual identifier for the food product itself, however, in other scenarios, the process used to manufacture a food product may have a textual identifier that differs from the textual identifier for the food product.

A second type of data variable represented by the columns of the manufacturing process database table 106C may comprise a measure of the amount of a type of resource that is used or produced by the manufacturing process. The types of resource that may be used or produced by the manufacturing process may take any of various forms, and in some implementations, may be defined in terms of (i) a category of the resource, examples of which may include electricity, fuel, water, and waste, and perhaps also (ii) a sub-category of the resource, examples of which may include an electric grid or a renewable energy resource (e.g., solar energy, wind energy, water energy, etc.) for electricity, coal, petroleum gas, or propane for fuel, and biowaste and wastewater for waste. To illustrate with some representative examples, the manufacturing process database table 106C may include columns representing amounts of any two or more grid-sourced electricity (e.g., measured in GJ/ton), solar-sourced electricity (e.g., measured in GJ/ton), water-sourced electricity (e.g., measured in GJ/ton), biomass-sourced electricity (e.g., measured in GJ/ton), cogeneration-sourced electricity (e.g., electricity cogenerated together with heat, wherein the electricity is measured in GJ/ton), geothermal-sourced electricity (e.g., measured in GJ/ton), wind-sourced electricity (e.g., measured in GJ/ton), biogas-sourced fuel (e.g., measured in GJ/ton), biomass-sourced fuel (e.g., measured in GJ/ton), coal-sourced fuel (e.g., measured in GJ/ton), heavy fuel oil-sourced fuel (e.g., measured in GJ/ton), light fuel oil-sourced fuel (e.g., measured in GJ/ton), liquified petroleum gas-sourced fuel (e.g., measured in GJ/ton), natural-sourced fuel (e.g., measured in GJ/ton), propane-sourced fuel (e.g., measured in GJ/ton), anaerobically digested biowaste (e.g., measured in kg/ton), composted biowaste (e.g., measured in kg/ton), incinerated biowaste (e.g., measured in kg/ton), incinerated hazardous waste (e.g., measured in kg/ton), landfilled hazardous waste (e.g., measured in kg/ton), incinerated non-hazardous waste (e.g., measured in kg/ton), landfilled non-hazardous waste (e.g., measured in kg/ton), wastewater generated (e.g., measured in m3/ton), and/or water used (e.g., measured in m3/ton), among other possibilities, any of which may be used or produced by the manufacturing process.

The columns of the manufacturing process database table 106C may represent other types of data variables as well.

FIG. 2 further shows a fourth database table 106D, referred to as the "resource database table 106D," which may contain additional information about the types of resources that may be used or produced by manufacturing processes for food products.

Each row of the resource database table 106D may comprise a respective data record representing a respective type of resource that may be used or produced by process used to manufacture a food product (e.g., electric grid-sourced electricity, solar-sourced electricity, coal-sourced fuel, etc.). In turn, each column of the resource database table 106D may represent a different data variable that provides information about the respective types of resources represented by the rows of the resource database table 106D. There may be various types of data variables that are represented by the columns of the resource database table 106D.

A first type of data variable represented by the columns of the resource database table 106D may comprise an identifier of a resource that may be used or produced by a manufacturing process for a food product, such as a textual identifier for the type of resource. Such a textual identifier could take the form of a shorthand name of the type of resource, which may be referred to herein as the "resource name" for the type of resource. Some representative examples of resource names may include "electricity-grid," "electricity-solar," and "fuel-coal," among other possible resource names. Additionally or alternatively, such a textual identifier could take the form of a more detailed description of the resource, which may be referred to as a "resource description" for the type of resource. Some representative examples of resource descriptions may include "electricity, low voltage, photovoltaic, 570 kWp open ground installation, multi-Si, cut-off," and "heat, district or industrial, other than natural gas, heat production, heavy fuel oil, at industrial furnace 1MW, cut-off," among other possible resource descriptions.

A second type data variable may comprise an indication of a conversion factor that may be used to convert a measure of a type of resource from one unit to another. As some representative examples, a conversion factor for a given type of electricity (e.g., electricity-solar) could comprise a value for converting from GJ/ton to kWh/ton and a conversion factor for a given type of fuel (e.g., fuel-heavy fuel oil) could comprise a value for converting from GJ/ton to MJ/ton. The conversion factors may convert between other types of units as well.

The columns of the resource database table 106D may represent other types of data variables as well.

FIG. 2 further shows a fifth database table 106E, referred to as the "plants database table 106E," which may contain information regarding plants where food products are manufactured.

Each row of the plants database table 106E may comprise a respective data record representing a respective plant where food products are manufactured, and each column of the plants database table 106E may represent a different data variable that provides information about the respective plant represented by the rows of the plants database table 106E. There may be various types of data variables that are represented by the columns of the plants database table 106E.

A first type of data variable represented by the columns of the plants database table 106E may comprise an identifier (e.g., a textual identifier or numerical identifier) of a plant where a food product is manufactured, which may be referred to herein as the "plant identifier" of the plant. Such plant identifiers may take various forms, and as one possibility, the plant identifiers may identify the plants in terms of the city and state where the plants are located, such as Chicago, Illinois, San Antonio, Texas, etc. The plant identifiers may take various other forms as well.

A second type of data variable may comprise geographical coordinates of a plant where a food product is manufactured. In practice, there may be multiple different ones of this second type of data variable represented by the columns. For instance, one of this second type of data variable may comprise a latitude coordinate of the plant's location and may be represented by one column of the plants database table 106E, and another of this second type of data variable may comprise a longitude coordinate of the plant's location and may be represented by another column of the plants database table 106E.

A third type of data variable represented by the columns of the plants database table 106E may comprise an identifier of a type of electricity resource that may be utilized by a plant, such as a textual identifier for the type of electricity resource. Such a textual identifier could take the form of a shorthand name of the type of electricity resource, which may be referred to herein as the "resource name" for the type of resource. Some representative examples of resource names may include "electricity-grid Nigeria" and "electricity-grid_Czechia," among other possible resource names. Additionally or alternatively, such a textual identifier could take the form of a description of the type of electricity resource, which may be referred to as a "resource description" for the type of electricity resource. Some representative examples of resource descriptions may include "electricity, low voltage (Nigeria), market for electricity, low voltage, cut-off" and "electricity, low voltage (Czechia), market for, cut-off," among other possible resource descriptions.

Notably, the types of electricity resources identified in the plants database table 106E are similar to the types of electricity resources identified in the resource database table 106D, but in practice, the types of electricity resources identified in the plants database table 106E may be more specific than the types of electricity resources identified in the resource database table 106D. For example, whereas the types of electricity resources identified in the resource database table 106D may be applicable across multiple manufacturing locations, the types of electricity resources identified in the resource database table 106D may be applicable to a specific manufacturing location—such as a specific country. As described in further detail below, the data pipelines may at times use this more-specific identification of the type of electricity resource utilized by a manufacturing plant when calculating the resource-level environmental impact indicators.

The columns of the plants database table 106E may represent other types of data variables as well.

FIG. 2 further shows a sixth database table 106F, referred to as the "source locations database table 106F," which may contain information about source locations for ingredients.

Each row of the source locations database table 106F may comprise a respective data record representing a respective geographical location (e.g., a respective country) from where an ingredient may be sourced, and each column of the source locations database table 106F may represent different data variables that provide information about the respective geographical locations represented by the rows of the source locations database table 106F. There may be various types of data variables that are represented by the columns of the source locations database table 106F.

A first type of data variable represented by the columns of the source locations database table 106F may comprise an identifier of a geographical location (e.g., the country) from where an ingredient may be sourced, such as a textual identifier, which may be referred to herein as the "origin" of an ingredient. Some representative examples of origins may include Germany and Canada, among other possible origins.

A second type of data variable may comprise geographical coordinates associated with the origin. In practice, there may be multiple different ones of this second type of data variable represented by the columns. For instance, one of this second type of data variable may comprise a latitude coordinate of the origin and may be represented by one column of the source locations database table 106F, and another of this second type of data variable may comprise a longitude coordinate of the origin and may be represented by another column of the source locations database table 106F.

The columns of the source locations database table 106F may represent other types of data variables as well.

FIG. 2 further shows a seventh database table 106G, referred to as the "transportation database table 106G," which may contain information about different types of transportation modes that may be used to transport ingredients (e.g., from respective origins of ingredients to respective plant locations).

Each row of the transportation database table 106G may comprise a respective data record representing a respective type of transportation mode for ingredients, and each column of the transportation database table 106G may represent different data variables that provide information about the respective types of transportation modes represented by the rows of the transportation database table 106G. There may be various types of data variables that are represented by the columns of the transportation database table 106G.

A first type of data variable represented by the columns of the transportation database table 106G may comprise an identifier of a type of transportation mode that may be used to transport ingredients, such as a textual identifier, which may be referred to herein as a "transportation mode" indicator. In practice, the value of this transportation mode indicator may have one or both of the following components: (i) an indication of whether the transportation mode involves transporting ingredients by land, by air, or by sea, and (ii) an indication of whether the transportation mode involves transporting ingredients in a dry shipping container or in a refrigerated shipping container.

A second type data variable may comprise an indication of a distance factor that may be used in determining logistics-level environmental impact indicators based on the type of transportation mode that is used to transport ingredients.

The columns of the transportation database table 106G may represent other types of data variables as well.

FIG. 2 further shows an eighth database table 106H, referred to as the "environmental impact database table 106H," which may contain environmental impact values for various elements that may contribute to a food product's impact on the environment across different lifecycles, which may be referred to herein as "environmental-impact contributors." These environmental-impact contributors could include (i) the ingredients that may be included in a food product, (ii) the resources that may be used or produced during the process of manufacturing a food product, and/or (iii) the transportation mode(s) that are used to transport ingredients for a food product, among other possible examples of environmental-impact contributors.

Each row of the environmental impact database table 106H may comprise a respective data record representing a given environmental-impact contributor, and one column of the environmental impact database table 106H may represent an identifier of an environmental-impact contributor, such as a textual identifier of the environmental-impact contributor (e.g., a name of an ingredient, resource, transportation mode, etc.), which may be referred to herein as the "contributor name" for the environmental-impact contributor. In turn, the other columns of the environmental impact database table 106H may each represent a respective environmental-impact value that quantifies how much of a respective category of environmental impact is produced by a given unit of an environmental-impact contributor. Some example environmental-impact values that may be represented by these other columns may include per-unit measures of: an amount of total climate impact associated with an environmental-impact contributor, an amount of cancerous human toxicity associated with the environmental-impact contributor, and an amount of land use associated with the environmental-impact contributor, although in practice, it should be understood that the environmental impact database table 106H may include columns that contain at least one environmental-impact value for each category of environmental impact indicators that is to be determined by the disclosed data pipelines (e.g., columns for at least 16 environmental-impact values corresponding to the 16 categories of environmental impact indicators discussed above).

The columns of the environmental impact database table 106H may represent other types of information about environmental-impact contributors as well.

Figure 3:
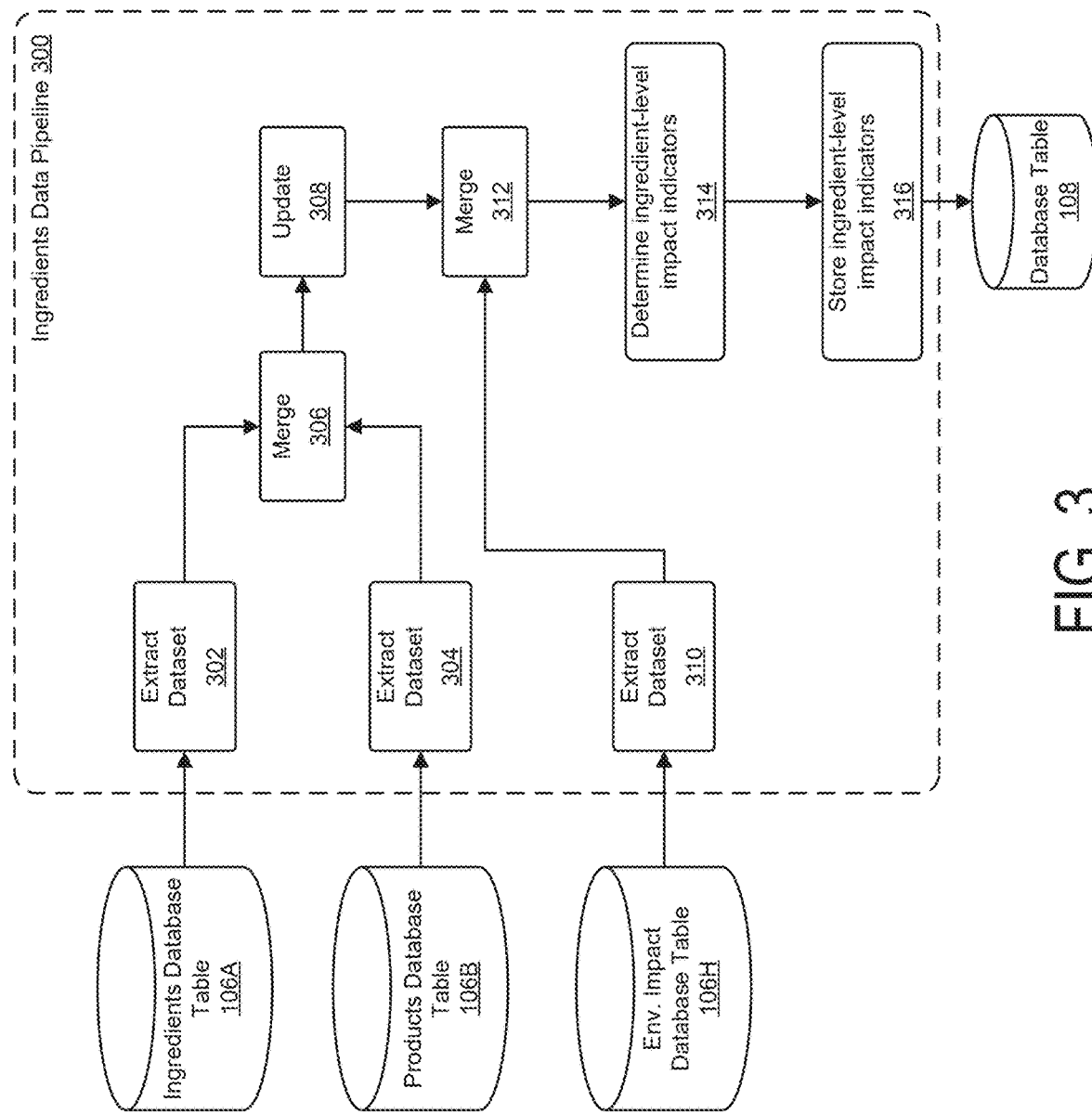
FIG. 3 is a diagram that illustrates one example of an ingredients data pipeline that is utilized to determine ingredient-level environmental impact indicators, in accordance with the present disclosure.

FIG. 3 is a diagram that illustrates functionality that may be carried out by a first example data pipeline that is configured to determine ingredient-level environmental impact indicators based on source data from three different database tables: the ingredients database table 106A, the products database table 106B, and the environmental impact database table 106H. This first example data pipeline may be referred to herein as the "ingredients data pipeline 300."

As shown at block 302 of FIG. 3, the ingredients data pipeline 300 may begin by extracting a first source dataset from the ingredients database table 106A. This functionality of extracting the first source dataset from the ingredients database table 106A may take any of various forms.

As one possibility, the functionality of extracting the first source dataset from the ingredients database table 106A may involve (i) loading a copy of the ingredients database table 106A (e.g., by accessing a local or remote data store) and (ii) reducing the columns included in the loaded copy of the ingredients database table 106A down to a given subset of columns that are to be utilized for determining the ingredient-level environmental impact indicators, such as by deleting columns from the loaded copy that are not to be utilized for determining the ingredient-level environmental impact indicators. Additionally, the functionality of extracting the first source dataset from the ingredients database table 106A may optionally involve removing certain rows from the loaded copy of the ingredients database table 106A that are not to be utilized for determining the ingredient-level environmental impact indicators, such as rows that do not contain a complete and valid set of data for the given set of columns (e.g., rows that have missing or invalid data values for one or more of the columns). Additionally yet, the functionality of extracting the first source dataset from the ingredients database table 106A may optionally involve performing other cleaning operations on the loaded copy of the ingredients database table 106A, such as renaming certain columns of the loaded copy, converting data values within certain columns into different formats, etc.

The functionality of extracting the first source dataset from the ingredients database table 106A may take other forms as well.

Figure 4A:
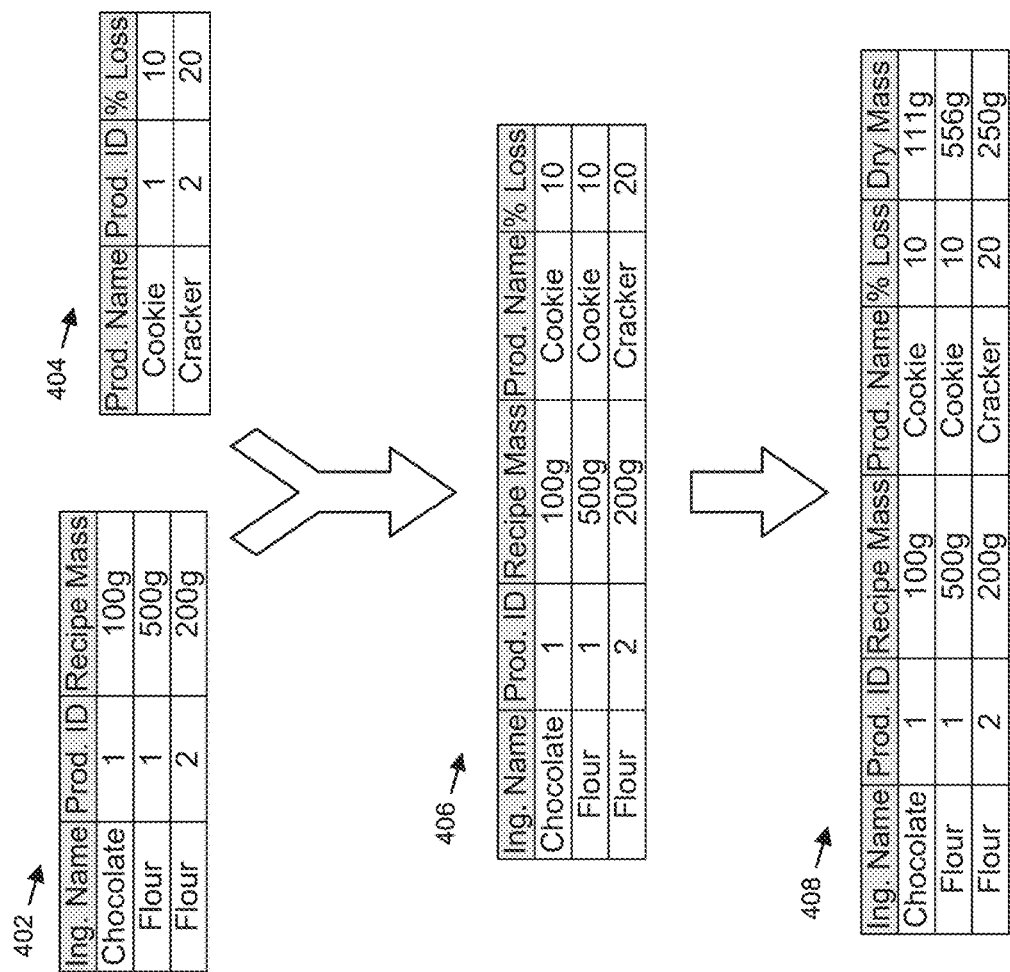
FIG. 4A shows a simplified example to illustrate functionality carried out by a given computing platform in order to merge extracted datasets into a first merged dataset, in accordance with the present disclosure.

FIG. 4A depicts a simplified illustration of one possible example of the first source dataset that may be extracted from the ingredients database table 106A, which is shown as example first source dataset 402. As shown, the example first source dataset 402 may include rows that represent product-level ingredients, of which 3 representative examples are shown in FIG. 4A: (i) chocolate in a first food product, (ii) flour in the first food product, and (iii) flour in a second food product. (While the example first source dataset 402 is shown to include 3 rows, it should be understood that this is merely for purposes of illustration and that in practice, the example first source dataset 402 is likely to included hundreds or thousands of rows). Additionally, as shown, the example first source dataset 402 may include at least 3 columns: (i) an "Ing. Name" column, which may contain column-level data comprising respective names of the listed product-level ingredients, (ii) a "Prod. ID" column, which may contain column-level data comprising respective numeric identifiers of the food products in which the listed product-level ingredients are included, and (iii) a "Recipe Mass" column, which may contain column-level data comprising respective amounts of the listed product-level ingredients that are included in their respective food products.

The first source dataset may take various other forms as well—including but not limited to the possibility that the first source dataset may contain a different subset of columns from the ingredients database table 106A and/or that the rows and/or columns may be arranged in a different order, among other possibilities.

Returning to FIG. 3, at block 304, the ingredients data pipeline 300 may extract a second source dataset from the products database table 106B. This functionality of extracting the second source dataset from the products database table 106B may take any of various forms.

As one possibility, the functionality of extracting the second source dataset from the products database table 106B may involve (i) loading a copy of the products database table 106B, (ii) reducing the columns included in the loaded copy of the products database table 106B down to a given subset of columns that are to be utilized for calculating the ingredient-level environmental impact indicators (e.g., by deleting the other columns that will not be utilized from the loaded copy), (iii) optionally removing certain rows included in the loaded copy of the products database table 106B (e.g., rows that do not contain a complete and valid set of data for the given set of columns), and (iv) optionally performing other cleaning operations on the loaded copy of the products database table 106B (e.g., renaming columns, converting data values into different formats, etc.).

The functionality of extracting the second source dataset from the products database table 106B may take other forms as well.

Turning again to FIG. 4A, a simplified illustration of one possible example of the second source dataset that may be extracted from the products database table 106B is also depicted, which is shown as example second source dataset 404. As shown, the example second source dataset 404 may include rows that represent food products, of which two representative examples are shown in FIG. 4A: (i) a "cookie" food product and (ii) a "cracker" food product. (While the example second source dataset 404 is shown to include 2 rows, it should be understood that this is merely for purposes of illustration and that in practice, the example second source dataset 404 is likely to include tens or hundreds of rows). Additionally, as shown, the example second source dataset 404 may include at least 3 columns: (i) a "Prod. Name" column, which may contain column-level data comprising respective names of the listed food products, (ii) a "Prod. ID" column, which may contain column-level data comprising respective numeric identifiers of the listed food products, and (iii) a "% Loss" column, which may contain column-level data comprising respective measures of the amount of moisture that is lost from the listed food products during manufacturing.

The second source dataset may take various other forms as well—including but not limited to the possibility that the second source dataset may contain a different subset of columns from the products database table 106B and/or that the rows and/or columns may be arranged in a different order, among other possibilities.

Returning again to FIG. 3, at block 306, the ingredients data pipeline 300 may merge the first source dataset and the second source dataset into a first merged dataset. The functionality of merging the first source dataset and the second source dataset may take any of various forms.

As one possibility, the ingredients data pipeline 300 may merge the first source dataset and the second source dataset by performing a left join operation using the first source dataset as the left table, the second source dataset as the right table, and a common data variable representing an identifier of a food product (e.g., a numeric product ID) as the key for joining the first and second source datasets, which may produce a first merged dataset in which (i) the rows represent the same set of product-level ingredients that were represented by the rows of the first source dataset and (ii) the columns represent both the data variables from the first source dataset (i.e., data variables that provide information about identified ingredients for identified food products) and the data variables from the second source dataset (i.e., data variables that provide information about identified food products). In this respect, the first merged dataset may comprise a respective data record for each product-level ingredient listed in the first source dataset that includes (i) the same column-level data for the product-level ingredient that was included in the first source dataset as well as (ii) additional column-level data that was included in the second source dataset for the product-level ingredient's identified food product (to the extent that the second source dataset includes a data record for the identified food product). Or in other words, the first merged dataset may include the same data records that were included in the first source dataset, but those data records may be supplemented with additional column-level data from the second source dataset.

To illustrate, consider a simplified example where (i) one row of the first source dataset comprises a data record for a given product-level ingredient of a given food product that includes values for 3 column-level data variables that provide information about the given product-level ingredient, one of which is an identifier of the given food product, and (ii) another row of the second source dataset comprises a data record for the given food product that includes an identifier of the given food product as well as values for 2 other column-level data variables that provide information about the given food product. In such an example, the first merged dataset produced by the left join operation will comprise a data record for the given product-level ingredient of the given food product that includes (i) values for 3 column-level data variables that were included in the original data record from the first source dataset along with (ii) values for the 2 other column-level data variables from the given food product's data record in the second source dataset.

The functionality of merging the first source dataset and the second source dataset may take other forms as well.

Turning again at FIG. 4A, a simplified illustration of one possible example of the first merged dataset (shown as example first merged dataset 406) that may be that may be produced by merging the example first source dataset 402 and the example second source dataset 404 using the "product ID" data variable as the key is depicted. As shown, the example first merged dataset 406 comprises a respective data record for each product-level ingredient listed in the first source dataset 402 that includes (i) the same column-level data for the product-level ingredient that was included in the example first source dataset 402 (e.g., values for the "ingredient name," "product ID," and "recipe mass" data variables) as well as (ii) additional column-level data for the product-level ingredient's identified food product that was included in the example second source dataset 404 (e.g., values for the "product name" and "% moisture loss" data variables). For instance, the first row of the example first merged dataset 406 is a merged data record for chocolate as used in a cookies product, which has a "product ID" value of "1," and that data record includes both (i) the column-level data for the chocolate as used in the cookies product that was included the example first source dataset 402 (e.g., values for the "ingredient name," "product ID," and "recipe mass" data variables) and (ii) additional column-level data for the cookies product that was included in the example second source dataset 404 (e.g., values for the "product name" and "% moisture loss" data variables). (While the example first merged dataset 406 is shown to include 3 rows, it should be understood that this is merely for purposes of illustration and that in practice, the example first merged dataset 406 is likely to included hundreds or thousands of rows).

However, it should be understood that if the example second source dataset 404 does not include a data record for a product-level ingredient's identified food product, then the merged data record for the product-level ingredient will only include column-level data from the example first source dataset 402, and the columns representing the data variables from the example second source dataset 404 will contain null values.

The first merged dataset may take various other forms as well—including but not limited to the possibility that the first merged dataset may contain different columns (e.g., from the ingredients database table 106A and/or the products database table 106B) and/or that the rows and/or columns may be arranged in a different order, among other possibilities.

After merging the first and second source datasets into the first merged dataset, the ingredients data pipeline 300 may optionally perform certain cleaning operations on the first merged dataset. For example, the ingredients data pipeline 300 may delete certain columns from the first merged dataset, such as duplicate columns or other columns that are not to be utilized to determine the ingredient-level environmental impact indicators, and/or may remove certain rows from the first merged dataset, such as rows that do not have a complete and valid set of data for the set of columns included in the first merged dataset, among other possibilities. In such implementations where the first merged dataset is cleaned, then the output of that operation will still be referred to herein as the "first merged dataset," such that references to the "first merged dataset" below will be understood to apply to either the original first merged dataset (in implementations where no cleaning is performed) or a cleaned version thereof (in implementations where cleaning is performed).

Returning again to FIG. 3, at block 308, the ingredients data pipeline 300 may update the first merged dataset by adding a new column representing a new data variable that comprises a measure of the mass of a product-level ingredient within its corresponding food product on a dry basis (i.e., after any moisture of the product-level ingredient has been removed during the manufacturing process of the corresponding food product). This new data variable may be referred to herein as the "dry mass."

The ingredients data pipeline 300 may determine the values for this new "dry mass" column based on the values for the "% moisture loss" and the "recipe mass" columns of the first merged dataset. For instance, the dry mass of a given product-level ingredient represented within the first merged dataset may be determined by dividing the recipe mass of the given product-level ingredient by a value comprising the difference between 1 and the % moisture loss of the given product-level ingredient (i.e., recipe mass/(1−% moisture loss)), wherein the % moisture loss may be represented in decimal form (e.g., 0.1 instead of 10%, 0.2 instead of 20%, etc.). The dry mass may be calculated in other manners as well.

Turning again to FIG. 4A, a simplified illustration of one possible example of a first merged dataset that has been updated to include dry mass values (which is shown as example first merged dataset 408) is depicted. As shown, the example first merged dataset 408 comprises the same rows and columns as the example first merged dataset 406, as well as an additional "Dry Mass" column that includes the determined dry mass values for the listed product-level ingredients. (While the example first merged dataset 408 is shown to include 3 rows, it should be understood that this is merely for purposes of illustration and that in practice, the example first merged dataset 408 is likely to included hundreds or thousands of rows).

The updated version of the first merged dataset with the dry mass values may take various other forms as well—including but not limited to the possibility that the first merged dataset may contain different columns (e.g., from the ingredients database table 106A and/or the products database table 106B) and/or that the rows and/or columns may be arranged in a different order, among other possibilities.

Returning again to FIG. 3, at block 310, the ingredients data pipeline 300 may extract a third source dataset from the environmental impact database table 106H. This functionality of extracting the third source dataset from the environmental impact database table 106H may take any of various forms.

As one possibility, the functionality of extracting the third source dataset from the ingredients database table 106A may involve (i) loading a copy of the environmental impact database table 106H, (ii) reducing the columns included in the loaded copy of the environmental impact database table 106H down to a given subset of columns that are to be utilized for calculating the ingredient-level environmental impact indicators (e.g., by deleting the other columns that will not be utilized from the loaded copy), (iii) optionally removing certain rows included in the loaded copy of the environmental impact database table 106H (e.g., rows that will not be utilized or that do not contain a complete and valid set of data for the given set of columns), and (iv) optionally performing other cleaning operations on the loaded copy of the environmental impact database table 106H (e.g., renaming columns, converting data values into different formats, etc.).

In this respect, the particular environmental-impact-value columns that are included in the third source dataset may depend on (i) which ones of the environmental impact indicators are to be determined and (ii) which of the environmental-impact-value columns from the environmental impact database table 106H contain values that are to be used to determine those ones of the ingredient-level environmental impact indicators. For example, if the ingredients data pipeline 300 is to determine all 16 categories of the environmental impact indicator for the product-level ingredients, then the third source dataset may include at least one environmental-impact-value column (and perhaps multiple environmental-impact-value columns) corresponding to each of the 16 categories of environmental impact indicators.

The functionality of extracting the third source dataset from the environmental impact database table 106H may take other forms as well.

Figure 4B:
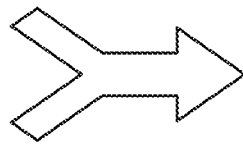
FIG. 4B shows a simplified example to illustrate functionality carried out by a given computing platform in order to merge the first merged dataset and an extracted dataset into a second merged dataset, in accordance with the present disclosure.

FIG. 4B depicts a simplified illustration of one possible example of the third source dataset that may be extracted from the environmental impact database table 106H, which is shown as example third source dataset 410. As shown, the example third source dataset 410 may include rows that represent environmental-impact contributors, of which 2 representative examples are shown in FIG. 4B: chocolate and flour. (While the example third source dataset 410 is shown to include 2 rows, it should be understood that this is merely for purposes of illustration and that in practice, the example third source dataset 410 is likely to included hundreds or thousands of rows.) Additionally, as shown, the example third source dataset 410 may include: (i) a "Contributor" column, which may contain column-level data comprising respective names of the listed environmental-impact contributors, and (ii) a plurality of columns $EI_1$ to $EI_n$ that represent different environmental-impact values, where each such column contains column-level data comprising respective values that quantify how much of a given category of environmental impact is produced per unit of the listed environmental-impact contributors. In this respect, as noted above, the particular environmental-impact values that are included in the example third source dataset 410 may depend on (i) which ones of the environmental impact indicators are to be determined and (ii) which of the environmental-impact values from the environmental impact database table 106H contain values that are to be used to determine those ones of the ingredient-level environmental impact indicators.

The third source dataset may take various other forms as well—including but not limited to the possibility that the third source dataset may contain a different subset of columns from the environmental impact database table 106H and/or that the rows and/or columns may be arranged in a different order, among other possibilities.

Returning again to FIG. 3, at block 312, the ingredients data pipeline 300 may merge the first merged dataset and the third source dataset into a second merged dataset. The functionality of merging the first merged dataset and the third source dataset may take any of various forms.

As one possibility, the ingredients data pipeline 300 may merge the first merged dataset and the third source dataset by performing a left join operation using the first merged dataset as the left table, the third source dataset as the right table, and a common data variable representing an identifier of a food product (e.g., the "ingredient name" data variable of the first merged dataset and the "contributor name" data variable of the third source dataset) as the key for joining the first merged dataset and the third source dataset, which may produce a second merged dataset in which (i) the rows represent the same set of product-level ingredients that were represented by the rows of the first merged dataset and (ii) the columns represent both the data variables from the first merged dataset and the data variables from the third source dataset (i.e., data variables that provide information about various environmental-impact values for environmental-impact contributors corresponding to the identified product-level ingredients). In this respect, the second merged dataset may comprise a respective data record for each product-level ingredient listed in the first merged dataset that includes (i) the same column-level data for the product-level ingredient that was included in the first merged dataset as well as (ii) additional column-level data that was included in the third source dataset for an environmental-impact contributor that corresponds to the product-level ingredient (to the extent that the third source dataset includes a data record for an environmental-impact contributor that corresponds to the identified product-level ingredient). Or in other words, the second merged dataset may include the same data records that were included in the first merged dataset, but those data records may be supplemented with additional column-level data from the third source dataset.

To illustrate, consider a simplified example where (i) one row of the first merged dataset comprises a data record for a given product-level ingredient that includes values for 6 column-level data variables that provide information about the given product-level ingredient, one of which is an identifier of the given product-level ingredient (e.g., the "chocolate" value of the "ingredient name" data variable), and (ii) another row of the third source dataset comprises a data record for a given environmental-impact contributor that corresponds to the given product-level ingredient that includes an identifier of the given environmental-impact contributor (e.g., the "chocolate" value of the "contributor name" data variable). In such an example, the second merged dataset produced by the left join operation will comprise a data record for the given product-level ingredient that includes (i) values for the 6 column-level data variables that were included in the original data record from the first merged dataset along with (ii) values for the column-level data variables that provide information about environmental-impact values from the given environmental-impact contributor's data record in the third source dataset.

The functionality of merging the first merged dataset and the third source dataset may take other forms as well.

Turning again at FIG. 4B, a simplified illustration of one possible example of the second merged dataset (which is shown as example second merged dataset 412) that may be produced by merging the example first merged dataset 408 and the example third source dataset 410 using a combination of the "ingredient name" data variable from the example first merged dataset 408 and the "contributor name" data variable from the example third source dataset 410 as the key is also depicted. As shown, the example second merged dataset 412 comprises a data record for each respective product-level ingredient listed in the first merged dataset 408 that includes (i) the same column-level data for the product-level ingredient that was included in the example first merged dataset 408 (e.g., values for the "ingredient name," "product ID," "recipe mass," "product name," "% moisture loss," and "dry mass" data variables) as well as (ii) additional column-level data for the product-level ingredient that was included in the example third source dataset 410 (e.g., values for the $EI_1$ to $EI_n$ data variables).

For instance, the first row of the example second merged dataset 412 is a merged data record for a chocolate ingredient as used in a cookies product, and that data record includes both (i) the column-level data for the chocolate ingredient as used in the cookies product that was included the example first merged dataset 408 (e.g., values for the "ingredient name," "product ID," "recipe mass," "product name," "% moisture loss," and "dry mass" data variables) and (ii) additional column-level data for the chocolate ingredient that was included in the example third source dataset 410 (e.g., values for the $EI_1$ to $EI_n$ data variables). (While the example second merged dataset 412 is shown to include 3 rows, it should be understood that this is merely for purposes of illustration and that in practice, the example second merged dataset 412 is likely to included hundreds or thousands of rows.)

However, it should be understood that if the example third source dataset 410 does not include a data record for a given ingredient, then any merged data record for the product-level ingredients comprising the given ingredient will only include column-level data from the example first merged dataset 408, and the columns representing the data variables from the example third source dataset 410 will contain null values.

The second merged dataset may take various other forms as well—including but not limited to the possibility that the second merged dataset may contain a different subset of columns (e.g., from the first merged dataset and/or the environmental impact database table 106H), and/or that the rows and/or columns may be arranged in a different order, among other possibilities.

After merging the first merged dataset and the third source dataset into the second merged dataset, the ingredients data pipeline 300 may optionally perform certain cleaning operations on the second merged dataset. For example, the ingredients data pipeline 300 may delete certain columns from the second merged dataset, such as duplicate columns or other columns that will not be utilized, and/or may remove certain rows from the second merged dataset, such as rows that will not be utilized or that do not have a complete and valid set of data for the set of columns included in the second merged dataset, among other possibilities. In such implementations where the second merged dataset is cleaned, then the output of that operation will still be referred to herein as the "second merged dataset" such that references to the "second merged dataset" below will be understood to apply to either the original second merged dataset (in implementations where no cleaning is performed) or a cleaned version thereof (in implementations where cleaning is performed).

Returning to FIG. 3, after merging the first merged dataset and the third source dataset into the second merged dataset, then at block 314 the ingredients data pipeline 300 may determine ingredient-level environmental impact indicators based on the second merged dataset.

The ingredient-level environmental impact indicators that may be determined may include, for each product-level ingredient listed in the second merged dataset, values for the 16 categories of environmental impact indicators previously described. As one possibility, the ingredient-level environmental impact indicators may include, for each listed product-level ingredient, all 16 categories of environmental impact indicators. As another possibility, the ingredient-level environmental impact indicators may include a subset of the 16 categories of environmental impact indicators for each listed product-level ingredient, and in some implementations, different subsets of the 16 categories of environmental impact indicators may be determined for different of the listed product-level ingredients. Various other possibilities may also exist.

Further, to determine the respective value of each ingredient-level environmental impact indicator for a given product-level ingredient, the ingredients data pipeline 300 may (i) identify the environmental-impact value in the given product-level ingredient's row that corresponds to the ingredient-level environmental impact indicator (i.e., the environmental-impact value within the column that corresponds to the ingredient-level environmental impact indicator) and (ii) multiply the identified environmental-impact value by the value for the dry mass of the given product-level ingredient. However, the functionality for determining the respective value of an ingredient-level environmental impact indicator for a given product-level ingredient may take other forms as well—including but not limited to the possibility that the identified environmental-impact value may be transformed in some way before being multiplied by the value for the dry mass of the given product-level ingredient and/or that multiple environmental-impact values for the ingredient-level environmental impact indicator may be identified and combined together into a single value before being multiplied by the value for the dry mass of the given product-level ingredient.

The values of the ingredient-level environmental impact indicators for product-level ingredients may be determined in various other ways as well.

Lastly, at block 316, the ingredients data pipeline 300 may store the ingredient-level environmental impact indicators into a database table, such as the database table 108 of the back-end computing platform 102 shown in FIG. 1.

The functionality that is carried out the ingredients data pipeline 300 may take various other forms as well.

Further, in practice, the ingredients data pipeline 300 may carry out the foregoing functionality at any of various times. For instance, as one possibility, the ingredients data pipeline 300 may carry out the foregoing functionality periodically according to a schedule or the like (e.g., daily, weekly, etc.). As another possibility, the ingredients data pipeline 300 may carry out the foregoing functionality in response to any of various triggering events, examples of which may include an indication that the source data contained within the relevant database tables has changed and/or an indication that there has been a new request by a user to access and view ingredient-level environmental impact indicators, among other possible examples.

Figure 5:
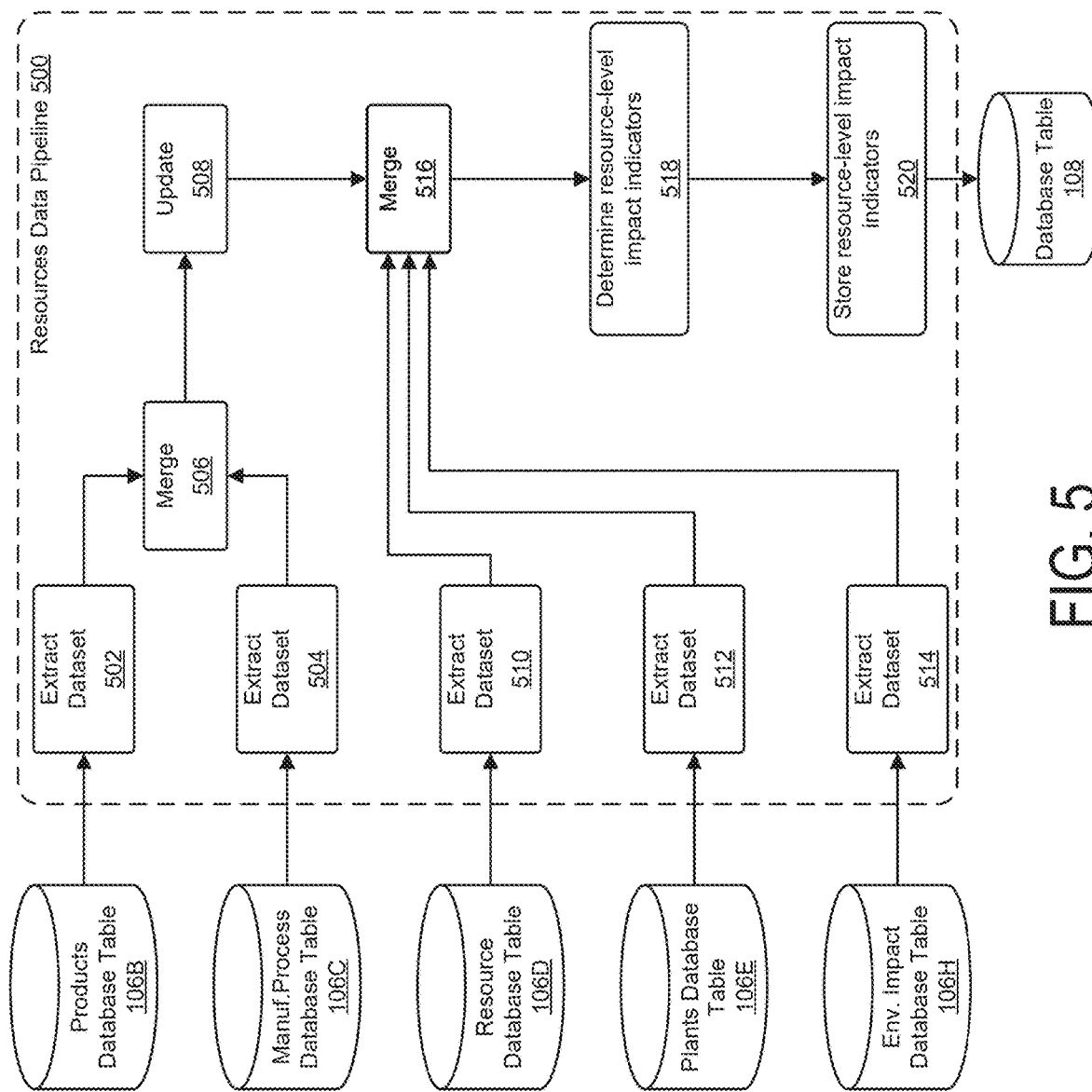
FIG. 5 is a diagram that illustrates one example of a resource data pipeline that is utilized to determine resource-level environmental impact indicators, in accordance with the present disclosure.

FIG. 5 is a diagram that illustrates functionality that may be carried out by a second example data pipeline that is configured to determine resource-level environmental impact indicators based on source data from five different database tables: the products database table 106B, the manufacturing process database table 106C, the resource database table 106D, the plants database table 106E, and the environmental impact database table 106H. This second example data pipeline may be referred to herein as the "resources data pipeline 500."

As shown at block 502 of FIG. 5, the resources data pipeline 500 may begin by extracting a first source dataset from the products database table 106B. This functionality of extracting the first source dataset from the products database table 106B may take any of various forms.

As one possibility, the functionality of extracting the first source dataset from the products database table 106B may involve (i) loading a copy of the products database table 106B, (ii) reducing the columns included in the loaded copy of the products database table 106B down to a given subset of columns that are to be utilized for calculating the resource-level environmental impact indicators (e.g., by deleting the other columns that will not be utilized from the loaded copy), (iii) optionally removing certain rows included in the loaded copy of the products database table 106B (e.g., rows that do not contain a complete and valid set of data for the given set of columns), and (iv) optionally performing other cleaning operations on the loaded copy of the products database table 106B (e.g., renaming columns, converting data values into different formats, etc.).

The functionality of extracting the first source dataset from the products database table 106B may take other forms as well.

Figure 6A:
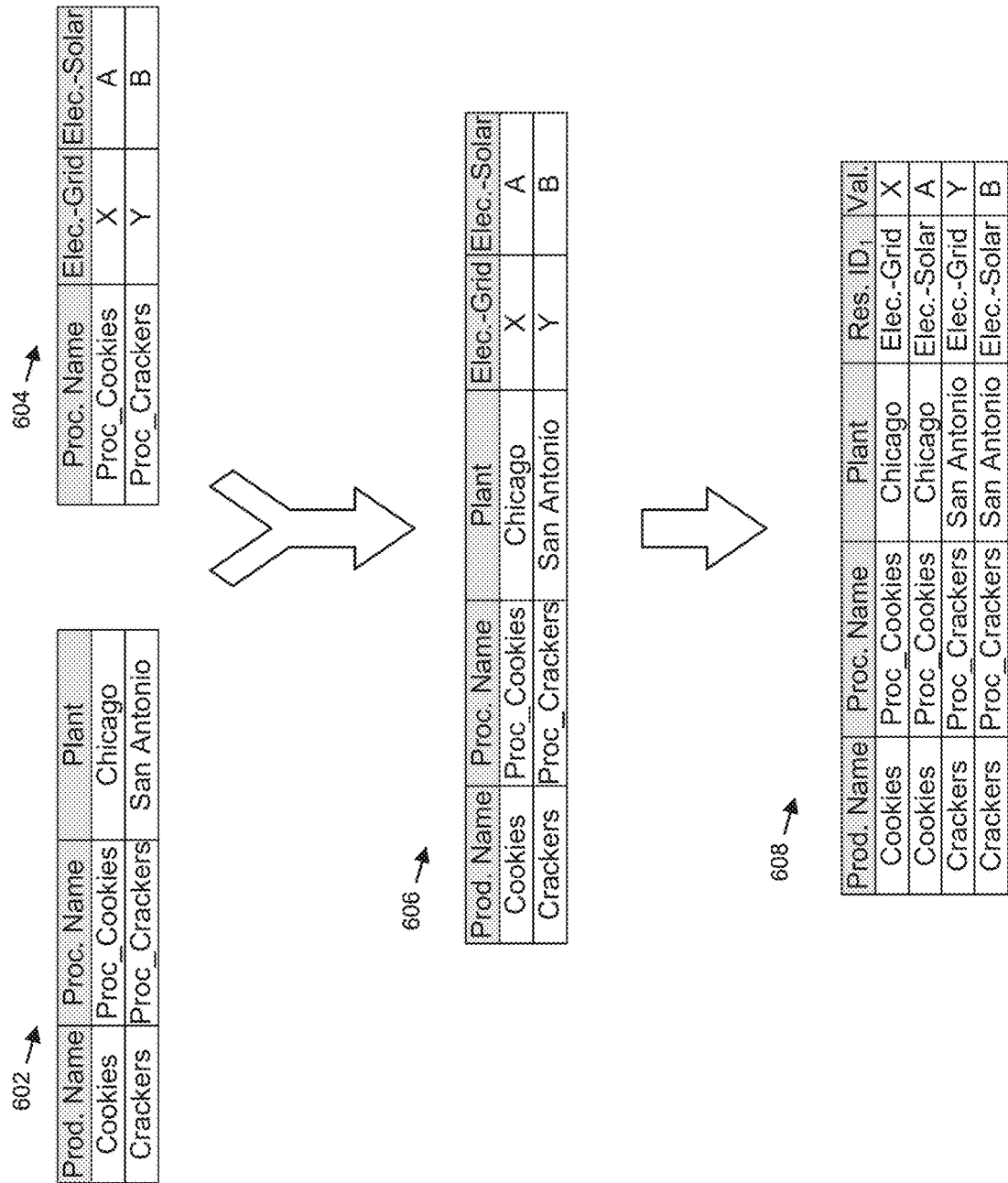
FIG. 6A shows a simplified example to illustrate functionality carried out by a given computing platform in order to merge extracted datasets into a first merged dataset, in accordance with the present disclosure.

FIG. 6A depicts a simplified illustration of one possible example of the first source dataset that may be extracted from the products database table 106B, which is shown as example first source dataset 602. As shown, the example first source dataset 602 may include rows that represent food products, of which 2 representative examples are shown in FIG. 6A: cookies and crackers. (While the example first source dataset 602 is shown to include 2 rows, it should be understood that this is merely for purposes of illustration and that in practice, the example first source dataset 602 is likely to included hundreds or thousands of rows). Additionally, as shown, the example first source dataset 602 may include at least 3 columns: (i) a "Prod. Name" column, which may contain column-level data comprising respective names of the listed food products, (ii) a "Proc. Name" column, which may contain column-level data comprising respective names of the manufacturing processes for the listed food products, and (iii) a "Plant" column, which may contain column-level data comprising respective plant identifiers for the plants where the listed food products are manufactured.

The first source dataset may take various other forms as well—including but not limited to the possibility that the first source dataset may contain a different subset of columns from the products database table 106B and/or that the rows and/or columns may be arranged in a different order, among other possibilities.

Returning to FIG. 5, at block 504, the resources data pipeline 500 may extract a second source dataset from the manufacturing process database table 106C. This functionality of extracting the second source dataset from the manufacturing process database table 106C may take any of various forms.

As one possibility, the functionality of extracting the second source dataset from the manufacturing process database table 106C may involve (i) loading a copy of the manufacturing process database table 106C, (ii) reducing the columns included in the loaded copy of the manufacturing process database table 106C down to a given subset of columns that are to be utilized for calculating the resource-level environmental impact indicators (e.g., by deleting the other columns that will not be utilized from the loaded copy), (iii) optionally removing certain rows included in the loaded copy of the manufacturing process database table 106C (e.g., rows that do not contain a complete and valid set of data for the given set of columns), and (iv) optionally performing other cleaning operations on the loaded copy of the manufacturing process database table 106C (e.g., renaming columns, converting data values into different formats, etc.).

The functionality of extracting the second source dataset from the manufacturing process database table 106C may take other forms as well.

Turning again to FIG. 6A, a simplified illustration of one possible example of the second source dataset that may be extracted from the manufacturing process database table 106C is also depicted, which is shown as example second source dataset 604. As shown, the example second source dataset 604 may include rows that represent manufacturing processes for food products, of which 2 representative examples are shown in FIG. 6A: a process used to manufacture a cookies product and a process used to manufacture a crackers product. (While the example second source dataset 604 is shown to include 2 rows, it should be understood that this is merely for purposes of illustration and that in practice, the example second source dataset 604 is likely to include tens or hundreds of rows). Additionally, as shown, the example second source dataset 604 may include at least 3 columns: (i) a "Proc. Name" column, which may contain column-level data comprising respective names of the listed manufacturing processes, (ii) an "Elec.-Grid" column, which may contain column-level data comprising respective measures of the amount of grid-sourced electricity that is used by the listed manufacturing processes, and (iii) an "Elec.-Solar" column, which may contain column-level data comprising respective measures of the amount of solar-sourced electricity that is used by the listed manufacturing processes The second source dataset may take various other forms as well—including but not limited to the possibility that the second source dataset may contain a different subset of columns from the manufacturing process database table 106C and/or that the rows and/or columns may be arranged in a different order, among other possibilities.

Returning again to FIG. 5, at block 506, the resources data pipeline 500 may merge the first source dataset and the second source dataset into a first merged dataset. The functionality of merging the first source dataset and the second source dataset may take any of various forms.

As one possibility, the resources data pipeline 500 may merge the first source dataset and the second source dataset by performing a left join operation using the first source dataset as the left table, the second source dataset as the right table, and a common data variable representing an identifier of a manufacturing process (e.g., a process name) as the key for joining the first and second source datasets, which may produce a first merged dataset in which (i) the rows represent the same set of food products that were represented by the rows of the first source dataset and (ii) the columns represent both the data variables from the first source dataset and the data variables from the second source dataset. In this respect, the first merged dataset may comprise a respective data record for each food product listed in the first source dataset that includes (i) the same column-level data for the food product that was included in the first source dataset as well as (ii) additional column-level data that was included in the second source dataset for the food product's manufacturing process (to the extent that the second source dataset includes a data record for the food product's manufacturing process). Or in other words, the first merged dataset may include the same data records that were included in the first source dataset, but those data records may be supplemented with additional column-level data from the second source dataset.

To illustrate, consider a simplified example where (i) one row of the first source dataset comprises a data record for a given food product that includes values for 3 column-level data variables that provide information about the given food product, one of which is an identifier of the given food product's manufacturing process, and (ii) another row of the second source dataset comprises a data record for the given food product's manufacturing process that includes an identifier of the manufacturing process as well as values for 2 other column-level data variables that provide information about the manufacturing process. In such an example, the first merged dataset produced by the left join operation will comprise a data record for the given food product that includes (i) values for 3 column-level data variables that were included in the original data record from the first source dataset along with (ii) values for the 2 other column-level data variables from the manufacturing process's data record in the second source dataset.

The functionality of merging the first source dataset and the second source dataset may take other forms as well.

Turning again at FIG. 6A, a simplified illustration of one possible example of the first merged dataset (shown as example first merged dataset 606) that may be that may be produced by merging the example first source dataset 602 and the example second source dataset 604 using the "process name" data variable as the key is depicted. As shown, the example first merged dataset 606 comprises a respective data record for each food product listed in the example first source dataset 602 that includes (i) the same column-level data for the food product that was included in the example first source dataset 602 (e.g., values for the "product name," "process name," and "plant" data variables) as well as (ii) additional column-level data for the food product that was included in the second source dataset 604 (e.g., a measure of the amount of grid-sourced electricity that is used by the food product's manufacturing process, as well as a measure of the amount of solar-sourced electricity that is used by the food product's manufacturing process). For instance, the first row of the example first merged dataset 606 is a merged data record for a cookies product, and that data record includes both (i) the column-level data for the cookies product that was included the example first source dataset 602 (e.g., values for the "product name," "process name," and "plant" data variables) and (ii) additional column-level data for the process used to manufacture the cookies product that was included in the example second source dataset 604 (e.g., values for the grid-sourced electricity and solar-sourced electricity variables). (While the example first merged dataset 606 is shown to include 2 rows, it should be understood that this is merely for purposes of illustration and that in practice, the example first merged dataset 606 is likely to included hundreds or thousands of rows).

However, it should be understood that if the example second source dataset 604 does not include a data record for a food product's manufacturing process, then the merged data record for the food product will only include column-level data from the example first source dataset 602, and the columns representing the data variables from the example second source dataset 604 will contain null values.

The first merged dataset may take various other forms as well—including but not limited to the possibility that the first merged dataset may contain different columns (e.g., from the products database table 106B and/or the manufacturing process database table 106C) and/or that the rows and/or columns may be arranged in a different order, among other possibilities.

After merging the first and second source datasets into the first merged dataset, the resources data pipeline 500 may optionally perform certain cleaning operations on the first merged dataset. For example, the resources data pipeline 500 may delete certain columns from the first merged dataset, such as duplicate columns or other columns that are not to be utilized to determine the resource-level environmental impact indicators, and/or may remove certain rows from the first merged dataset, such as rows that do not have a complete and valid set of data for the set of columns included in the first merged dataset, among other possibilities. In such implementations where the first merged dataset is cleaned, then the output of that operation will still be referred to herein as the "first merged dataset," such that references to the "first merged dataset" below will be understood to apply to either the original first merged dataset (in implementations where no cleaning is performed) or a cleaned version thereof (in implementations where cleaning is performed).

Returning again to FIG. 5, at block 508, the resources data pipeline 500 may update the first merged dataset by unpivoting a particular set of the columns of the first merged dataset. The particular set of the columns that may be unpivoted may be the columns that represent the amounts of the types of resources that are used or produced by the manufacturing processes for the listed food products of the first merged dataset.

To unpivot the particular set of columns of the first merged dataset, the resources data pipeline 500 may transform column-level data of the particular set of columns into row-level data, such that each data variable that was represented as a column of the particular set of columns is now represented as a respective row-level value for a first new column that is added to the first merged dataset. This first new column may represent a "resource" data variable, which describes the data variables that were previously represented as columns in the particular set of columns (e.g., resources that are used or produced by manufacturing processes for the food products listed in the first merged dataset). The resources data pipeline 500 may additionally add a second new column to the first merged dataset, which may represent a "value" data variable that comprises a respective amount of each resource that is used or produced by the manufacturing processes for the listed food products.

In conjunction with transforming the column-level data of the particular set of columns into row-level data, the resources data pipeline 500 may cause each food product's respective row within the first merged dataset to be replicated into a respective set of new rows for the food product to account for the fact that the particular set of columns have been unpivoted into rows (where the number of new rows in each respective set of new rows corresponds to the number of columns that are unpivoted). In this respect, each respective row within the set of new rows for a food product may include (i) the same column-level data as the original row for columns that were not unpivoted, (ii) a respective value within the first new column that comprises an identifier a respective resource used or produced by the manufacturing process for the food product, and (iii) a respective value within the second new column that comprises a measure of the amount of the respective resource used or produced by the manufacturing process for the food process. This may result in each food product's set of new rows comprising a respective row for each resource that is used or produced by the manufacturing process for the food product. In this way, each row of the first merged dataset may now be said to represent to a "product-level resource."

Turning again to FIG. 6A, a simplified illustration of one possible example of a first merged dataset that has been updated to unpivot the "Elec.-Grid" and "Elec.-Solar" columns of the first merged dataset (which is shown as example first merged dataset 608) is depicted. As shown, the example first merged dataset 608 comprises 3 of the same columns as the example first merged dataset 606, namely the "Prod. Name" column, the "Proc. Name" column, and the "Plant" column of the example first merged dataset 606, as well as two new columns, namely a "Resource" column that includes column-level data that identifies the listed product-level resources and a "Val." column that includes column-level data that provides a measure of the amount of each listed product-level resource that is used or produced by a manufacturing process. Further, to account for the fact that the "Elec.-Grid" and "Elec.-Solar" columns have been unpivoted into rows, the example first merged dataset 608 includes two new rows in place of each row that was originally included in the first merged dataset 606, where each of the new rows for a given food product (e.g., cookies or crackers) includes the same values for the first three columns as the original row for the given food product but then identifies a respective resource (either Elec.-Grid or Elec.-Solar) and provides a respective value for that respective resource. (While the example first merged dataset 608 is shown to include 4 rows, it should be understood that this is merely for purposes of illustration and that in practice, the example first merged dataset 608 is likely to included hundreds or thousands of rows).

The updated version of the first merged dataset may take various other forms as well—including but not limited to the possibility that the first merged dataset may contain different columns (e.g., from the products database table 106B and/or the manufacturing process database table 106C) and/or that the rows and/or columns may be arranged in a different order, among other possibilities.

Returning to FIG. 5, at block 510, the resources data pipeline 500 may extract a third source dataset from the resource database table 106D. This functionality of extracting the third source dataset from the resource database table 106D may take any of various forms.

As one possibility, the functionality of extracting the third source dataset from the resource database table 106D may involve (i) loading a copy of the resource database table 106D, (ii) reducing the columns included in the loaded copy of the resource database table 106D down to a given subset of columns that are to be utilized for calculating the resource-level environmental impact indicators (e.g., by deleting the other columns that will not be utilized from the loaded copy), (iii) optionally removing certain rows included in the loaded copy of the resource database table 106D (e.g., rows that do not contain a complete and valid set of data for the given set of columns), and (iv) optionally performing other cleaning operations on the loaded copy of the resource database table 106D (e.g., renaming columns, converting data values into different formats, etc.).

The functionality of extracting the third source dataset from the resource database table 106D may take other forms as well.

Figure 6B:
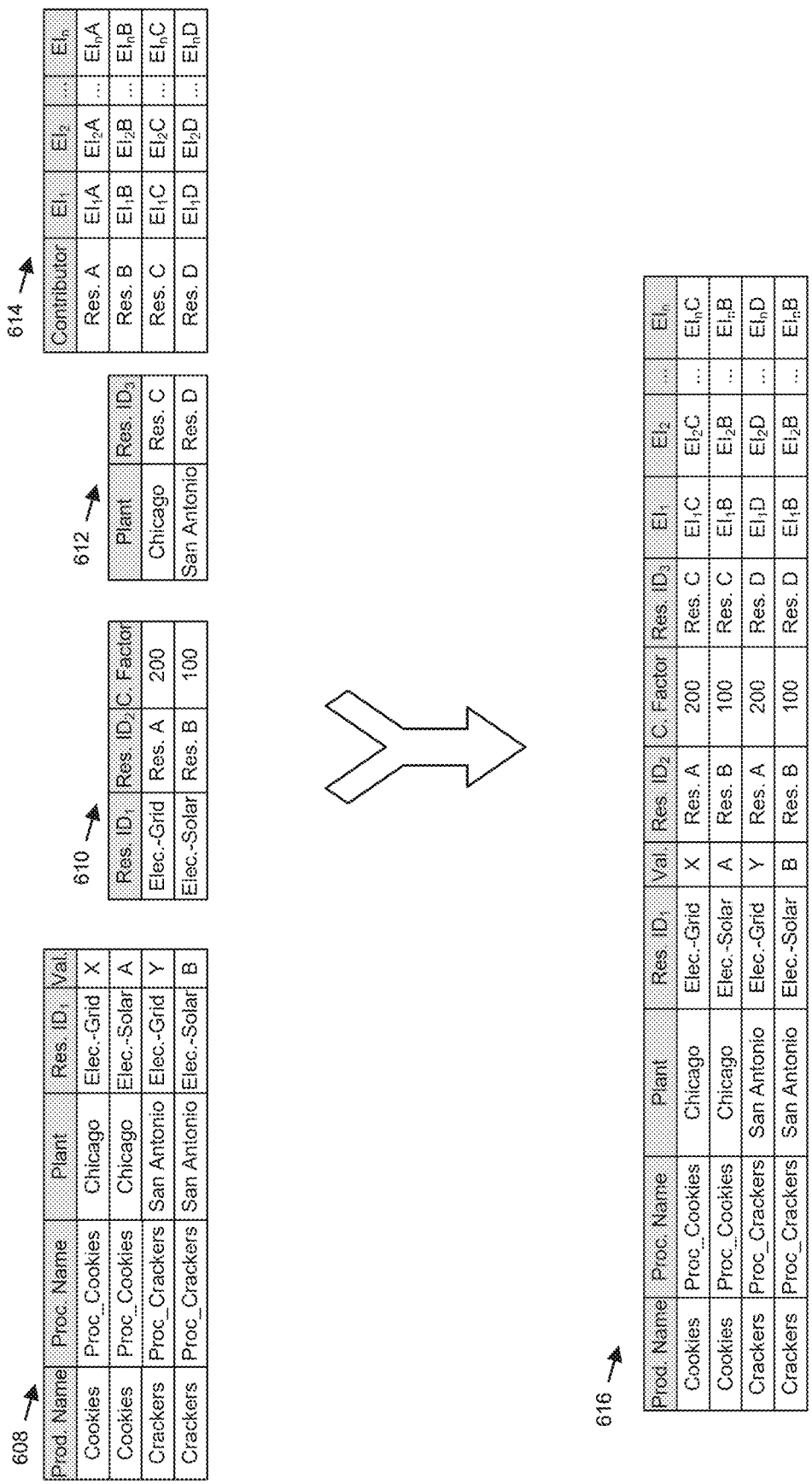
FIG. 6B shows a simplified example to illustrate functionality carried out by a given computing platform in order to merge the first merged dataset and other extracted datasets into a second merged dataset, in accordance with the present disclosure.

FIG. 6B depicts a simplified illustration of one possible example of the third source dataset that may be extracted from the resource database table 106D, which is shown as example third source dataset 610. As shown, the example third source dataset 610 may include rows that represent types of resources that may be used or produced by manufacturing processes, of which 2 representative examples are shown in FIG. 6B: (i) electricity sourced from an electric grid and (ii) electricity sourced from solar energy. (While the example third source dataset 610 is shown to include 2 rows, it should be understood that this is merely for purposes of illustration and that in practice, the example third source dataset 610 is likely to included hundreds or thousands of rows). Additionally, as shown, the example third source dataset 610 may include at least 3 columns: (i) a "Resource $ID_1$" column, which may contain column-level data comprising respective names of the types of resources that may be used or produced by manufacturing processes, (ii) an "Resource $ID_2$" column, which may contain column-level data comprising respective descriptions of the types of resources that may be used or produced by manufacturing processes, and (iii) a "C. Factor" column, which may contain column-level data comprising conversion factor values that may be used to convert a measure of a type of resource from one unit to another.

The third source dataset may take various other forms as well—including but not limited to the possibility that the third source dataset may contain a different subset of columns from the resource database table 106D and/or that the rows and/or columns may be arranged in a different order, among other possibilities.

Returning to FIG. 5, at block 512, the resources data pipeline 500 may extract a fourth source dataset from the plants database table 106E. This functionality of extracting the fourth source dataset from the plants database table 106E may take any of various forms.

As one possibility, the functionality of extracting the fourth source dataset from the plants database table 106E may involve (i) loading a copy of the plants database table 106E, (ii) reducing the columns included in the loaded copy of the plants database table 106E down to a given subset of columns that are to be utilized for calculating the resource-level environmental impact indicators (e.g., by deleting the other columns that will not be utilized from the loaded copy), (iii) optionally removing certain rows included in the loaded copy of the plants database table 106E (e.g., rows that do not contain a complete and valid set of data for the given set of columns), and (iv) optionally performing other cleaning operations on the loaded copy of the plants database table 106E (e.g., renaming columns, converting data values into different formats, etc.).

The functionality of extracting the fourth source dataset from the plants database table 106E may take other forms as well.

Turning again to FIG. 6B, a simplified illustration of one possible example of the fourth source dataset that may be extracted from the plants database table 106E is also depicted, which is shown as example fourth source dataset 612. As shown, the example fourth source dataset 612 may include rows that represent plants, of which two representative examples are shown in FIG. 6B: Chicago and San Antonio. (While the example fourth source dataset 612 is shown to include 2 rows, it should be understood that this is merely for purposes of illustration and that in practice, the example fourth source dataset 612 is likely to include tens or hundreds of rows). Additionally, as shown, the example fourth source dataset 612 may include at least 2 columns: (i) a "Plant" column, which may contain column-level data identifying respective plants, and (ii) an "Resource $ID_3$" column, which may contain column-level data comprising a name or description of the types of electricity resources that are utilized by the respective plants.

The fourth source dataset may take various other forms as well—including but not limited to the possibility that the fourth source dataset may contain a different subset of columns from the plants database table 106E and/or that the rows and/or columns may be arranged in a different order, among other possibilities.

Returning again to FIG. 5, at block 514, the resources data pipeline 500 may extract a fifth source dataset from the environmental impact database table 106H. This functionality of extracting the fifth source dataset from the environmental impact database table 106H may take any of various forms.

As one possibility, the functionality of extracting the fifth source dataset from the environmental impact database table 106H may involve (i) loading a copy of the environmental impact database table 106H, (ii) reducing the columns included in the loaded copy of the environmental impact database table 106H down to a given subset of columns that are to be utilized for calculating the resource-level environmental impact indicators (e.g., by deleting the other columns that will not be utilized from the loaded copy), (iii) optionally removing certain rows included in the loaded copy of the environmental impact database table 106H (e.g., rows that will not be utilized or that do not contain a complete and valid set of data for the given set of columns), and (iv) optionally performing other cleaning operations on the loaded copy of the environmental impact database table 106H (e.g., renaming columns, converting data values into different formats, etc.).

In this respect, the particular environmental-impact-value columns that are included in the fifth source dataset may depend on (i) which ones of the environmental impact indicators are to be determined and (ii) which of the environmental-impact-value columns from the environmental impact database table 106H contain values that are to be used to determine those ones of the resource-level environmental impact indicators. For example, if the resources data pipeline 500 is to determine all 16 categories of the environmental impact indicators for the product-level resources, then the fifth source dataset may include at least one environmental-impact-value column (and perhaps multiple environmental-impact-value columns) corresponding to each of the 16 categories of environmental impact indicators.

The functionality of extracting the fifth source dataset from the environmental impact database table 106H may take other forms as well.

Turning again to FIG. 6B, a simplified illustration of one possible example of the fifth source dataset that may be extracted from the environmental impact database table 106H is also depicted, which is shown as example fifth source dataset 614. As shown, the example fifth source dataset 614 may include rows that represent environmental-impact contributors, of which 4 representative examples are shown in FIG. 6B: Resource A, Resource B, Resource C, and Resource D. (While the example fifth source dataset 614 is shown to include 4 rows, it should be understood that this is merely for purposes of illustration and that in practice, the example fifth source dataset 614 is likely to included tens or hundreds of rows.) Additionally, as shown, the example fifth source dataset 614 may include: (i) a "Contributor" column, which may contain column-level data identifying the respective environmental-impact contributors (e.g., names or descriptions of the contributors) and (ii) a plurality of columns $EI_1$ to $EI_n$ that represent different environmental-impact values, where each such column contains column-level data comprising respective values that quantify how much of a given category of environmental impact is produced per unit of the listed environmental-impact contributors. In this respect, as noted above, the particular environmental-impact-value columns that are included in the example fifth source dataset 614 may depend on (i) which ones of the environmental impact indicators are to be determined and (ii) which of the environmental-impact-value columns from the environmental impact database table 106H contain values that are to be used to determine those ones of the resource-level environmental impact indicators.

The fifth source dataset may take various other forms as well—including but not limited to the possibility that the fifth source dataset may contain a different subset of columns from the environmental impact database table 106H and/or that the rows and/or columns may be arranged in a different order, among other possibilities.

Returning again to FIG. 5, at block 516, the resources data pipeline 500 may merge the first merged dataset, the third source dataset, the fourth source dataset, and the fifth source dataset into a second merged dataset. The functionality of merging these datasets may take any of various forms.

As one possibility, the resources data pipeline 500 may merge these datasets by first (i) merging the first merged source dataset and the third source dataset into a first intermediate merged dataset, then (ii) merging the first intermediate merged dataset and the fourth dataset into a second intermediate merged dataset, and finally (iii) merging the second intermediate merged dataset and the fifth source dataset into the second merged dataset.

The resources data pipeline 500 may merge the first merged dataset and the third source dataset into the first intermediate merged dataset by performing a left join operation using the first merged dataset as the left table, the third source dataset as the right table, and a common data variable representing an identifier of a type of resource (e.g., a resource name or resource description data variable that is found in both datasets) as the key for joining the first merged dataset and the third source dataset, which may produce a first intermediate merged dataset in which (i) the rows represent the same set of product-level resources that were represented by the rows of the first merged dataset and (ii) the columns represent both the data variables from the first merged dataset and the data variables from the third source dataset (i.e., data variables that provide information about the listed product-level resources). In this respect, the first intermediate merged dataset may comprise a respective data record for each product-level resource listed in the first merged dataset that includes (i) the same column-level data for the product-level resource that was included in the first merged dataset as well as (ii) additional column-level data that was included in the third source dataset for the product-level resource (to the extent that the third source dataset includes a data record for the product-level resource). Or in other words, the first intermediate merged dataset may include the same data records that were included in the first merged dataset, but those data records may be supplemented with additional column-level data from the third source dataset.

To illustrate, consider a simplified example where (i) one row of the first merged dataset comprises a data record for a given product-level resource that includes values for 5 column-level data variables that provide information about the given product-level resource, one of which is an identifier of the given product-level resource, and (ii) another row of the third source dataset comprises a data record for the given product-level resource that includes an identifier of the given product-level resource as well as values for 2 other column-level data variables that provide information about the given product-level resource. In such an example, the first intermediate merged dataset produced by the left join operation will comprise a data record for the given product-level resource that includes (i) values for the 5 column-level data variables that were included in the original data record from the first merged dataset along with (ii) values for the 2 other column-level data variables from the given product-level resource's data record in the third source dataset.

The functionality of merging the first merged dataset and the third source dataset may take other forms as well.

After merging the first merged dataset and the third source dataset into the first intermediate dataset, the resources data pipeline 500 may then merge the first intermediate merged dataset and the fourth source dataset into a second intermediate merged dataset by performing a left join operation using the first intermediate merged dataset as the left table, the fourth source dataset as the right table, and a common data variable representing an identifier of a plant (e.g., a plant identifier data variable that is found in both datasets) as the key for joining the first intermediate merged dataset and the fourth source dataset, which may produce a second intermediate merged dataset in which (i) the rows represent the same set of product-level resources that were represented by the rows of the first intermediate merged dataset and (ii) the columns represent both the data variables from the first intermediate merged dataset and the data variables from the fourth source dataset (i.e., data variables that provide information about plants where the listed product-level resources are used or produced). In this respect, the second intermediate merged dataset may comprise a respective data record for each product-level resource listed in the first intermediate merged dataset that includes (i) the same column-level data for the product-level resource that was included in the first intermediate merged dataset as well as (ii) additional column-level data that was included in the fourth source dataset for a given plant where the product-level resource is used or produced (to the extent that the fourth source dataset includes a data record for the given plant). Or in other words, the second intermediate merged dataset may include the same data records that were included in the first intermediate merged dataset, but those data records may be supplemented with additional column-level data from the fourth source dataset.

To illustrate, consider a simplified example where (i) one row of the first intermediate merged dataset comprises a data record for a given product-level resource that includes values for 7 column-level data variables that provide information about the given product-level resource, one of which is an identifier of a given plant where the given product-level resource is used or produced, and (ii) another row of the fourth source dataset comprises a data record for the given plant that includes an identifier of the given plant as well as a value for 1 other column-level data variable that provides information about the given plant. In such an example, the second intermediate merged dataset produced by the left join operation will comprise a data record for the given product-level resource that includes (i) values for the 7 column-level data variables that were included in the original data record from the intermediate merged dataset along with (ii) a value for the 1 other column-level data variable from the given plant's data record in the fourth source dataset.

The functionality of merging the first intermediate merged dataset and the fourth source dataset may take other forms as well.

After merging the first intermediate merged dataset and the fourth source dataset into the second intermediate dataset, the resources data pipeline 500 may then merge the second intermediate merged dataset and the fifth source dataset into a second merged dataset by performing a left join operation using the second intermediate merged dataset as the left table, the fifth source dataset as the right table, and a common data variable representing an identifier of an environmental-impact contributor as the key for joining the second intermediate merged dataset and the fifth source dataset. In this respect, the resources data pipeline 500 may determine the identifier of the environmental-impact contributor to use for each product-level resource within the second intermediate merged dataset (i.e., for each row of the second intermediate merged dataset) based on (i) one of the data variables identifying the type of the product-level resource (e.g., resource name and/or resource description) and (ii) the data variable identifying the type of electricity resource used by the plant at which the food product is manufactured. For instance, if a given one of the data variables identifying the type of a product-level resource has a value indicating that the product-level resource is electricity sourced from the grid, then the resources data pipeline 500 may use the value of the data variable identifying the type of electricity resource used by the plant as the identifier of the environmental-impact contributor for the product-level resource, but otherwise, the resources data pipeline 500 may use the value of the data variable identifying the type of the product-level resource as the identifier of the environmental-impact contributor for the product-level resource. The resources data pipeline 500 may determine the identifier of the environmental-impact contributor to use for each product-level resource within the second intermediate merged dataset in other manners as well.

The foregoing merge operation may produce a second merged dataset in which (i) the rows represent the same set of product-level resources that were represented by the rows of the second intermediate merged dataset and (ii) the columns represent both the data variables from the second intermediate merged dataset and the data variables from the fifth source dataset (i.e., data variables that provide information about various environmental-impact values for the identified product-level resources). In this respect, the second merged dataset may comprise a respective data record for each product-level resource listed in the second intermediate merged dataset that includes (i) the same column-level data for the product-level resource that was included in the second intermediate merged dataset as well as (ii) additional column-level data that was included in the fifth source dataset for the product-level resource (to the extent that the fifth source dataset includes a data record for the product-level resource). Or in other words, the second merged dataset may include the same data records that were included in the second intermediate merged dataset, but those data records may be supplemented with additional column-level data from the fifth source dataset.

To illustrate, consider a simplified example where (i) one row of the second intermediate merged dataset comprises a data record for a given product-level resource used to manufacture a given food product that includes values for 8 column-level data variables that provide information about the given product-level resource, one of which is an identifier of the type of the given product-level resource (e.g., a name or description) and another of which is an identifier of the type of electricity utilized by the given food product's manufacturing plant, (ii) another row of the fifth source dataset comprises a data record for a first environmental-impact contributor that corresponds to the type of the product-level resource (which contains environmental-impact values for the type of the product-level resource), and (iii) still another row of the fifth source dataset comprises a data record for a second environmental-impact contributor that corresponds to the type of electricity utilized by the given food product's manufacturing plant (which contains environmental-impact values for the type of electricity utilized by the given food product's manufacturing plant). In such an example, if the identifier of the type of the given product-level resource has a value indicating that the given product-level resource is electricity sourced from the grid, then the row of the second intermediate merged dataset will be merged with (and be updated to include the environmental-impact values from) the row of the fifth source dataset for the second environmental-impact contributor that corresponds to the type of electricity utilized by the given food product's manufacturing plant, but otherwise, the row of the second intermediate merged dataset will be merged with (and be updated to include the environmental-impact values from) the row of the fifth source dataset for the first environmental-impact contributor that corresponds to the type of the given product-level resource.

The functionality of merging the second intermediate merged dataset and the fifth source dataset may take other forms as well.

Turning again at FIG. 6B, a simplified illustration of one possible example of the second merged dataset is depicted (shown as example second merged dataset 616), that may be that may be produced by merging the first merged dataset, the third source dataset, the fourth source dataset, and the fifth source dataset in line with the discussion above. As shown, the example second merged dataset 616 comprises a data record for each product-level resource listed in the example first merged dataset 608 that includes (i) the same column-level data for the product-level resource that was included in the example first merged dataset 608 (e.g., values for the "product name," "process name," "plant identifier," "resource," and "value" data variables), (ii) additional column-level data for the product-level resource that was included in the example third source dataset 610 (e.g., values for one of the data variables identifying the type of the product-level resource (e.g., resource name and/or resource description) and the "conversion factor" data variable), (iii) additional column-level data for the food product's manufacturing plant that was included in the example fourth source dataset 612 (e.g., values for the type of electricity resource used by the food product's manufacturing plant), and (iv) additional column-level data (e.g., values for the $EI_1$ to $EI_n$ data variables).

For instance, the first row of the example second merged dataset 616 is a merged data record for grid-sourced electricity that is utilized in a process for manufacturing a cookies product, and that data record includes (i) the column-level data for the grid-sourced electricity that is utilized in the process for manufacturing cookies that was included the example first merged dataset 608 (e.g., values for the "product name," "process name," "plant identifier," "resource," and "value" data variables), (ii) additional column-level data for grid-sourced electricity that was included in the example third source dataset 610 (e.g., values for the "resource description" data variable that describes the grid-sourced electricity and the "conversion factor" data variable), (iii) additional column-level data for the cookies product's manufacturing plant that was included in the example fourth source dataset 612 (e.g., values for the type of electricity resource used by the food product's manufacturing plant), and (iv) additional column-level data that provides environmental-impact values for the type of electricity utilized by the cookies product's manufacturing plant. (While the example second merged dataset 616 is shown to include 4 rows, it should be understood that this is merely for purposes of illustration and that in practice, the example second merged dataset 616 is likely to included hundreds or thousands of rows).

However, it should be understood that if the example third source dataset 610 does not include a data record for a given product-level resource that is listed in the first merged dataset 608, then the merged data record for the given product-level resource will include null values for the columns representing the data variables from the example third source dataset 610. Similarly, it should be understood that if the example fourth source dataset 612 does not include a data record for the food product's manufacturing plant, then the merged data record for the given product-level resource will include null values for the columns representing the data variables from the example fourth source dataset 612. Similarly yet, it should be understood that if the example fifth source dataset 614 does not include a data record for either the environmental-impact contributor that corresponds to a given product-level resource or an environmental-impact contributor that corresponds to the type of electricity utilized by a given plant that uses or produces the given product-level resource, depending on which is used as the merging key, then the merged data record for the given product-level resource will include null values for the columns representing the data variables from the example fifth source dataset 614.

The second merged dataset may take various other forms as well—including but not limited to the possibility that the second merged dataset may contain different columns (e.g., from any of the database tables 106B-106E or 106H) and/or that the rows and/or columns may be arranged in a different order, among other possibilities.

After each of the merging operations described with respect to block 516, the resources data pipeline 500 may optionally perform certain cleaning operations on the resulting merged dataset (i.e., the first intermediate merged dataset, the second intermediate merged dataset, and/or the second merged dataset). For example, the resources data pipeline 500 may delete certain columns from the resulting merged dataset, such as duplicate columns or other columns that are not to be utilized to determine the resource-level environmental impact indicators, and/or may remove certain rows from the resulting merged dataset, such as rows that do not have a complete and valid set of data for the set of columns included in the resulting merged dataset, among other possibilities. In such implementations where the resulting merged dataset is cleaned, then the output of that operation will still be referred to herein by the same name, such that references to the resulting merged dataset will be understood to apply to either the original resulting merged dataset (in implementations where no cleaning is performed) or a cleaned version thereof (in implementations where cleaning is performed).

Returning to FIG. 5, after merging the first merged dataset, the third source dataset, the fourth source dataset, and the fifth source dataset into the second merged dataset, then at block 518 the resources data pipeline 500 may determine resource-level environmental impact indicators based on the second merged dataset.

The resource-level environmental impact indicators that may be determined may include, for each product-level resource listed in the second merged database, values for the 16 categories of environmental impact indicators previously described. As one possibility, the resource-level environmental impact indicators may include, for each listed product-level resource, all 16 categories of environmental impact indicators. As another possibility, the resource-level environmental impact indicators may include a subset of the 16 categories of environmental impact indicators for each listed product-level resource, and in some implementations, different subsets of the 16 categories of environmental impact indicators may be determined for different of the listed product-level resources. Various other possibilities may also exist.

Further, to determine the respective value of each resource-level environmental impact indicator for a given product-level resource, the resource data pipeline 500 may (i) identify the environmental-impact value in the given product-level resource's row that corresponds to the resource-level environmental impact indicator (i.e., the environmental-impact value within the column for the resource-level environmental impact indicator) and (ii) multiply the identified environmental-impact value by the amount value for the product-level resource as well as the conversion factor value for the product-level resource. However, the functionality for determining the respective value of an resource-level environmental impact indicator for a given product-level resource may take other forms as well—including but not limited to the possibility that the identified environmental-impact value may be transformed in some way before being multiplied by the amount value and conversion factor value for the product-level resource and/or that multiple environmental-impact values for the resource-level environmental impact indicator may be identified and combined together into a single value before being multiplied by the amount value and conversion factor value for the product-level resource.

The values of the resource-level environmental impact indicators for product-level resources may be determined in various other ways as well.

Lastly, at block 520, the resources data pipeline 500 may store the resource-level environmental impact indicators into a database table, such as the database table 108 of the back-end computing platform 102 shown in FIG. 1.

The functionality that is carried out the resources data pipeline 500 may take various other forms as well.

Further, in practice, the resources data pipeline 500 may carry out the foregoing functionality at any of various times. For instance, as one possibility, the resources data pipeline 500 may carry out the foregoing functionality periodically according to a schedule or the like (e.g., daily, weekly, etc.). As another possibility, the resources data pipeline 500 may carry out the foregoing functionality in response to any of various triggering events, examples of which may include an indication that the source data contained within the relevant database tables has changed and/or an indication that there has been a new request by a user to access and view resource-level environmental impact indicators, among other possible examples.

Figure 7:
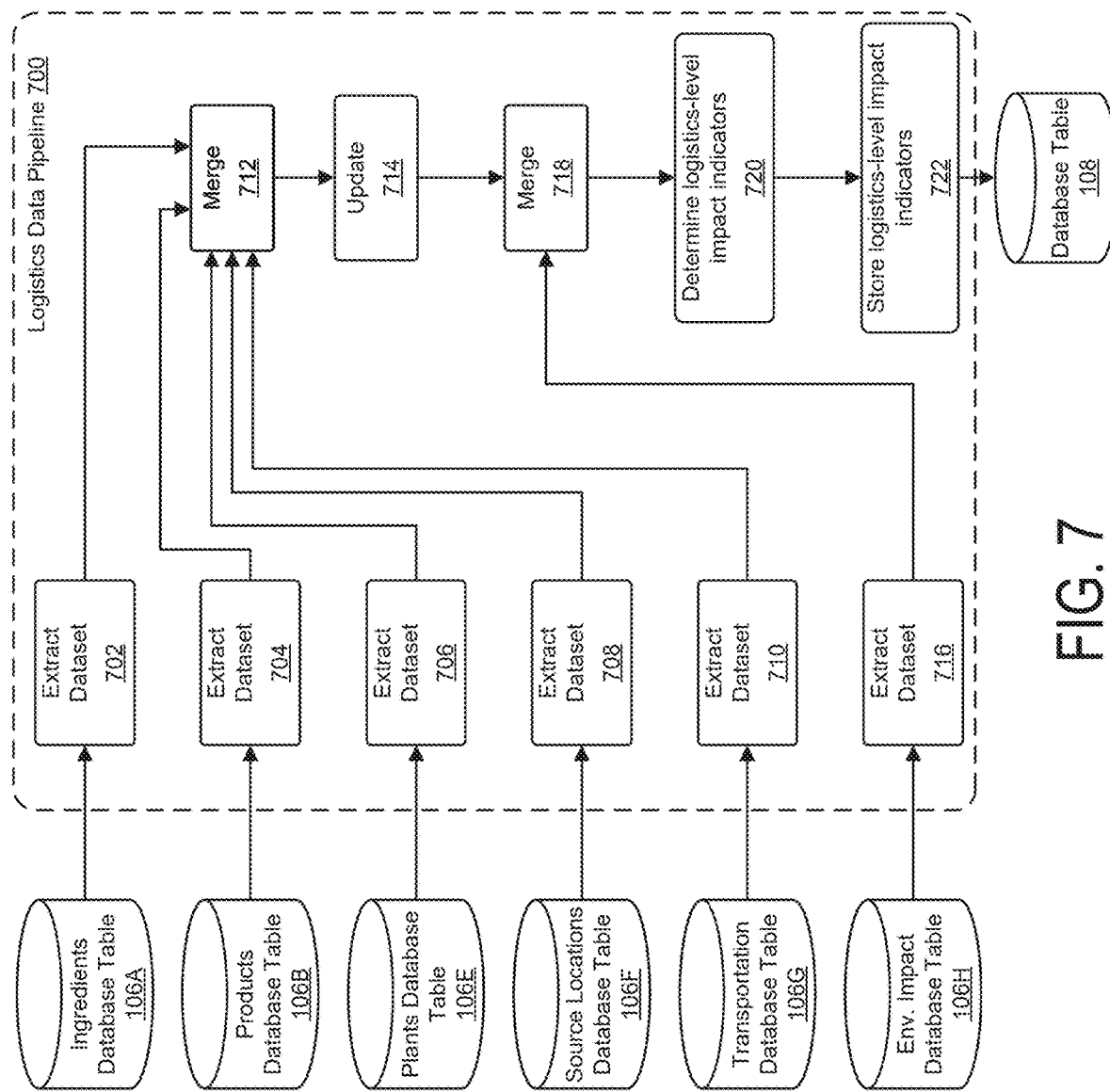
FIG. 7 is a diagram that illustrates one example of a logistics data pipeline that is utilized to determine logistics-level environmental impact indicators, in accordance with the present disclosure.

FIG. 7 is a diagram that illustrates functionality that may be carried out by a third example data pipeline that is configured to determine logistics-level environmental impact indicators based on source data from six different database tables: the ingredients database table 106A, the products database table 106B, the manufacturing process database table 106C, the resource database table 106D, the plants database table 106E, and the environmental impact database table 106H. This third example data pipeline may be referred to herein as the "logistics data pipeline 700."

As shown at block 702 of FIG. 7, the logistics data pipeline 700 may begin by extracting a first source dataset from the ingredients database table 106A. This functionality of extracting the first source dataset from the ingredients database table 106A may take any of various forms.

As one possibility, the functionality of extracting the first source dataset from the ingredients database table 106A may involve (i) loading a copy of the ingredients database table 106A, (ii) reducing the columns included in the loaded copy of the ingredients database table 106A down to a given subset of columns that are to be utilized for calculating the logistics-level environmental impact indicators (e.g., by deleting the other columns that will not be utilized from the loaded copy), (iii) optionally removing certain rows included in the loaded copy of the ingredients database table 106A (e.g., rows that do not contain a complete and valid set of data for the given set of columns), and (iv) optionally performing other cleaning operations on the loaded copy of the ingredients database table 106A (e.g., renaming columns, converting data values into different formats, etc.).

The functionality of extracting the first source dataset from the ingredients database table 106A may take other forms as well.

Figure 8A:
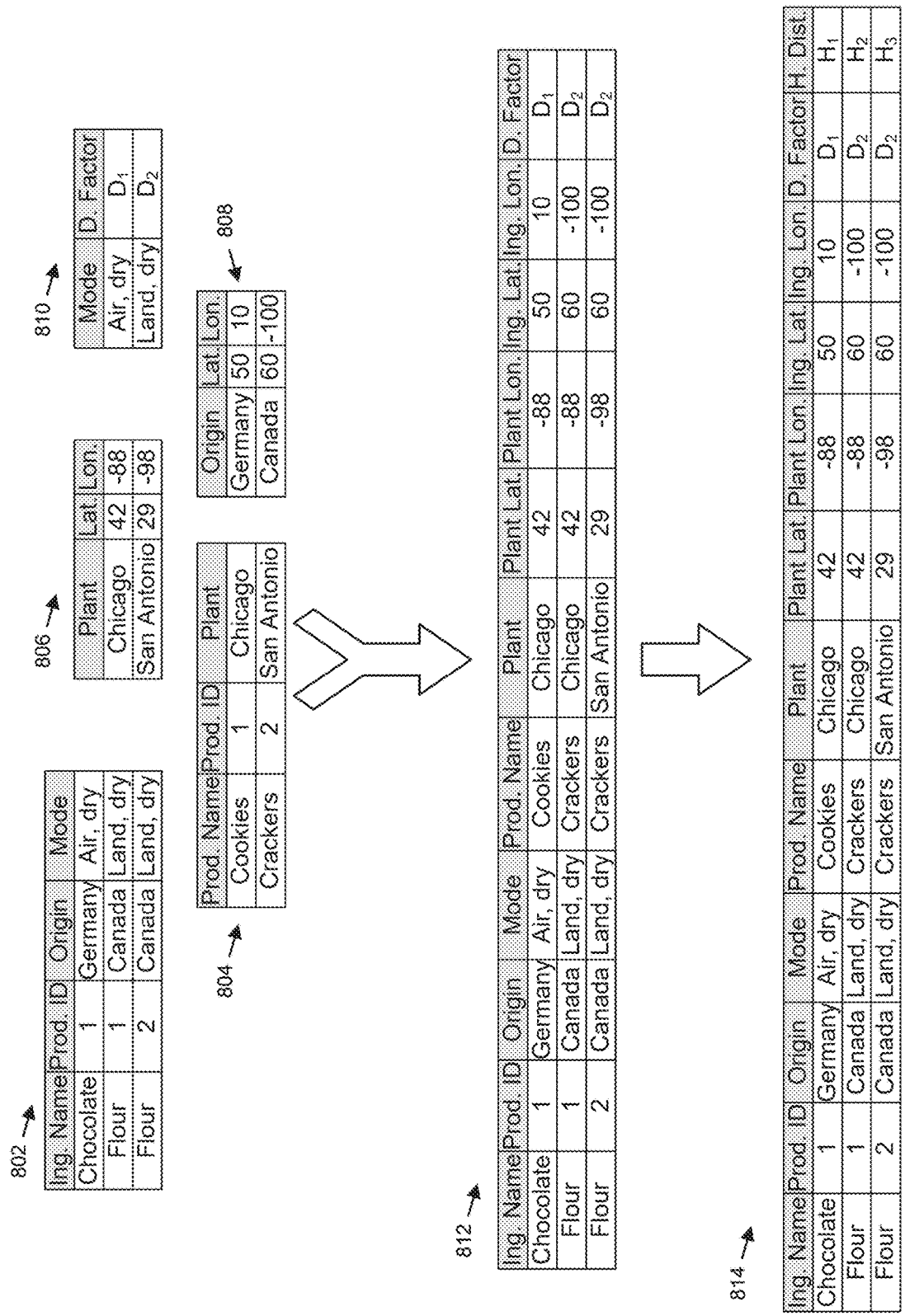
FIG. 8A shows a simplified example to illustrate functionality carried out by a given computing platform in order to merge and update extracted datasets into a first merged dataset, in accordance with the present disclosure.

FIG. 8A depicts a simplified illustration of one possible example of the first source dataset that may be extracted from the ingredients database table 106A, which is shown as example first source dataset 802. As shown, the example first source dataset 802 may include rows that represent product-level ingredients, of which 3 representative examples are shown in FIG. 8A: (i) chocolate in a first food product, (ii) flour in the first food product, and (iii) flour in a second food product. (While the example first source dataset 802 is shown to include 3 rows, it should be understood that this is merely for purposes of illustration and that in practice, the example first source dataset 802 is likely to included hundreds or thousands of rows). Additionally, as shown, the example first source dataset 802 may include at least 4 columns: (i) an "Ing. Name" column, which may contain column-level data comprising respective names of the listed product-level ingredients, (ii) a "Prod. ID" column, which may contain column-level data comprising respective numeric identifiers of the food products in which the listed product-level ingredients are included, (iii) an "Origin" column, which may contain column-level data comprising geographical locations where the listed product-level ingredients are sourced and procured, and (iv) a "Mode" column, which may contain column-level data indicating (a) whether transportation of the listed product-level ingredients is carried out by land, air, or sea, and (b) whether the listed product-level ingredients are transported in a dry shipping container or in a refrigerated shipping container.

The first source dataset may take various other forms as well—including but not limited to the possibility that the first source dataset may contain a different subset of columns from the ingredients database table 106A and/or that the rows and/or columns may be arranged in a different order, among other possibilities.

Returning to FIG. 7, at block 704, the logistics data pipeline 700 may extract a second source dataset from the products database table 106B. This functionality of extracting the second source dataset from the products database table 106B may take any of various forms.

As one possibility, the functionality of extracting the second source dataset from the products database table 106B may involve (i) loading a copy of the products database table 106B, (ii) reducing the columns included in the loaded copy of the products database table 106B down to a given subset of columns that are to be utilized for calculating the logistics-level environmental impact indicators (e.g., by deleting the other columns that will not be utilized from the loaded copy), (iii) optionally removing certain rows included in the loaded copy of the products database table 106B (e.g., rows that do not contain a complete and valid set of data for the given set of columns), and (iv) optionally performing other cleaning operations on the loaded copy of the products database table 106B (e.g., renaming columns, converting data values into different formats, etc.).

The functionality of extracting the second source dataset from the products database table 106B may take other forms as well.

Turning again to FIG. 8A, a simplified illustration of one possible example of the second source dataset that may be extracted from the products database table 106B is also depicted, which is shown as example second source dataset 804. As shown, the example second source dataset 804 may include rows that represent food products, of which two representative examples are shown in FIG. 8A: (i) a "cookie" food product and (ii) a "cracker" food product. (While the example second source dataset 804 is shown to include 2 rows, it should be understood that this is merely for purposes of illustration and that in practice, the example second source dataset 804 is likely to include tens or hundreds of rows). Additionally, as shown, the example second source dataset 804 may include at least 3 columns: (i) a "Prod. Name" column, which may contain column-level data comprising respective names of the listed food products, (ii) a "Prod. ID" column, which may contain column-level data comprising respective numeric identifiers of the listed food products, and (iii) a "Plant" column, which may contain column-level data comprising respective plant identifiers for the plants where the listed food products are manufactured.

The second source dataset may take various other forms as well—including but not limited to the possibility that the second source dataset may contain a different subset of columns from the products database table 106B and/or that the rows and/or columns may be arranged in a different order, among other possibilities.

Returning to FIG. 7, at block 706, the logistics data pipeline 700 may extract a third source dataset from the plants database table 106E. This functionality of extracting the third source dataset from the plants database table 106E may take any of various forms.

As one possibility, the functionality of extracting the third source dataset from the plants database table 106E may involve (i) loading a copy of the plants database table 106E, (ii) reducing the columns included in the loaded copy of the plants database table 106E down to a given subset of columns that are to be utilized for calculating the logistics-level environmental impact indicators (e.g., by deleting the other columns that will not be utilized from the loaded copy), (iii) optionally removing certain rows included in the loaded copy of the plants database table 106E (e.g., rows that do not contain a complete and valid set of data for the given set of columns), and (iv) optionally performing other cleaning operations on the loaded copy of the plants database table 106E (e.g., renaming columns, converting data values into different formats, etc.).

The functionality of extracting the third source dataset from the plants database table 106E may take other forms as well.

Turning again to FIG. 8A, a simplified illustration of one possible example of the third source dataset that may be extracted from the plants database table 106E is also depicted, which is shown as example third source dataset 806. As shown, the example third source dataset 806 may include rows that represent plants, of which two representative examples are shown in FIG. 8A: Chicago and San Antonio. (While the example third source dataset 806 is shown to include 2 rows, it should be understood that this is merely for purposes of illustration and that in practice, the example third source dataset 806 is likely to include tens or hundreds of rows). Additionally, as shown, the example third source dataset 806 may include at least 3 columns: (i) a "Plant" column, which may contain column-level data identifying respective plants, (ii) a "Lat." column, which may contain column-level data comprising respective latitude coordinates of the respective plants' locations, and (iii) a "Lon." column, which may contain column-level data comprising respective longitude coordinates of the respective plants' locations.

The third source dataset may take various other forms as well—including but not limited to the possibility that the third source dataset may contain a different subset of columns from the plants database table 106E and/or that the rows and/or columns may be arranged in a different order, among other possibilities.

Returning to FIG. 7, at block 708, the logistics data pipeline 700 may extract a fourth source dataset from the source locations database table 106F. This functionality of extracting the fourth source dataset from the source locations database table 106F may take any of various forms.

As one possibility, the functionality of extracting the fourth source dataset from the source locations database table 106F may involve (i) loading a copy of the source locations database table 106F, (ii) reducing the columns included in the loaded copy of the source locations database table 106F down to a given subset of columns that are to be utilized for calculating the logistics-level environmental impact indicators (e.g., by deleting the other columns that will not be utilized from the loaded copy), (iii) optionally removing certain rows included in the loaded copy of the source locations database table 106F (e.g., rows that do not contain a complete and valid set of data for the given set of columns), and (iv) optionally performing other cleaning operations on the loaded copy of the source locations database table 106F (e.g., renaming columns, converting data values into different formats, etc.).

The functionality of extracting the fourth source dataset from the source locations database table 106F may take other forms as well.

Turning again to FIG. 8A, a simplified illustration of one possible example of the fourth source dataset that may be extracted from the source locations database table 106F is also depicted, which is shown as example fourth source dataset 808. As shown, the example fourth source dataset 808 may include rows that represent geographical locations (e.g., countries) from where ingredients may be sourced, of which two representative examples are shown in FIG. 8A: Germany and Canada. (While the example fourth source dataset 808 is shown to include 2 rows, it should be understood that this is merely for purposes of illustration and that in practice, the example fourth source dataset 808 is likely to include tens or hundreds of rows). Additionally, as shown, the example fourth source dataset 808 may include at least 3 columns: (i) an "Origin" column, which may contain column-level data comprising textual identifiers of geographical locations (e.g., countries) from where ingredients may be sourced, (ii) a "Lat." column, which may contain column-level data comprising respective latitude coordinates of the respective origins, and (iii) a "Lon." column, which may contain column-level data comprising respective longitude coordinates of the respective origins.

The fourth source dataset may take various other forms as well—including but not limited to the possibility that the fourth source dataset may contain a different subset of columns from the source locations database table 106F and/or that the rows and/or columns may be arranged in a different order, among other possibilities.

Returning to FIG. 7, at block 710, the logistics data pipeline 700 may extract a fifth source dataset from the transportation database table 106G. This functionality of extracting the fifth source dataset from the transportation database table 106G may take any of various forms.

As one possibility, the functionality of extracting the fifth source dataset from the transportation database table 106G may involve (i) loading a copy of the transportation database table 106G, (ii) reducing the columns included in the loaded copy of the transportation database table 106G down to a given subset of columns that are to be utilized for calculating the logistics-level environmental impact indicators (e.g., by deleting the other columns that will not be utilized from the loaded copy), (iii) optionally removing certain rows included in the loaded copy of the transportation database table 106G (e.g., rows that do not contain a complete and valid set of data for the given set of columns), and (iv) optionally performing other cleaning operations on the loaded copy of the transportation database table 106G (e.g., renaming columns, converting data values into different formats, etc.).

The functionality of extracting the fifth source dataset from the transportation database table 106G may take other forms as well.

Turning again to FIG. 8A, a simplified illustration of one possible example of the fifth source dataset that may be extracted from the transportation database table 106G is also depicted, which is shown as example fifth source dataset 810. As shown, the example fifth source dataset 810 may include rows that represent respective transportation modes that indicate (i) whether the transportation mode involves transporting ingredients by land, by air, or sea, and (ii) whether the transportation mode involves transporting ingredients in a dry shipping container or in a refrigerated shipping container. Two representative example transportation modes are shown in FIG. 8A: "Air, dry" and "Land, dry." (While the example fifth source dataset 810 is shown to include 2 rows, it should be understood that this is merely for purposes of illustration and that in practice, the example fifth source dataset 810 is likely to include tens or hundreds of rows). Additionally, as shown, the example fifth source dataset 810 may include at least 2 columns: (i) a "Mode" column, which may contain column-level data comprising identifications of transportation modes that may be used to transport ingredients, and (ii) a "D. Factor" column, which may contain column-level data comprising a distance factor that is used in determining logistics-level environmental impact indicators based on the type of transportation mode that is used to transport ingredients.

The fifth source dataset may take various other forms as well—including but not limited to the possibility that the fifth source dataset may contain a different subset of columns from the transportation database table 106G and/or that the rows and/or columns may be arranged in a different order, among other possibilities.

Returning again to FIG. 7, at block 712, the logistics data pipeline 700 may merge the first source dataset, the second source dataset, the third source dataset, the fourth source dataset, and the fifth source dataset into a first merged dataset. The functionality of merging these datasets may take any of various forms.

As one possibility, the logistics data pipeline 700 may merge these datasets by (i) merging the first source dataset and the second source dataset into a first intermediate merged dataset, (ii) merging the first intermediate merged dataset and the third source dataset into a second intermediate merged dataset, (iii) merging the second intermediate merged dataset and the fourth source dataset into a third intermediate merged dataset, and finally (iv) merging the third intermediate merged dataset and the fifth source dataset into the first merged dataset.

The logistics data pipeline 700 may merge the first source dataset and the second source dataset into the first intermediate merged dataset by performing a left join operation using the first source dataset as the left table, the second source dataset as the right table, and a common data variable representing an identifier of a food product (e.g., a numeric product ID) that is found in both datasets as the key for joining the first and second source datasets, which may produce the first intermediate merged dataset in which (i) the rows represent the same set of product-level ingredients that were represented by the rows of the first source dataset and (ii) the columns represent both the data variables from the first source dataset (i.e., data variables that provide information about identified ingredients for identified food products) and the data variables from the second source dataset (i.e., data variables that provide information about identified food products). In this respect, the first intermediate merged dataset may comprise a respective data record for each product-level ingredient listed in the first source dataset that includes (i) the same column-level data for the product-level ingredient that was included in the first source dataset as well as (ii) additional column-level data that was included in the second source dataset for the product-level ingredient's identified food product (to the extent that the second source dataset includes a data record for the identified food product). Or in other words, the first intermediate merged dataset may include the same data records that were included in the first source dataset, but those data records may be supplemented with additional column-level data from the second source dataset.

To illustrate, consider a simplified example where (i) one row of the first source dataset comprises a data record for a given product-level ingredient of a given food product that includes values for 4 column-level data variables that provide information about the given product-level ingredient, one of which is an identifier of the given food product, and (ii) another row of the second source dataset comprises a data record for the given food product that includes an identifier of the given food product as well as values for 2 other column-level data variables that provide information about the given food product. In such an example, the first intermediate merged dataset produced by the left join operation will comprise a data record for the given product-level ingredient of the given food product that includes (i) values for 4 column-level data variables that were included in the original data record from the first source dataset along with (ii) values for the 2 other column-level data variables from the given food product's data record in the second source dataset.

The functionality of merging the first source dataset and the second source dataset may take other forms as well.

Then, the logistics data pipeline 700 may merge the first intermediate merged dataset and the third source dataset into the second intermediate merged dataset by performing a left join operation using the first intermediate merged dataset as the left table, the third source dataset as the right table, and a common data variable representing an identifier of a plant (e.g., a plant identifier data variable) that is found in both databases as the key for joining the first intermediate merged dataset and the third source dataset, which may produce the second intermediate merged dataset in which (i) the rows represent the same set of product-level ingredients that were represented by the rows of the first intermediate merged dataset and (ii) the columns represent both the data variables from the first intermediate merged dataset (i.e., data variables that provide information about product-level ingredients) and the data variables from the third source dataset (i.e., data variables that provide information about plants where product-level ingredients are transported). In this respect, the second intermediate merged dataset may comprise a respective data record for each product-level ingredient listed in the first intermediate merged dataset that includes (i) the same column-level data for the product-level ingredient that was included in the first intermediate merged dataset as well as (ii) additional column-level data that was included in the third source dataset for a given plant where the product-level ingredient is transported (to the extent that the third source dataset includes a data record for the given plant). Or in other words, the second intermediate merged dataset may include the same data records that were included in the first intermediate merged dataset, but those data records may be supplemented with additional column-level data from the third source dataset.

To illustrate, consider a simplified example where (i) one row of the first intermediate merged dataset comprises a data record for a given product-level ingredient that includes values for 6 column-level data variables that provide information about the given product-level ingredient, one of which is an identifier of a given plant where the given product-level ingredient is delivered, and (ii) another row of the third source dataset comprises a data record for the given plant that includes an identifier of the given plant as well as values for 2 other column-level data variables that provide information about the given plant. In such an example, the second intermediate merged dataset produced by the left join operation will comprise a data record for the given product-level ingredient that includes (i) values for 6 column-level data variables that were included in the data record from the first intermediate merged dataset along with (ii) values for the 2 other column-level data variables from the given plant's data record in the third source dataset.

The functionality of merging the first intermediate merged dataset and the third source dataset may take other forms as well.

Then, the logistics data pipeline 700 may merge the second intermediate merged dataset and the fourth source dataset into the third intermediate merged dataset by performing a left join operation using the second intermediate merged dataset as the left table, the fourth source dataset as the right table, and a common data variable representing an identifier of an origin that is found in both datasets as the key for joining the second intermediate merged dataset and the fourth source dataset, which may produce the third intermediate merged dataset in which (i) the rows represent the same set of product-level ingredients that were represented by the rows of the second intermediate merged dataset and (ii) the columns represent both the data variables from the second intermediate merged dataset (i.e., data variables that provide information about product-level ingredients) and the data variables from the fourth source dataset (i.e., data variables that provide information about origins where product-level ingredients are sourced and procured). In this respect, the third intermediate merged dataset may comprise a respective data record for each product-level ingredient listed in the second intermediate merged dataset that includes (i) the same column-level data for the product-level ingredient that was included in the second intermediate merged dataset as well as (ii) additional column-level data that was included in the fourth source dataset for a given origin where the product-level ingredient is sourced and procured (to the extent that the fourth source dataset includes a data record for the given origin). Or in other words, the third intermediate merged dataset may include the same data records that were included in the second intermediate merged dataset, but those data records may be supplemented with additional column-level data from the fourth source dataset.

To illustrate, consider a simplified example where (i) one row of the second intermediate merged dataset comprises a data record for a given product-level ingredient that includes values for 8 column-level data variables that provide information about the given product-level ingredient, one of which is an identifier of a given origin where the given product-level ingredient is sourced and procured, and (ii) another row of the fourth source dataset comprises a data record for the given origin that includes an identifier of the given origin as well as values for 2 other column-level data variables that provide information about the given origin. In such an example, the third intermediate merged dataset produced by the left join operation will comprise a data record for the given product-level ingredient that includes (i) values for 8 column-level data variables that were included in the data record from the second intermediate merged dataset along with (ii) values for the 2 other column-level data variables from the given origin's data record in the fourth source dataset.

The functionality of merging the second intermediate merged dataset and the fourth source dataset may take other forms as well.

Then, the logistics data pipeline 700 may merge the third intermediate merged dataset and the fifth source dataset into the first merged dataset by performing a left join operation using the third intermediate merged dataset as the left table, the fifth source dataset as the right table, and a common data variable representing an identifier of a transportation mode that is found in both datasets as the key for joining the third intermediate merged dataset and the fifth source dataset, which may produce the first merged dataset in which (i) the rows represent the same set of product-level ingredients that were represented by the rows of the third intermediate merged dataset and (ii) the columns represent both the data variables from the third intermediate merged dataset (i.e., data variables that provide information about product-level ingredients) and the data variables from the fifth source dataset (i.e., data variables that provide information about transportation modes used for transporting product-level ingredients to plants). In this respect, the first merged dataset may comprise a respective data record for each product-level ingredient listed in the third intermediate merged dataset that includes (i) the same column-level data for the product-level ingredient that was included in the third intermediate merged dataset as well as (ii) additional column-level data that was included in the fifth source dataset for a given transportation mode used for transporting the product-level ingredient to a plant (to the extent that the fifth source dataset includes a data record for the transportation mode). Or in other words, the first merged dataset may include the same data records that were included in the third intermediate merged dataset, but those data records may be supplemented with additional column-level data from the fifth source dataset.

To illustrate, consider a simplified example where (i) one row of the third intermediate merged dataset comprises a data record for a given product-level ingredient that includes values for 8 column-level data variables that provide information about the given product-level ingredient, one of which is an identifier of a given transportation mode used to transport the given product-level ingredient to a given plant, and (ii) another row of the fifth source dataset comprises a data record for the given transportation mode that includes an identifier of the given transportation mode as well as values for 1 other column-level data variable that provides information about the given transportation mode. In such an example, the first merged dataset produced by the left join operation will comprise a data record for the given product-level ingredient that includes (i) values for 8 column-level data variables that were included in the data record from the third intermediate merged dataset along with (ii) values for the 1 other column-level data variable from the given transportation mode data record in the fifth source dataset.

The functionality of merging the third intermediate merged dataset and the fifth source dataset may take other forms as well.

Turning again at FIG. 8A, a simplified illustration of one possible example of the first merged dataset is depicted (shown as example first merged dataset 812), that may be that may be produced by merging the first source dataset, the second source dataset, the third source dataset, the fourth source dataset, and the fifth source dataset in line with the discussion above. As shown, the example first merged dataset 812 comprises a data record for each product-level ingredient listed in the example first source dataset 802 that includes (i) the same column-level data for the product-level ingredient that was included in the example first source dataset 802 (e.g., values for the "ingredient name," "product ID," "origin," and "transportation mode" data variables), (ii) additional column-level data for the product-level ingredient's food product that was included in the example second source dataset 804 (e.g., values for the "product name" data variable and the "plant identifier" data variable), (iii) additional column-level data for a given plant where the product-level ingredient is transported that was included in the example third source dataset 806 (e.g., values for the latitude and longitude coordinates of the given plant's location), (iv) additional column-level data for the product-level ingredient's origin that was included in the example fourth source dataset 808 (e.g., values for the latitude and longitude coordinates of the product-level ingredient's origin), and (v) additional column-level data for the transportation mode for the product-level ingredient included in the example fifth source dataset 810 (e.g., a value for the "distance factor" data variable).

For instance, the first row of the example first merged dataset 812 is a merged data record for chocolate as used in a cookies product, and that data record includes (i) the column-level data for the chocolate as used in the cookies product that was included the example first source dataset 802 (e.g., values for the "ingredient name," "product ID," "origin," and "transportation mode" data variables), (ii) additional column-level data for the cookies product that was included in the example second source dataset 804 (e.g., values for the "product name" and "plant identifier" data variables), (iii) additional column-level data for a given plant where the chocolate is transported that was included in the example third source dataset 806 (e.g., values for the latitude and longitude coordinates of the given plant's location), (iv) additional column-level data for a given origin where the chocolate is sourced and procured that was included in the example fourth source dataset 808 (e.g., values for the latitude and longitude coordinates of the chocolate's origin), and (v) additional column-level data for a transportation mode that is used for transporting the chocolate from the chocolate's origin to the given plant that was included in the example fifth source dataset 810 (e.g., values for the distance factor data variable). (While the example first merged dataset 812 is shown to include 3 rows, it should be understood that this is merely for purposes of illustration and that in practice, the example first merged dataset 812 is likely to included hundreds or thousands of rows).

However, it should be understood that if the example second source dataset 804 does not include a data record for a food product of a given product-level ingredient that is listed in the first source dataset 802, then the merged data record for the given product-level ingredient will include null values for the columns representing the data variables from the example second source dataset 804.

Similarly, it should be understood that if the example third source dataset 806 does not include a data record for a plant where a given product-level ingredient that is listed in the first source dataset 802 is transported, then the merged data record for the given product-level ingredient will include null values for the columns representing the data variables from the example third source dataset 806.

Similarly, it should be understood that if the example fourth source dataset 808 does not include a data record for an origin of a given product-level ingredient that is listed in the first source dataset 802, then the merged data record for the given product-level ingredient will include null values for the columns representing the data variables from the example fourth source dataset 808.

Similarly, it should be understood that if the example fifth source dataset 810 does not include a data record for a transportation mode for a given product-level ingredient that is listed in the first source dataset 802, then the merged data record for the given product-level ingredient will include null values for the columns representing the data variables from the example fifth source dataset 810.

The first merged dataset may take various other forms as well—including but not limited to the possibility that the first merged dataset may contain different columns (e.g., from any of the database tables 106A, 106B or 106E-106G) and/or that the rows and/or columns may be arranged in a different order, among other possibilities.

After each of the merging operations described with respect to block 712, the logistics data pipeline 700 may optionally perform certain cleaning operations on the resulting merged dataset (i.e., the first intermediate merged dataset, the second intermediate merged dataset, the third intermediate merged dataset, and/or the first merged dataset). For example, the logistics data pipeline 700 may delete certain columns from the resulting merged dataset, such as duplicate columns or other columns that are not to be utilized to determine the logistics-level environmental impact indicators, and/or may remove certain rows from the resulting merged dataset, such as rows that do not have a complete and valid set of data for the set of columns included in the resulting merged dataset, among other possibilities. In such implementations where the resulting merged dataset is cleaned, then the output of that operation will still be referred to herein by the same name, such that references to the resulting merged dataset will be understood to apply to either the original resulting merged dataset (in implementations where no cleaning is performed) or a cleaned version thereof (in implementations where cleaning is performed).

Returning again to FIG. 7, at block 714, the logistics data pipeline 700 may update the first merged dataset by adding a new column representing a new data variable that comprises a measure of the angular distance (taking into account the Earth's curvature) between the origin of a product-level ingredient and the plant where the product-level ingredient is transported. This distance may be determined based on any mathematical formula, one of which may be the haversine formula, which involves determining the distance between two points on a sphere based on the latitude and longitude coordinates of the two points. This new data variable may be referred to herein as the "haversine distance."

The logistics data pipeline 700 may determine the value for this new "haversine distance" data variable for a given product-level ingredient based on the latitude and longitude coordinates for the given product-level ingredient's origin and a given plant where the given product-level ingredient is transported, as represented in the first merged dataset. The haversine distance may be determined in various other ways as well.

Turning again to FIG. 8A, a simplified illustration of one possible example of a first merged dataset that has been updated to include haversine distance values (which is shown as example first merged dataset 814) is depicted. As shown, the example first merged dataset 814 comprises the same rows and columns as the example first merged dataset 812, as well as an additional "H. Dist." column that includes the determined haversine distance values for the listed product-level ingredients. (While the example first merged dataset 814 is shown to include 3 rows, it should be understood that this is merely for purposes of illustration and that in practice, the example first merged dataset 814 is likely to included hundreds or thousands of rows).

The updated version of the first merged dataset with the haversine distance values may take various other forms as well—including but not limited to the possibility that the first merged dataset may contain different columns (e.g., from any of the database tables 106A, 106B or 106E-106G) and/or that the rows and/or columns may be arranged in a different order, among other possibilities.

Returning again to FIG. 7, at block 716, the logistics data pipeline 700 may extract a sixth source dataset from the environmental impact database table 106H. This functionality of extracting the sixth source dataset from the environmental impact database table 106H may take any of various forms.

As one possibility, the functionality of extracting the sixth source dataset from the environmental impact database table 106H may involve (i) loading a copy of the environmental impact database table 106H, (ii) reducing the columns included in the loaded copy of the environmental impact database table 106H down to a given subset of columns that are to be utilized for calculating the logistics-level environmental impact indicators (e.g., by deleting the other columns that will not be utilized from the loaded copy), (iii) optionally removing certain rows included in the loaded copy of the environmental impact database table 106H (e.g., rows that will not be utilized or that do not contain a complete and valid set of data for the given set of columns), and (iv) optionally performing other cleaning operations on the loaded copy of the environmental impact database table 106H (e.g., renaming columns, converting data values into different formats, etc.).

In this respect, the particular environmental-impact-value columns that are included in the sixth source dataset may depend on (i) which ones of the environmental impact indicators are to be determined and (ii) which of the environmental-impact-value columns from the environmental impact database table 106H contain values that are to be used to determine those ones of the logistics-level environmental impact indicators. For example, if the logistics data pipeline 700 is to determine all 16 categories of the environmental impact indicators for the product-level ingredients, then the sixth source dataset may include at least one environmental-impact-value column (and perhaps multiple environmental-impact-value columns) corresponding to each of the 16 categories of environmental impact indicators.

The functionality of extracting the sixth source dataset from the environmental impact database table 106H may take other forms as well.

Figure 8B:
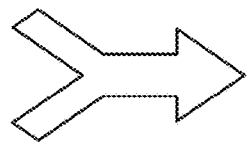
FIG. 8B shows a simplified example to illustrate functionality carried out by a given computing platform in order to merge the first merged dataset and another extracted dataset into a second merged dataset, in accordance with the present disclosure.

FIG. 8B depicts a simplified illustration of one possible example of the sixth source dataset that may be extracted from the environmental impact database table 106H, which is shown as example sixth source dataset 816. As shown, the example sixth source dataset 816 may include rows that represent environmental-impact contributors, of which 2 representative examples are shown in FIG. 8B: "Air, dry" and "Land, dry," each of which corresponds to a respective transportation mode. (While the example sixth source dataset 816 is shown to include 2 rows, it should be understood that this is merely for purposes of illustration and that in practice, the example sixth source dataset 816 may include a row for each transportation mode that may be represented in the transportation database table 106G.) Additionally, as shown, the example sixth source dataset 816 may include: (i) a "Contributor" column, which may contain column-level data identifying the respective environmental-impact contributors (e.g., names of the contributors), and (ii) a plurality of columns $EI_1$ to $EI_n$ that represent different environmental-impact values, where each such column contains column-level data comprising respective values that quantify how much of a given category of environmental impact is produced per unit of the listed environmental-impact contributors. In this respect, as noted above, the particular environmental-impact-value columns that are included in the example sixth source dataset 816 may depend on (i) which ones of the environmental impact indicators are to be determined and (ii) which of the environmental-impact-value columns from the environmental impact database table 106H contain values that are to be used to determine those ones of the logistics-level environmental impact indicators.

The sixth source dataset may take various other forms as well—including but not limited to the possibility that the sixth source dataset may contain a different subset of columns from the environmental impact database table 106H and/or that the rows and/or columns may be arranged in a different order, among other possibilities.

Returning again to FIG. 7, at block 718, the logistics data pipeline 700 may merge the first merged dataset and the sixth source dataset into a second merged dataset. The functionality of merging the first merged dataset and the sixth source dataset may take any of various forms.

As one possibility, the logistics data pipeline 700 may merge the first merged dataset and the sixth source dataset by performing a left join operation using the first merged dataset as the left table, the sixth source dataset as the right table, and a common data variable representing an identifier of a transportation mode (e.g., the "transportation mode" data variable of the first merged dataset and the "contributor name" data variable of the sixth source dataset) as the key for joining the first merged dataset and the sixth source dataset, which may produce a second merged dataset in which (i) the rows represent the same set of product-level ingredients that were represented by the rows of the first merged dataset and (ii) the columns represent both the data variables from the first merged dataset and the data variables from the sixth source dataset (i.e., data variables that provide information about various environmental-impact values for transportation modes represented in the first merged database). In this respect, the second merged dataset may comprise a respective data record for each product-level ingredient listed in the first merged dataset that includes (i) the same column-level data for the product-level ingredient that was included in the first merged dataset as well as (ii) additional column-level data that was included in the sixth source dataset for a transportation mode for the product-level ingredient (to the extent that the third source dataset includes a data record for the transportation mode for the product-level ingredient). Or in other words, the second merged dataset may include the same data records that were included in the first merged dataset, but those data records may be supplemented with additional column-level data from the third source dataset.

To illustrate, consider a simplified example where (i) one row of the first merged dataset comprises a data record for a given product-level ingredient that includes values for 12 column-level data variables that provide information about the given product-level ingredient, one of which is an identifier of a given transportation mode for the given product-level ingredient (e.g., the "Air, dry" value of the "transportation mode" data variable), and (ii) another row of the sixth source dataset comprises a data record for a given environmental-impact contributor that corresponds to the given transportation mode for the product-level ingredient, one of which is an identifier of the given environmental-impact contributor (e.g., the "Air, dry" value of the "contributor name" data variable). In such an example, the second merged dataset produced by the left join operation will comprise a data record for the given product-level ingredient that includes (i) values for the 12 column-level data variables that were included in the original data record from the first merged dataset along with (ii) values for the column-level data variables that provide information about environmental-impact values from the given environmental-impact contributor's data record in the sixth source dataset.

The functionality of merging the first merged dataset and the sixth source dataset may take other forms as well.

Turning again at FIG. 8B, a simplified illustration of one possible example of the second merged dataset (which is shown as example second merged dataset 818) that may be produced by merging the example first merged dataset 814 and the example sixth source dataset 816 using a combination of the "transportation mode" data variable from the example first merged dataset 814 and the "contributor name" data variable from the example sixth source dataset 816 as the key is also depicted. As shown, the example second merged dataset 818 comprises a data record for each respective product-level ingredient listed in the first merged dataset 814 that includes (i) the same column-level data for the product-level ingredient that was included in the example first merged dataset 814 (e.g., values for the "ingredient name," "product ID," "origin," "transportation mode," "product name," and "plant identifier," data variables, the data variables for the latitude and longitude coordinates for a given plant where the product-level ingredient is transported, the data variables for the latitude and longitude coordinates for the origin of the product-level ingredient, the "distance factor" data variable, and the "haversine distance" variable) as well as (ii) additional column-level data for a given transportation mode for the product-level ingredient that was included in the example sixth source dataset 816 (e.g., values for the $EI_1$ to $EI_n$ data variables).

For instance, the first row of the example second merged dataset 818 is a merged data record for a chocolate ingredient as used in a cookies product, and that data record includes both (i) the column-level data for the chocolate ingredient as used in the cookies product that was included the example first merged dataset 814 (e.g., values for the "ingredient name," "product ID," "origin," "transportation mode," "product name" and "plant identifier" data variables, values for the latitude and longitude coordinates of the given plant's location, values for the latitude and longitude coordinates of the chocolate's origin, and values for the "distance factor" and "haversine distance" data variables) and (ii) additional column-level data for the chocolate ingredient's transportation mode that was included in the example sixth source dataset 816 (e.g., values for the $EI_1$ to $EI_n$ data variables). (While the example second merged dataset 818 is shown to include 3 rows, it should be understood that this is merely for purposes of illustration and that in practice, the example second merged dataset 818 is likely to included hundreds or thousands of rows.)

However, it should be understood that if the example sixth source dataset 816 does not include a data record for an environmental-impact contributor that corresponds to the transportation mode for a given product-level ingredient that is listed in the first merged dataset 814, then the merged data record for the given product-level ingredient will include null values for the columns representing the data variables from the example sixth source dataset 816.

The second merged dataset may take various other forms as well—including but not limited to the possibility that the second merged dataset may contain a different subset of columns (e.g., from the first merged dataset and/or the environmental impact database table 106H), and/or that the rows and/or columns may be arranged in a different order, among other possibilities.

After merging the first merged dataset and the sixth source dataset into the second merged dataset, the logistics data pipeline 700 may optionally perform certain cleaning operations on the second merged dataset. For example, the logistics data pipeline 700 may delete certain columns from the second merged dataset, such as duplicate columns or other columns that will not be utilized, and/or may remove certain rows from the second merged dataset, such as rows that will not be utilized or that do not have a complete and valid set of data for the set of columns included in the second merged dataset, among other possibilities. In such implementations where the second merged dataset is cleaned, then the output of that operation will still be referred to herein as the "second merged dataset" such that references to the "second merged dataset" below will be understood to apply to either the original second merged dataset (in implementations where no cleaning is performed) or a cleaned version thereof (in implementations where cleaning is performed).

Returning to FIG. 7, after merging the first merged dataset and the sixth source dataset into the second merged dataset, then at block 720 the logistics data pipeline 700 may determine logistics-level environmental impact indicators based on the second merged dataset.

The logistics-level environmental impact indicators that may be determined may include, for each product-level ingredient listed in the second merged dataset, values for the 16 categories of environmental impact indicators previously described. As one possibility, the logistics-level environmental impact indicators may include, for each listed product-level ingredient, all 16 categories of environmental impact indicators. As another possibility, the logistics-level environmental impact indicators may include a subset of the 16 categories of environmental impact indicators for each listed product-level ingredient, and in some implementations, different subsets of the 16 categories of environmental impact indicators may be determined for different of the listed product-level ingredients. Various other possibilities may also exist.

Further, to determine the respective values of each logistics-level environmental impact indicator for a given product-level ingredient, the logistics data pipeline 700 may (i) identify the environmental-impact value in the given product-level ingredient's row that corresponds to the logistics-level environmental impact indicator (i.e., the environmental-impact value within the column for the logistics-level environmental impact indicator) and (ii) multiply the identified environmental-impact value by the determined haversine distance and the distance factor for the given product-level ingredient. However, the functionality for determining the respective value of a logistics-level environmental impact indicator for a given product-level ingredient may take other forms as well—including but not limited to the possibility that the identified environmental-impact value may be transformed in some way before being multiplied by the determined havershine distance and the distance factor for the given product-level ingredient and/or that multiple environmental-impact values for the logistics-level environmental impact indicator may be identified and combined together into a single value before being multiplied by the determined havershine distance and the distance factor for the given product-level ingredient.

The values of the logistics-level environmental impact indicators for product-level ingredients may be determined in various other ways as well.

Lastly, at block 722, the logistics data pipeline 700 may store the logistics-level environmental impact indicators into a database table, such as the database table 108 of the back-end computing platform 102 shown in FIG. 1.

The functionality that is carried out the logistics data pipeline 700 may take various other forms as well.

Further, in practice, the logistics data pipeline 700 may carry out the foregoing functionality at any of various times. For instance, as one possibility, the logistics data pipeline 700 may carry out the foregoing functionality periodically according to a schedule or the like (e.g., daily, weekly, etc.). As another possibility, the logistics data pipeline 700 may carry out the foregoing functionality in response to any of various triggering events, examples of which may include an indication that the source data contained within the relevant database tables has changed and/or an indication that there has been a new request by a user to access and view logistics-level environmental impact indicators, among other possible examples.

After the ingredient-level, resource-level, and logistics-level environmental impact indicators have been determined and stored in the database table 108, the environmental impact service 110 may then perform back-end functionality for enabling users to access and analyze the environmental impact indicators that are determined by the data pipelines 104 and stored in the database table 108. The back-end functionality that the environmental impact service 110 may perform may take any of various forms.

For instance, at a high level, the back-end functionality of the environmental impact service 110 may involve (i) receiving a request from a user to access and view certain of the environmental impact indicators determined by the data pipelines 104 (and/or other information based thereon), (ii) loading certain ingredient-level environmental impact indicators, resource-level environmental impact indicators, and/or logistics-level environmental impact indicators from the database table 108, and (iii) causing the requested environmental impact indicators (and/or other information based thereon) to be presented to the user in the form of a data visualization or the like. Each of these functions may take various forms.

For instance, the function of receiving the request from the user to access and view certain of the environmental impact indicators determined by the data pipelines 104 (and/or other information based thereon) may involve receiving one or more request messages (e.g., one or more HTTP messages) from a client device 112 associated with the user via a communication path between the client device 112 and the back-end computing platform 102 (which as noted above may include at least one data network), and in at least some implementations, the one or more request messages may be received via an API.

Further, the request from the user may take any of various forms. As one example, the request from the user may comprise a request to view a particular set of environmental impact indicators (e.g., ingredient-level environmental impact indicators, resource-level environmental impact indicators, logistics-level environmental impact indicators, or any combination thereof) in a visualization that is to be presented via the client device 112. In this respect, the particular set of environmental impact indicators may comprise environmental impact indicators at any of various levels of granularity, examples of which may include an ingredient level, a recipe level, a manufacturing level, a finished-product level, a brand-portfolio level, and/or a product-category level, among other possibilities. As another example, the request from the user may comprise a request to include an aggregation of certain environmental impact indicators in a visualization that is to be presented via the client device 112, such as a request to view an aggregation of the environmental impact for a given productor an aggregation of the environmental impact across a category or portfolio of products, among other possible ways in which the environmental impact indicators may be aggregated. Various other examples may also exist.

Further yet, the function of causing the requested environmental impact indicators (and/or other information based thereon) to be presented to the user in the form of a data visualization or the like may involve sending one or more response messages (e.g., one or more HTTP messages) to the client device 112 associated with the user via the communication path between the client device 112 and the back-end computing platform 102 (which as noted above may include at least one data network), and in at least some implementations, the one or more response messages may be sent via an API.

Sill further, the visualization that the environmental impact service 110 may cause to be presented by the client device 112 may take any of various forms.

As one possibility, the visualization may include a particular set of environmental impact indicators (e.g., ingredient-level environmental impact indicators, resource-level environmental impact indicators, logistics-level environmental impact indicators, or any combination thereof), such as environmental impact indicators for one or more ingredients (e.g., a single ingredient or a category of ingredients, etc.), one or more products (e.g., a single product or a category or portfolio of products), one or more manufacturing processes (e.g., a single manufacturing process or a category of processes), etc. For example, such a data visualization may show the ingredient-level environmental impact indicators, the resource-level environmental impact indicators, and the logistics-level environmental impact indicators (or a subset thereof) for a particular product in the form of a table view (or the like) comprising a first set of rows that show the ingredient-level environmental impact indicators for the product-level ingredients of the product, a second set of rows that show the logistics-level environmental impact indicators for the product-level ingredients of the product, and a third set of rows that show the resource-level environmental impact indicators for the product-level resources utilized by the product. Many other examples of data visualizations showing a particular set of environmental impact indicators are possible as well.

As another possibility, the visualization may include an aggregation of certain environmental impact indicators, such as an aggregation of the environmental impact for a given product (e.g., a summation of environmental-impact indicators across the product-level ingredients and/or resources for the given product) or an aggregation of the environmental impact across a category or portfolio of products (e.g., an average of the environmental-impact indicators across the products), in which case the environmental impact service 110 may perform the aggregation as part of providing this visualization. Various other examples may also exist.

Still further yet, after causing the requested environmental impact indicators (and/or other information based thereon) to be presented to the user in the form of a data visualization or the like, the environmental impact service 110 may include functionality for receiving additional user input related to the data visualization, such as a request to adjust the environmental-impact information presented in the visualization and/or the manner in which such information is presented, and then causing the data visualization to be updated in accordance with the user input.

The back-end functionality that the environmental impact service 110 may perform may take other forms as well.

Figure 9:
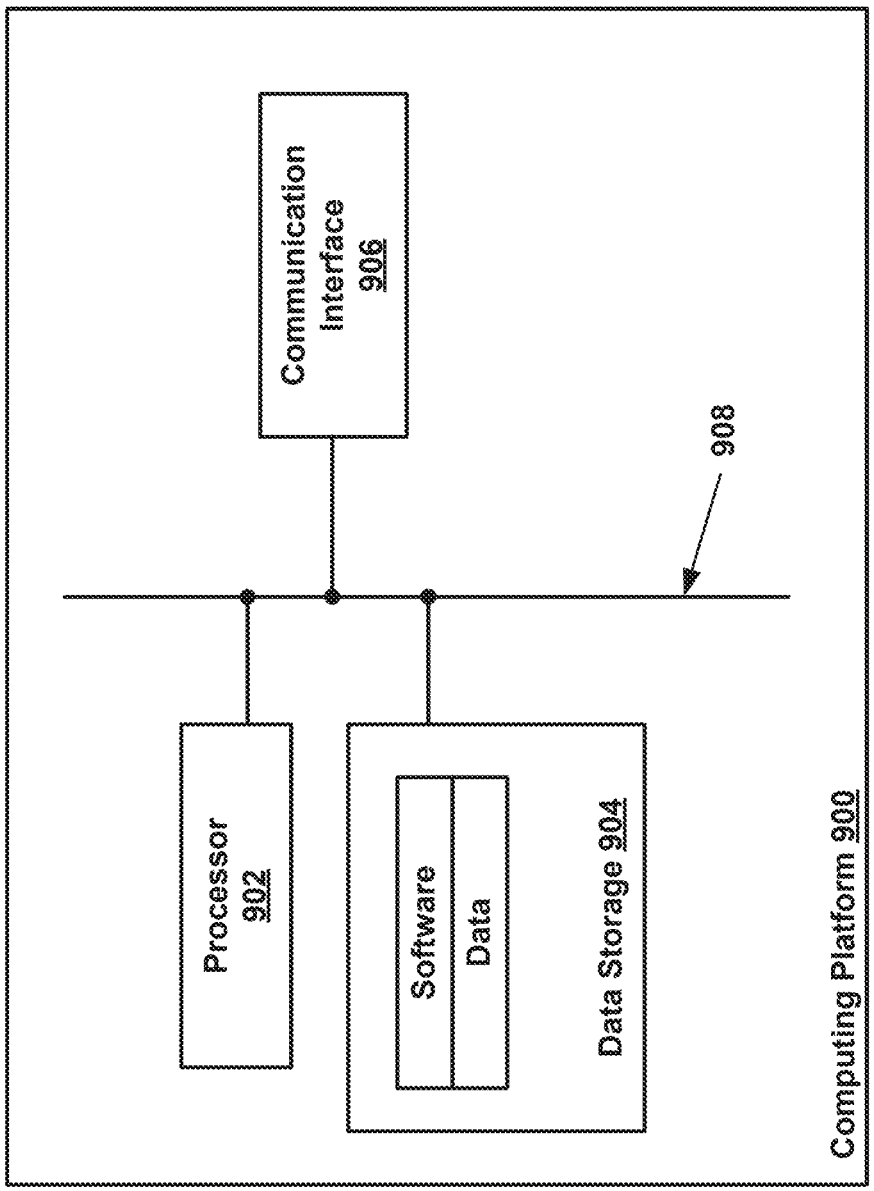
FIG. 9 is a simplified block diagram that illustrates some structural components of an example computing platform that may be configured to carry out any of the various functions disclosed herein.

Turning now to FIG. 9, a simplified block diagram is provided to illustrate some structural components that may be included in an example computing platform 900 that may be configured to perform some or all of the platform functions disclosed herein. At a high level, the example computing platform 900 may generally comprise any one or more computer systems (e.g., one or more servers) that collectively include one or more processors 902, data storage 904, and one or more communication interfaces 906, all of which may be communicatively linked by a communication link 908 that may take the form of a system bus, a communication network such as a public, private, or hybrid cloud, or some other connection mechanism. Each of these components may take various forms.

For instance, the one or more processors 902 may comprise one or more processor components, such as one or more central processing units (CPUs), graphics processing unit (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 902 could comprise processing components that are distributed across a plurality of physical computing devices connected via a network, such as a computing cluster of a public, private, or hybrid cloud.

In turn, the data storage 904 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 904 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 9, the data storage 904 may be capable of storing both (i) program instructions that are executable by the one or more processors 902 such that the example computing platform 900 is configured to perform any of the various functions disclosed herein (including but not limited to any of the platform functions discussed above), and (ii) data that may be received, derived, or otherwise stored by the example computing platform 900.

The one or more communication interfaces 906 may comprise one or more interfaces that facilitate communication between the example computing platform 900 and other systems or devices, where each such interface may be wired and/or wireless and may communicate according to any of various communication protocols. As examples, the one or more communication interfaces 906 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 900 may additionally have an I/O interface that includes or provides connectivity to I/O components that facilitate user interaction with the example computing platform 900, such as a keyboard, a mouse, a trackpad, a display screen, a touch-sensitive interface, a stylus, a virtual-reality headset, and/or one or more speaker components, among other possibilities.

It should be understood that the example computing platform 900 is one example of a computing platform that may be used with the embodiments described herein. Numerous other arrangements are possible and contemplated herein. For instance, in other embodiments, the example computing platform 900 may include additional components not pictured and/or more or less of the pictured components.

Figure 10:
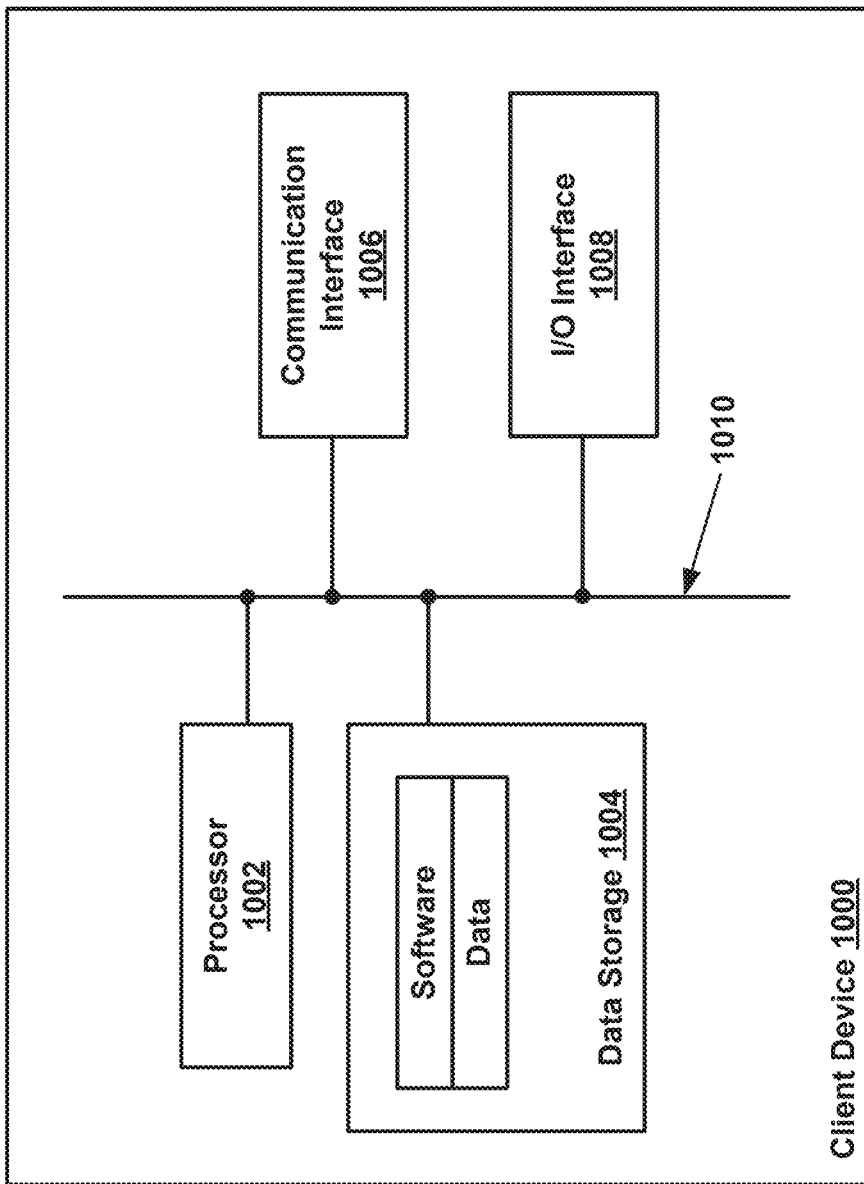
FIG. 10 is a simplified block diagram that illustrates some structural components of an example client device that may be configured to carry out any of the various functions disclosed herein.

Turning next to FIG. 10, a simplified block diagram is provided to illustrate some structural components that may be included in an example client device 1000 that may be configured to perform some or all of the client-device functions disclosed herein. At a high level, the example client device 1000 may include one or more processors 1002, data storage 1004, one or more communication interfaces 1006, and an I/O interface 1008, all of which may be communicatively linked by a communication link 1010 that may take the form a system bus and/or some other connection mechanism. Each of these components may take various forms.

For instance, the one or more processors 1002 of the example client device 1000 may comprise one or more processor components, such as one or more CPUs, GPUs, ASICs, DSPs, and/or programmable logic devices such as FPGAs, among other possible types of processing components.

In turn, the data storage 1004 of the example client device 1000 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 10, the data storage 1004 may be capable of storing both (i) program instructions that are executable by the one or more processors 1002 of the example client device 1000 such that the example client device 1000 is configured to perform any of the various functions disclosed herein (including but not limited to any of the client-device functions discussed above), and (ii) data that may be received, derived, or otherwise stored by the example client device 1000.

The one or more communication interfaces 1006 may comprise one or more interfaces that facilitate communication between the example client device 1000 and other systems or devices, where each such interface may be wired and/or wireless and may communicate according to any of various communication protocols. As examples, the one or more communication interfaces 1006 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 1008 may generally take the form of (i) one or more input interfaces that are configured to receive and/or capture information at the example client device 1000 and (ii) one or more output interfaces that are configured to output information from the example client device 1000 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 1008 may include or provide connectivity to output components such as a display screen and/or an audio speaker, among other possibilities.

It should be understood that the example client device 1000 is one example of a client device that may be used with the example embodiments described herein. Numerous other arrangements are possible and contemplated herein. For instance, in other embodiments, the example client device 1000 may include additional components not pictured and/or more or fewer of the pictured components.

CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

We claim:
1. A computing platform comprising:
at least one network interface;
at least one processor;
at least one non-transitory computer-readable medium; and
program instructions stored on the at least one non-transitory computer-readable medium that, when executed by the at least one processor, cause the computing platform to:
detect a trigger event for determining environmental-impact indicators for product-level resources across multiple different food products;
in response to detecting the trigger event, invoke a data pipeline that is configured to determine environmental-impact indicators for product-level resources across multiple different food products rather than for an individual food product, wherein, when invoked, the data pipeline functions to:
extract a first source dataset from a first database table containing data about food products, wherein the first source dataset comprises (i) a set of rows representing data records for a given set of multiple different food products and (ii) a set of columns representing data variables that, for each respective row in the set of rows, provide respective information about a respective food product represented by the respective row;
extract a second source dataset from a second database table containing data about manufacturing processes for food products, wherein the second source dataset comprises (i) a set of rows representing data records for a given set of multiple different manufacturing processes and (ii) a set of columns representing data variables that, for each respective row in the set of rows, provide respective information about a respective manufacturing process represented by the respective row;
merge the first source dataset and the second source dataset into a first merged dataset by performing a left join operation using the first source dataset as a left table, the second source dataset as a right table, and a manufacturing-process identifier as a key for joining the first and second source datasets, wherein the first merged dataset comprises (i) a set of rows representing data records for the given set of multiple different food products and (ii) a set of columns representing data variables that, for each respective row in the set of rows, provide respective information about a respective food product represented by the respective row, wherein at least a given subset of columns in the set of columns represent data variables that each indicates an amount of a given type of resource that is used or produced by a respective manufacturing process used to manufacture the respective food product represented by the respective row;
update the first merged dataset by performing an unpivot operation on the given subset of columns in the set of columns and thereby generate an updated first merged dataset that comprises (i) an updated set of rows representing data records for a given set of multiple different product-level resources that are each defined by a respective combination of food product and resource type, and (ii) an updated set of columns representing data variables that, for each respective row in the set of rows, provide respective information about a respective product-level resource represented by the respective row;
extract a third source dataset from a third database table containing data about resource types that are used or produced by manufacturing processes for food products, wherein the third source dataset comprises (i) a set of rows representing data records for a given set of multiple different resource types and (ii) a set of columns representing data variables that, for each respective row in the set of rows, provide respective information about a respective resource type represented by the respective row;
extract a fourth source dataset from a fourth database table containing data about plants where food products are manufactured, wherein the fourth source dataset comprises (i) a set of rows representing data records for a given set of multiple different plants and (ii) a set of columns representing data variables that, for each respective row in the set of rows, provide respective information about a respective plant represented by the respective row;
extract a fifth source dataset from a fifth database table containing environmental-impact values for types of resources, wherein the third source dataset comprises (i) a set of rows representing data records for a given set of multiple different resource types and (ii) a set of columns representing data variables that, for each respective row in the set of rows, provide respective environmental-impact values for a respective resource type represented by the respective row;

merge the updated first merged dataset, the third source dataset, the fourth source dataset, and the fifth source dataset into a second merged dataset by (i) producing a first intermediate dataset by performing a first left join operation using the first merged dataset as a first left table, the third source dataset as a first right table, and a resource-type identifier as a first key for joining the first merged dataset and the third source dataset, (ii) producing a second intermediate dataset by performing a second left join operation using the first intermediate dataset as a second left table, the fourth source dataset as a second right table, and a plant identifier as a second key for joining the first intermediate dataset and the fourth source dataset, (iii) producing the second merged dataset by performing a third left join operation using the second intermediate dataset as a third left table, the fifth source dataset as a third right table, and an environmental-impact-contributor identifier as a third key for joining the second intermediate dataset and the fifth source dataset, wherein the second merged dataset comprises (i) a set of rows representing data records for the given set of product-level resources and (ii) a set of columns representing data variables that, for each respective row in the set of rows, provide respective information about a respective product-level resource represented by the respective row; and determine a respective group of environmental-impact indicators for each respective product-level resource in the given set using the second merged dataset;

store the respective group of environmental-impact indicators for each respective product-level resource in the given set into a target database table; and utilize the target database table to service network-based requests from users for visualizations of environmental-impact indicators for food products from the given set of multiple different food products.

2. The computing platform of claim 1, wherein the set of columns in the first source dataset comprises:

a set of columns representing data variables that, for each respective row in the set of rows, provide respective information about a respective food product represented by the respective row that includes at least an identification of the respective food product, an identification of a respective plant where the respective food product is manufactured, and an identification of a respective manufacturing process used to manufacture the respective food product.

3. The computing platform of claim 1, wherein the set of columns in the second source dataset comprises:

a set of columns representing data variables that, for each respective row in the set of rows, provide respective information about a respective manufacturing process represented by the respective row that includes at least an identification of the respective manufacturing process and indications of amounts of different resource types that are used or produced by the respective manufacturing process.

4. The computing platform of claim 1, wherein the set of columns in the first merged dataset comprises:

a set of columns representing data variables that, for each respective row in the set of rows, provide respective information about a respective food product represented by the respective row that includes at least an identification of the respective food product, an identification of a plant where the respective food product is manufactured, an identification of a respective manufacturing process used to manufacture the respective food product, and indications of amounts of different resource types that are used or produced by the respective manufacturing process.

5. The computing platform of claim 1, wherein the updated set of columns in the updated first merged dataset comprises:

an updated set of columns representing data variables that, for each respective row in the set of rows, provide respective information about a respective product-level resource represented by the respective row that includes an identification of a respective food product that defines the respective product-level resource, an identification of a respective plant where the respective food product is manufactured, an identification of a respective manufacturing process used to manufacture the respective food product, an identification of a respective resource type that defines the respective product-level resource, and an indication of an amount of the respective product-level resource that is used or produced by the respective manufacturing process.

6. The computing platform of claim 1, wherein the respective group of environmental-impact indicators for each respective product-level resource in the given set comprise environmental-impact indicators for a plurality of environmental-impact categories, and wherein the set of columns in the second merged dataset comprises:

for each given environmental-impact category in the plurality of environmental-impact categories, a given column representing a given data variable that, for each respective row in the set of rows, indicates an environmental-impact value of a respective product-level resource represented by the respective row for the given environmental-impact category.

7. The computing platform of claim 1, wherein:

the first source dataset includes a first column representing a first data variable that, for each respective row in the set of rows, identifies a respective manufacturing process used to manufacture a respective food product represented by the respective row;

the second source dataset includes a second column representing a second data variable that, for each respective row in the set of rows, identifies a respective manufacturing process represented by the respective row; and the first and second data variables are used as the key for joining the first source dataset and the second source dataset.

8. The computing platform of claim 1, wherein:

the respective group of environmental-impact indicators for each respective product-level resource in the given set comprise environmental-impact indicators for a plurality of environmental-impact categories;

the second merged dataset includes (i) a plurality of columns representing a plurality of data variables that, for each respective row in the set of rows, indicate environmental-impact values of a respective product-level resource represented by the respective row for the plurality of environmental-impact categories, (ii) a first additional column representing a data variable that, for each respective row in the set of rows, indicates a conversion factor for the respective product-level resource represented by the respective row, and (iii) a second additional column representing a data variable that, for each respective row in the set of rows, indicates an amount of the respective product-level resource that is used or produced during manufacture of a respective food product that defines the respective product-level resource; and the program instructions stored on the at least one non-transitory computer-readable medium that, when executed by the at least one processor, cause the computing platform to determine the respective group of environmental-impact indicators for each respective product-level resource in the given set using the second merged dataset comprise program instructions stored on the at least one non-transitory computer-readable medium that, when executed by the at least one processor, cause the computing platform to:

for each respective row in the set of rows in the second merged dataset, multiply each of the environmental-impact values of the respective product-level resource represented by the respective row for the plurality of environmental-impact categories by (i) the conversion factor for the respective product-level resource represented by the respective row and (ii) the amount of the respective product-level resource that is used or produced during manufacture of the respective food product that defines the respective product-level resource.

9. The computing platform of claim 1, wherein the respective group of environmental-impact indicators for each respective product-level resource in the given set comprises:

a first environmental-impact indicator that quantifies the respective product-level resource impact on climate change;

a second environmental-impact indicator that quantifies the respective product-level resource impact on an amount of ozone in Earth's atmosphere;

a third environmental-impact indicator that quantifies the respective product-level resource impact on humans of toxic, cancerous substances;

a fourth environmental-impact indicator that quantifies the respective product-level resource impact on humans of toxic, non-cancerous substances;

a fifth environmental-impact indicator that quantifies the respective product-level resource impact on a potential incidence of disease due to particulate matter emissions;

a sixth environmental-impact indicator that quantifies the respective product-level resource impact on human health and ecosystems linked to radionuclide emissions;

a seventh environmental-impact indicator that quantifies the respective product-level resource impact on a creation of photochemical ozone in a lower atmosphere;

an eighth environmental-impact indicator that quantifies the respective product-level resource impact on a potential acidification of soils, water, or both;

a ninth environmental-impact indicator that quantifies the respective product-level resource impact on an enrichment of terrestrial ecosystems with nitrogen-containing compounds;

a tenth environmental-impact indicator that quantifies the respective product-level resource impact on an enrichment of freshwater ecosystems with nitrogen-containing compounds, phosphorus-containing compounds, or both;

an eleventh environmental-impact indicator that quantifies the respective product-level resource impact on an enrichment of marine ecosystems with nitrogen-containing compounds;

a twelfth environmental-impact indicator that quantifies the respective product-level resource impact on freshwater organism health;

a thirteenth environmental-impact indicator that quantifies the respective product-level resource impact on soil quality;

a fourteenth environmental-impact indicator that quantifies the respective product-level resource impact on a depletion of water;

a fifteenth environmental-impact indicator that quantifies the respective product-level resource impact on a depletion of non-fossil resources; and a sixteenth environmental-impact indicator that quantifies the respective product-level resource impact on a depletion of fossil resources.

10. The computing platform of claim 1, wherein the program instructions stored on the at least one non-transitory computer-readable medium that, when executed by the at least one processor, cause the computing platform to utilize the target database table to service network-based requests from users for visualizations of environmental-impact indicators for food products from the given set of multiple different food products comprise program instructions stored on the at least one non-transitory computer-readable medium that, when executed by the at least one processor, cause the computing platform to:

cause a client device to present a visualization of the respective groups of environmental-impact indicators for at least a subset of the given set of product-level resources.

11. A non-transitory computer-readable medium, wherein the non-transitory computer-readable medium is provisioned with program instructions that, when executed by at least one processor, cause a computing platform to:

detect a trigger event for determining environmental-impact indicators for product-level resources across multiple different food products;

in response to detecting the trigger event, invoke a data pipeline that is configured to determine environmental-impact indicators for product-level resources across multiple different food products rather than for an individual food product, wherein, when invoked, the data pipeline functions to:

extract a first source dataset from a first database table containing data about food products, wherein the first source dataset comprises (i) a set of rows representing data records for a given set of multiple different food products and (ii) a set of columns representing data variables that, for each respective row in the set of rows, provide respective information about a respective food product represented by the respective row;

extract a second source dataset from a second database table containing data about manufacturing processes for food products, wherein the second source dataset comprises (i) a set of rows representing data records for a given set of multiple different manufacturing processes and (ii) a set of columns representing data variables that, for each respective row in the set of rows, provide respective information about a respective manufacturing process represented by the respective row;

merge the first source dataset and the second source dataset into a first merged dataset by performing a left join operation using the first source dataset as a left table, the second source dataset as a right table, and a manufacturing-process identifier as a key for joining the first and second source datasets, wherein the first merged dataset comprises (i) a set of rows representing data records for the given set of multiple different food products and (ii) a set of columns representing data variables that, for each respective row in the set of rows, provide respective information about a respective food product represented by the respective row, wherein at least a given subset of columns in the set of columns represent data variables that each indicates an amount of a given type of resource that is used or produced by a respective manufacturing process used to manufacture the respective food product represented by the respective row;

update the first merged dataset by performing an unpivot operation on the given subset of columns in the set of columns and thereby generate an updated first merged dataset that comprises (i) an updated set of rows representing data records for a given set of multiple different product-level resources that are each defined by a respective combination of food product and resource type, and (ii) an updated set of columns representing data variables that, for each respective row in the set of rows, provide respective information about a respective product-level resource represented by the respective row;

extract a third source dataset from a third database table containing data about resource types that are used or produced by manufacturing processes for food products, wherein the third source dataset comprises (i) a set of rows representing data records for a given set of multiple different resource types and (ii) a set of columns representing data variables that, for each respective row in the set of rows, provide respective information about a respective resource type represented by the respective row;

extract a fourth source dataset from a fourth database table containing data about plants where food products are manufactured, wherein the fourth source dataset comprises (i) a set of rows representing data records for a given set of multiple different plants and (ii) a set of columns representing data variables that, for each respective row in the set of rows, provide respective information about a respective plant represented by the respective row;

extract a fifth source dataset from a fifth database table containing environmental-impact values for types of resources, wherein the third source dataset comprises (i) a set of rows representing data records for a given set of multiple different resource types and (ii) a set of columns representing data variables that, for each respective row in the set of rows, provide respective environmental-impact values for a respective resource type represented by the respective row;

merge the updated first merged dataset, the third source dataset, the fourth source dataset, and the fifth source dataset into a second merged dataset by (i) producing a first intermediate dataset by performing a first left join operation using the first merged dataset as a first left table, the third source dataset as a first right table, and a resource-type identifier as a first key for joining the first merged dataset and the third source dataset, (ii) producing a second intermediate dataset by performing a second left join operation using the first intermediate dataset as a second left table, the fourth source dataset as a second right table, and a plant identifier as a second key for joining the first intermediate dataset and the fourth source dataset, (iii) producing the second merged dataset by performing a third left join operation using the second intermediate dataset as a third left table, the fifth source dataset as a third right table, and an environmental-impact-contributor identifier as a third key for joining the second intermediate dataset and the fifth source dataset, wherein the second merged dataset comprises (i) a set of rows representing data records for the given set of product-level resources and (ii) a set of columns representing data variables that, for each respective row in the set of rows, provide respective information about a respective product-level resource represented by the respective row; and determine a respective group of environmental-impact indicators for each respective product-level resource in the given set using the second merged dataset;

store the respective group of environmental-impact indicators for each respective product-level resource in the given set into a target database table; and utilize the target database table to service network-based requests from users for visualizations of environmental-impact indicators for food products from the given set of multiple different food products.

12. The non-transitory computer-readable medium of claim 11, wherein the set of columns in the first source dataset comprises:

a set of columns representing data variables that, for each respective row in the set of rows, provide respective information about a respective food product represented by the respective row that includes at least an identification of the respective food product, an identification of a respective plant where the respective food product is manufactured, and an identification of a respective manufacturing process used to manufacture the respective food product.

13. The non-transitory computer-readable medium of claim 11, wherein the set of columns in the second source dataset comprises:

a set of columns representing data variables that, for each respective row in the set of rows, provide respective information about a respective manufacturing process represented by the respective row that includes at least an identification of the respective manufacturing process and indications of amounts of different resource types that are used or produced by the respective manufacturing process.

14. The non-transitory computer-readable medium of claim 11, wherein the set of columns in the first merged dataset comprises:

a set of columns representing data variables that, for each respective row in the set of rows, provide respective information about a respective food product represented by the respective row that includes at least an identification of the respective food product, an identification of a plant where the respective food product is manufactured, an identification of a respective manufacturing process used to manufacture the respective food product, and indications of amounts of different resource types that are used or produced by the respective manufacturing process.

15. The non-transitory computer-readable medium of claim 11, wherein the updated set of columns in the updated first merged dataset comprises:
an updated set of columns representing data variables that, for each respective row in the set of rows, provide respective information about a respective product-level resource represented by the respective row that includes an identification of a respective food product that defines the respective product-level resource, an identification of a respective plant where the respective food product is manufactured, an identification of a respective manufacturing process used to manufacture the respective food product, an identification of a respective resource type that defines the respective product-level resource, and an indication of an amount of the respective product-level resource that is used or produced by the respective manufacturing process.

16. The non-transitory computer-readable medium of claim 11, wherein the respective group of environmental-impact indicators for each respective product-level resource in the given set comprise environmental-impact indicators for a plurality of environmental-impact categories, and wherein the set of columns in the second merged dataset comprises:
for each given environmental-impact category in the plurality of environmental-impact categories, a given column representing a given data variable that, for each respective row in the set of rows, indicates an environmental-impact value of a respective product-level resource represented by the respective row for the given environmental-impact category.

17. The non-transitory computer-readable medium of claim 11, wherein:
the first source dataset includes a first column representing a first data variable that, for each respective row in the set of rows, identifies a respective manufacturing process used to manufacture a respective food product represented by the respective row;
the second source dataset includes a second column representing a second data variable that, for each respective row in the set of rows, identifies a respective manufacturing process represented by the respective row; and
the first and second data variables are used as the key for joining the first source dataset and the second source dataset.

18. A method implemented by a computing platform, the method comprising:
detecting a trigger event for determining environmental-impact indicators for product-level resources across multiple different food products;
in response to detecting the trigger event, invoking a data pipeline that is configured to determine environmental-impact indicators for product-level resources across multiple different food products rather than for an individual food product, wherein, when invoked, the data pipeline carries out functions including:
extracting a first source dataset from a first database table containing data about food products, wherein the first source dataset comprises (i) a set of rows representing data records for a given set of multiple different food products and (ii) a set of columns representing data variables that, for each respective row in the set of rows, provide respective information about a respective food product represented by the respective row;
extracting a second source dataset from a second database table containing data about manufacturing processes for food products, wherein the second source dataset comprises (i) a set of rows representing data records for a given set of multiple different manufacturing processes and (ii) a set of columns representing data variables that, for each respective row in the set of rows, provide respective information about a respective manufacturing process represented by the respective row;
merging the first source dataset and the second source dataset into a first merged dataset by performing a left join operation using the first source dataset as a left table, the second source dataset as a right table, and a manufacturing-process identifier as a key for joining the first and second source datasets, wherein the first merged dataset comprises (i) a set of rows representing data records for the given set of multiple different food products and (ii) a set of columns representing data variables that, for each respective row in the set of rows, provide respective information about a respective food product represented by the respective row, wherein at least a given subset of columns in the set of columns represent data variables that each indicates an amount of a given type of resource that is used or produced by a respective manufacturing process used to manufacture the respective food product represented by the respective row;
updating the first merged dataset by performing an unpivot operation on the given subset of columns in the set of columns and thereby generating an updated first merged dataset that comprises (i) an updated set of rows representing data records for a given set of multiple different product-level resources that are each defined by a respective combination of food product and resource type, and (ii) an updated set of columns representing data variables that, for each respective row in the set of rows, provide respective information about a respective product-level resource represented by the respective row;
extracting a third source dataset from a third database table containing data about resource types that are used or produced by manufacturing processes for food products, wherein the third source dataset comprises (i) a set of rows representing data records for a given set of multiple different resource types and (ii) a set of columns representing data variables that, for each respective row in the set of rows, provide respective information about a respective resource type represented by the respective row;
extracting a fourth source dataset from a fourth database table containing data about plants where food products are manufactured, wherein the fourth source dataset comprises (i) a set of rows representing data records for a given set of multiple different plants and (ii) a set of columns representing data variables that, for each respective row in the set of rows, provide respective information about a respective plant represented by the respective row;

extracting a fifth source dataset from a fifth database table containing environmental-impact values for types of resources, wherein the third source dataset comprises (i) a set of rows representing data records for a given set of multiple different resource types and (ii) a set of columns representing data variables that, for each respective row in the set of rows, provide respective environmental-impact values for a respective resource type represented by the respective row;

merging the updated first merged dataset, the third source dataset, the fourth source dataset, and the fifth source dataset into a second merged dataset by (i) producing a first intermediate dataset by performing a first left join operation using the first merged dataset as a first left table, the third source dataset as a first right table, and a resource-type identifier as a first key for joining the first merged dataset and the third source dataset, (ii) producing a second intermediate dataset by performing a second left join operation using the first intermediate dataset as a second left table, the fourth source dataset as a second right table, and a plant identifier as a second key for joining the first intermediate dataset and the fourth source dataset, (iii) producing the second merged dataset by performing a third left join operation using the second intermediate dataset as a third left table, the fifth source dataset as a third right table, and an environmental-impact-contributor identifier as a third key for joining the second intermediate dataset and the fifth source dataset, wherein the second merged dataset comprises (i) a set of rows representing data records for the given set of product-level resources and (ii) a set of columns representing data variables that, for each respective row in the set of rows, provide respective information about a respective product-level resource represented by the respective row; and determining a respective group of environmental-impact indicators for each respective product-level resource in the given set using the second merged dataset;

storing the respective group of environmental-impact indicators for each respective product-level resource in the given set into a target database table; and utilizing the target database table to service network-based requests from users for visualizations of environmental-impact indicators for food products from the given set of multiple different food products.

19. The method of claim 18, wherein the respective group of environmental-impact indicators for each respective product-level resource in the given set comprise environmental-impact indicators for a plurality of environmental-impact categories, and wherein the set of columns in the second merged dataset comprises:

for each given environmental-impact category in the plurality of environmental-impact categories, a given column representing a given data variable that, for each respective row in the set of rows, indicates an environmental-impact value of a respective product-level resource represented by the respective row for the given environmental-impact category.

20. The method of claim 18, wherein:

the first source dataset includes a first column representing a first data variable that, for each respective row in the set of rows, identifies a respective manufacturing process used to manufacture a respective food product represented by the respective row;

the second source dataset includes a second column representing a second data variable that, for each respective row in the set of rows, identifies a respective manufacturing process represented by the respective row; and the first and second data variables are used as the key for joining the first source dataset and the second source dataset.

* * * * *